(12) United States Patent
Oh et al.

(10) Patent No.: US 11,930,481 B2
(45) Date of Patent: Mar. 12, 2024

(54) METHOD AND APPARATUS FOR TRANSMITTING AND RECEIVING REFERENCE SIGNAL IN WIRELESS COMMUNICATION SYSTEM

(71) Applicant: Samsung Electronics Co., Ltd., Suwon-si (KR)

(72) Inventors: Jinyoung Oh, Suwon-si (KR);
Taehyoung Kim, Suwon-si (KR);
Hoondong Noh, Suwon-si (KR);
Jinhyun Park, Suwon-si (KR);
Hyoungju Ji, Suwon-si (KR);
Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 207 days.

(21) Appl. No.: 17/397,209

(22) Filed: Aug. 9, 2021

(65) Prior Publication Data

US 2022/0046644 A1 Feb. 10, 2022

(30) Foreign Application Priority Data

Aug. 7, 2020 (KR) .......................... 10-2020-0098937

(51) Int. Cl.
*H04W 72/0453* (2023.01)
*H04L 5/00* (2006.01)
*H04W 56/00* (2009.01)

(52) U.S. Cl.
CPC ....... *H04W 72/0453* (2013.01); *H04L 5/0048* (2013.01); *H04W 56/0015* (2013.01)

(58) Field of Classification Search
CPC ......... H04W 56/0015; H04W 72/0453; H04W 76/27
See application file for complete search history.

(56) References Cited

U.S. PATENT DOCUMENTS

2018/0213513 A1 7/2018 Sun et al.
2020/0053670 A1* 2/2020 Jung ...................... H04W 56/00
(Continued)

FOREIGN PATENT DOCUMENTS

WO 2019/137424 A1 7/2019
WO 2019/213962 A1 11/2019
(Continued)

OTHER PUBLICATIONS

International Search Report dated Nov. 5, 2021, issued in International Patent Application No. PCT/KR2021/010514.

*Primary Examiner* — Yee F Lam
(74) *Attorney, Agent, or Firm* — Jefferson IP Law, LLP

(57) ABSTRACT

A method performed by a user equipment (UE) in a wireless communication system is provided. The method includes determining a transmission frequency band of a reference signal based on at least one of an initial frequency band for an initial access procedure, a control resource set (CORESET) configured for the UE using a master information block (MIB), or a CORESET associated with a paging search space set for monitoring a paging message, wherein the reference signal is received by the UE in an IDLE state or an INACTIVE state, receiving, from a base station (BS), the reference signal based on the transmission frequency band of the reference signal, performing time synchronization and frequency synchronization with the BS based on the reference signal, and receiving, from the BS, the paging message including an identifier of the UE based on the time synchronization and frequency synchronization.

14 Claims, 19 Drawing Sheets

(56) References Cited

U.S. PATENT DOCUMENTS

| | | | |
|---|---|---|---|
| 2021/0067994 A1 | 3/2021 | Chen | |
| 2021/0068116 A1 | 3/2021 | Liu et al. | |
| 2021/0127414 A1* | 4/2021 | Abdoli | H04L 1/1887 |
| 2021/0127450 A1* | 4/2021 | Abdoli | H04W 76/27 |
| 2021/0167918 A1 | 6/2021 | Li et al. | |
| 2021/0243704 A1 | 8/2021 | Liu | |
| 2021/0250898 A1* | 8/2021 | Abedini | H04W 68/005 |
| 2021/0306986 A1* | 9/2021 | Takahashi | H04W 68/00 |
| 2021/0314959 A1* | 10/2021 | Islam | H04W 72/1263 |
| 2021/0352615 A1* | 11/2021 | Luo | H04W 68/00 |
| 2021/0385800 A1* | 12/2021 | Harada | H04W 72/23 |

FOREIGN PATENT DOCUMENTS

| | | |
|---|---|---|
| WO | 2019/214469 A1 | 11/2019 |
| WO | 2020/010550 A1 | 1/2020 |

\* cited by examiner

FIG. 15

| R 1510 | Serving Cell ID 1515 | BWP ID 1520 | Oct 1 |
| CORE SET ID 1525 | TCI State ID 1530 | | Oct 2 |

METHOD AND APPARATUS FOR TRANSMITTING AND RECEIVING REFERENCE SIGNAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0098937, filed on Aug. 7, 2020, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for transmitting and receiving a reference signal in a wireless communication system.

2. Description of Related Art

To meet the increase in demand with respect to wireless data traffic after the commercialization of 4th generation (4G) communication systems, considerable efforts have been made to develop improved 5th generation (5G) communication systems or pre-5G communication systems. For this reason, 5G communication systems or pre-5G communication systems are called beyond 4G network communication systems or post long term evolution (LTE) systems.

To achieve a high data rate, the implementation of 5G communication systems in an ultra-high frequency band (millimeter wave (mmWave)) (e.g., a 60 GHz band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system are being discussed.

Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed.

In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of mobile communication systems, there is a need for a method of efficiently transmitting and receiving a reference signal in a wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for transmitting and receiving a reference signal in a wireless communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes determining a transmission frequency band of a reference signal based on at least one of an initial frequency band for an initial access procedure, a control resource set (CORESET) configured for the UE using a master information block (MIB), or a CORESET associated with a paging search space set for monitoring a paging message, wherein the reference signal is received by the UE in an IDLE state or an INACTIVE state, receiving, from a base station (BS), the reference signal based on the transmission frequency band of the reference signal, performing time synchronization and frequency synchronization with the BS based on the reference signal, and receiving, from the BS, the paging message including an identifier of the UE based on the time synchronization and frequency synchronization.

In accordance with another aspect of the disclosure, a method performed by a base station (BS) in a wireless communication system is provided. The method includes transmitting, to a user equipment (UE), a reference signal based on a transmission frequency band of the reference signal, wherein the reference signal is received by the UE in an IDLE state or an INACTIVE state, performing time synchronization and frequency synchronization with the UE based on the reference signal, and transmitting, to the UE, a paging message including an identifier of the UE based on the time synchronization and frequency synchronization, wherein the transmission frequency band of the reference signal is determined based on at least one of an initial frequency band for an initial access procedure, a control resource set (CORESET) configured for the UE using a master information block (MIB), or a CORESET associated with a paging search space set for monitoring a paging message.

In accordance with another aspect of the disclosure, a user equipment (UE) in a wireless communication system is provided. The user equipment includes a transceiver, and at least one processor coupled with the transceiver and configured to determine a transmission frequency band of a reference signal based on at least one of an initial frequency band for an initial access procedure, a control resource set (CORESET) configured for the UE using a master information block (MIB), or a CORESET associated with a paging search space set for monitoring a paging message, wherein the reference signal is received by the UE in an IDLE state or an INACTIVE state, receive, from a base station (BS), the reference signal based on the transmission frequency band of the reference signal, perform time synchronization and frequency synchronization with the BS based on the reference signal, and receive, from the BS, the paging message including an identifier of the UE based on the time synchronization and frequency synchronization, Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 15 illustrates an example of a signaling structure in a wireless communication system, according to an embodiment of the disclosure;

Throughout the drawings, like reference numerals will be understood to refer to like parts, components, and structures.

DETAILED DESCRIPTION

Figure 1:
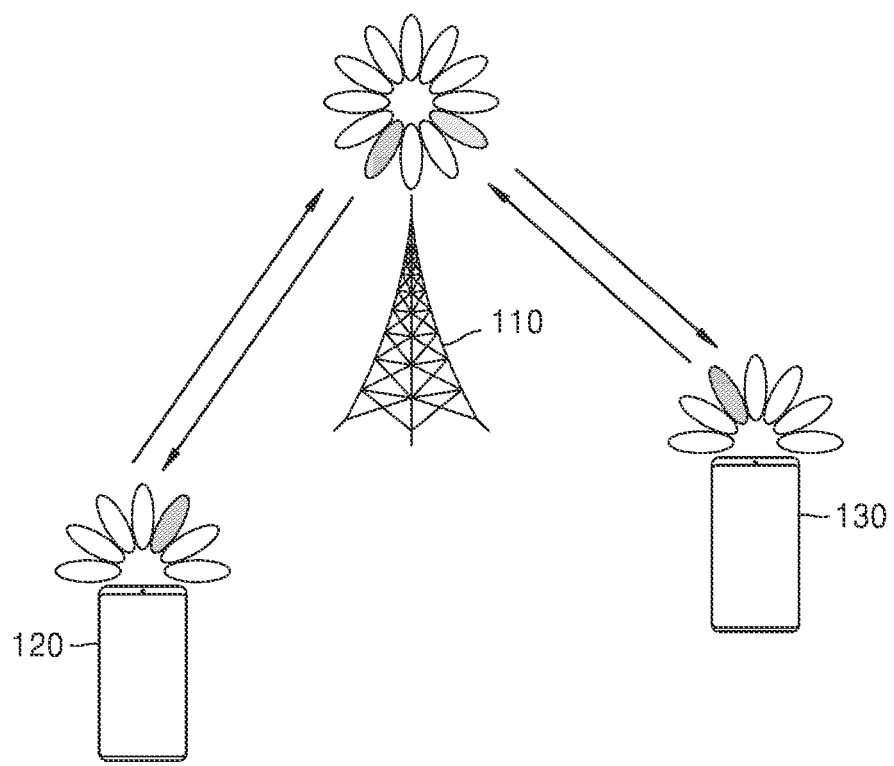
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used herein are only used to describe specific embodiments of the disclosure, and are not intended to limit the scope of other embodiments of the disclosure. The singular forms "a," "an," and "the" as used herein may be intended to include the plural forms as well unless the context clearly indicates otherwise. The terms as used herein, including technical or scientific terms, may have the same meanings as commonly understood by those of ordinary skill in the art. Among the terms as used herein, the terms defined in the general dictionary may be interpreted as the meaning identical or similar to the meanings in the context of the related art. Unless explicitly defined in the disclosure, the terms are not interpreted in an ideal or overly formal sense. In some cases, even the terms defined in the disclosure are interpreted to exclude embodiments of the disclosure.

In various embodiments of the disclosure described below, a hardware-based approach will be described as an example. However, because various embodiments of the disclosure include technology using both hardware and software, various embodiments of the disclosure do not exclude a software-based approach.

Effects and features of the disclosure, and methods of achieving them will be clarified with reference to embodiments described below in detail with reference to the drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the embodiments of the disclosure to those of ordinary skill in the art. The same reference numerals denote the same elements throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" or "-er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the disclosure, the "module" or "-er/or" may include one or more processors.

In describing the disclosure, when the detailed description of the relevant known functions or configurations is determined to unnecessarily obscure the gist of the disclosure, the detailed description thereof may be omitted. Hereinafter, embodiments of the disclosure will be described in detail with reference to the accompanying drawings.

The term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to entities having an equivalent technical meaning may be used.

For convenience of description, the terms and names defined in the 3rd Generation Partnership Project Long Term Evolution (3GPP LTE) standard are used herein. However, the disclosure is not limited by the terms and names and may be equally applied to systems conforming to other standards. The term "eNB" as used in the disclosure may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

Hereinafter, a base station assigns resources to a terminal, and may include at least one of a gNode B, an eNode B, a Node B, a BS, a radio access unit, a base station controller, or a node on a network. Examples of a terminal may include a user equipment (UE), a mobile station (MS), a cellular phone, a smartphone, a computer, a multimedia system capable of performing a communication function, or the like. Of course, the disclosure is not limited to the above examples.

In particular, the disclosure may be applied to 3GPP New Radio (NR) (5th generation (5G) mobile communication standard). Also, the disclosure may be applied to intelligent services (e.g., smart homes, smart buildings, smart cities, smart cars or connected cars, health care, digital education, retail, security and safety related services, etc.) based on 5G communication technologies and IoT related technologies. The term "eNB" as used herein may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

Also, although long term evolution (LTE), long term evolution-advanced (LTE-A), LTE Pro, or 5G (or NR, next-generation mobile communication) systems are described below as an example, embodiments of the disclosure may also be applicable to other communication systems having a similar technical background or channel form. Also, the disclosure may be applied to other communication systems through some modifications without departing from the scope of the disclosure.

FIG. 1 illustrates a wireless communication system according to an embodiment of the disclosure.

FIG. 1 illustrates a base station 110, a user equipment (UE) 120, and a UE 130 as part of nodes using a radio channel in a wireless communication system. Although FIG. 1 illustrates only one base station, other base stations that are identical or similar to the base station 110 may be further included.

The base station 110 is a network infrastructure that provides radio access to the UEs 120 and 130. The base station 110 may have a coverage defined as a certain geographic area based on a signal transmittable distance. The base station 110 may be referred to as an "access point (AP)," an "eNodeB (eNB)," a "5G node," a "next generation NodeB (gNB)," a "wireless point," a "transmission/reception point (TRP)", or other terms having a technical meaning equivalent thereto.

Each of the UE 120 and the UE 130 is used by a user, and may communicate with the base station 110 via a radio channel. In some cases, at least one of the UE 120 or the UE 130 may be operated without the user's involvement. That is, at least one of the UE 120 or the UE 130 is a device that performs machine type communication (MTC) and may not be carried by the user. Each of the UE 120 and the UE 130 may be referred to as a "terminal," a "user equipment," a "mobile station," a "subscriber station," a "remote terminal," a "wireless terminal," a "user device," or other terms having a technical meaning equivalent thereto.

In the following embodiments of the disclosure, embodiments of the disclosure applied to the UE 120 may also be applied to the UE 130.

Figure 2:
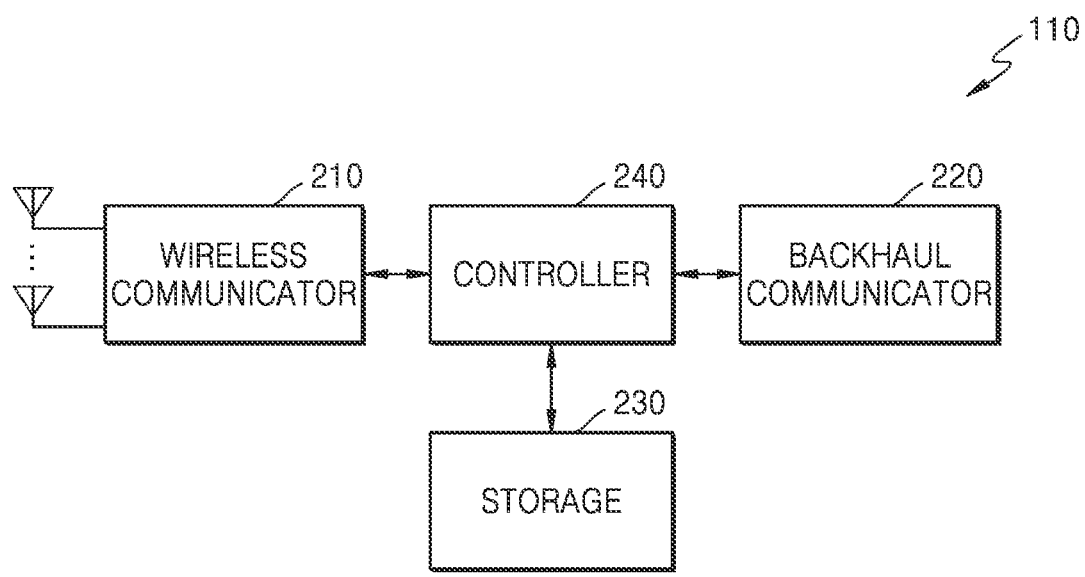
FIG. 2 illustrates an architecture of a base station in a wireless communication system, according to an embodiment of the disclosure.

FIG. 2 illustrates an architecture of a base station in a wireless communication system, according to an embodiment of the disclosure.

The architecture illustrated in FIG. 2 may be understood as the architecture of the base station 110. The terms such as "module" and "-er/or" as used herein mean units for processing at least one function or operation, and may be implemented as hardware, software, or a combination of hardware and software.

Referring to FIG. 2, the base station 110 includes a wireless communicator 210, a backhaul communicator 220, a storage 230, and a controller 240. However, the elements of the base station 110 are not limited to the above example, and the base station 110 may include fewer elements or more elements than the elements illustrated in FIG. 2.

The wireless communicator 210 may perform functions for transmitting and receiving signals via a radio channel. For example, the wireless communicator 210 may perform a conversion function between a baseband signal and a bit string according to a physical layer standard of a system. For example, upon transmission of data, the wireless communicator 210 may encode and modulate a transmission bit string to generate complex symbols. Also, upon reception of data, the wireless communicator 210 may demodulate and decode a baseband signal to reconstruct a reception bit string.

Also, the wireless communicator 210 may up-convert a baseband signal into a radio frequency (RF) band signal and transmit the RF band signal through an antenna, and may down-convert an RF band signal received through an antenna into a baseband signal. To this end, the wireless communicator 210 may include a transmission filter, a reception filter, an amplifier, a mixer, an oscillator, a digital-to-analog converter (DAC), an analog-to-digital converter (ADC), and the like. Also, the wireless communicator 210 may include a plurality of transmission/reception paths. Furthermore, the wireless communicator 210 may include at least one antenna array including a plurality of antenna elements.

In terms of hardware, the wireless communicator 210 may include a digital unit and an analog unit. The analog unit may include a plurality of sub-units according to an operating power, an operating frequency, and the like. The digital unit may be implemented as at least one processor (e.g., a digital signal processor (DSP)).

The wireless communicator 210 may transmit and receive signals as described above. Accordingly, all or part of the wireless communicator 210 may be referred to as a "transmitter," a "receiver," or a "transceiver." Also, in the following description, transmission and reception that are performed via the radio channel are used in the sense of including a case in which the wireless communicator 210 performs processing as described above.

The backhaul communicator 220 may provide an interface for performing communication with other nodes in the network. That is, the backhaul communicator 220 may convert a bit string transmitted from the base station to another node, for example, another access node, another base station, a higher node, a core network, etc., into a physical signal, and may convert a physical signal received from another node into a bit string.

The storage 230 may store basic programs, application programs, and data such as configuration information for the operations of the base station 110. The storage 230 may include a volatile memory, a non-volatile memory, or a combination of a volatile memory and a non-volatile memory. The storage 230 may provide the stored data in response to a request from the controller 240.

The controller 240 may control overall operations of the base station 110. For example, the controller 240 may transmit and receive signals through the wireless communicator 210 or the backhaul communicator 220. Also, the controller 240 may store data in the storage 230 and may read data from the storage 230. The controller 240 may perform functions of a protocol stack required in a communication standard. According to another embodiment of the disclosure, the protocol stack may be included in the wireless communicator 210. To this end, the controller 240 may include at least one processor.

Figure 3:
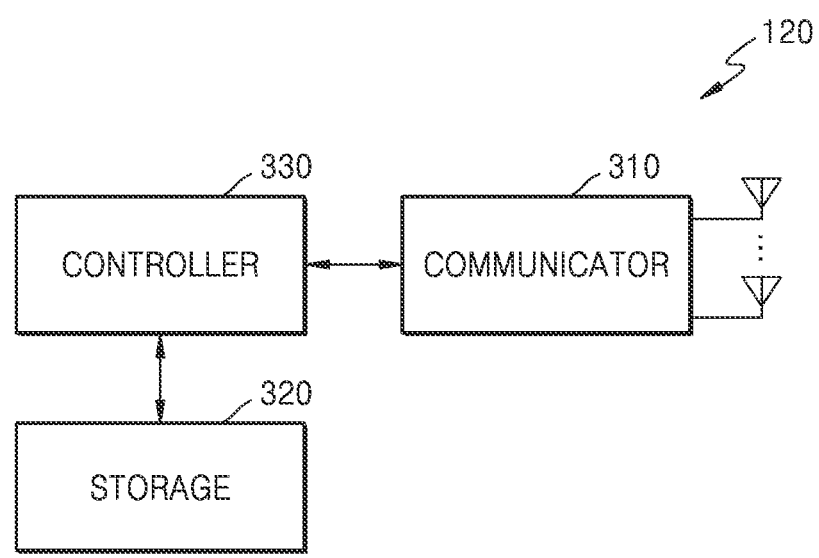
FIG. 3 illustrates an architecture of a user equipment (UE) in a wireless communication system, according to an embodiment of the disclosure.

FIG. 3 illustrates an architecture of a UE in a wireless communication system, according to an embodiment of the disclosure.

The architecture illustrated in FIG. 3 may be understood as the architecture of the UE 120. Also, although not illustrated, the architecture illustrated in FIG. 3 may be the architecture of the UE 130. The terms such as "module" and "-er/or" as used herein mean units for processing at least one function or operation, and may be implemented as hardware, software, or a combination of hardware and software.

Referring to FIG. 3, the UE 120 may include a communicator 310, a storage 320, and a controller 330. However, the elements of the UE 120 are not limited to the above example, and the UE 120 may include fewer elements or more elements than the elements illustrated in FIG. 3.

The communicator 310 may perform functions for transmitting and receiving signals via a radio channel. For example, the communicator 310 may perform a conversion function between a baseband signal and a bit string according to a physical layer standard of a system. For example, upon transmission of data, the communicator 310 may encode and modulate a transmission bit string to generate complex symbols. Also, upon reception of data, the communicator 310 may demodulate and decode a baseband signal to reconstruct a reception bit string. Also, the communicator 310 may up-convert a baseband signal into an RF band signal and transmit the RF band signal through an antenna, and may down-convert an RF band signal received through an antenna into a baseband signal. For example, the communicator 310 may include a transmission filter, a reception filter, an amplifier, a mixer, an oscillator, a DAC, an ADC, and the like.

Also, the communicator 310 may include a plurality of transmission/reception paths. Furthermore, the communicator 310 may include at least one antenna array including a plurality of antenna elements. In terms of hardware, the communicator 310 may include a digital circuit and an analog circuit (e.g., a radio frequency integrated circuit (RFIC)). The digital circuit and the analog circuit may be implemented as one package. Also, the communicator 310 may include a plurality of RF chains. Furthermore, the communicator 310 may perform beamforming.

The communicator 310 may transmit and receive signals as described above. Accordingly, all or part of the communicator 310 may be referred to as a "transmitter," a "receiver," or a "transceiver." Also, in the following description, transmission and reception that are performed via the radio channel are used in the sense of including a case in which the communicator 310 performs processing as described above.

The storage 320 may store basic programs, application programs, and data such as configuration information for the operations of the UE 120. The storage 320 may include a volatile memory, a non-volatile memory, or a combination of a volatile memory and a non-volatile memory. The storage 320 may provide the stored data in response to a request from the controller 330.

The controller 330 may control overall operations of the UE 120. For example, the controller 330 may transmit and receive signals through the communicator 310. Also, the controller 330 may store data in the storage 320 and may read data from the storage 320. The controller 330 may perform functions of a protocol stack required in a communication standard. To this end, the controller 330 may include at least one processor or microprocessor, or may be part of the processor. Also, part of the communicator 310 and the controller 330 may be referred to as a communication processor (CP).

Figure 4:
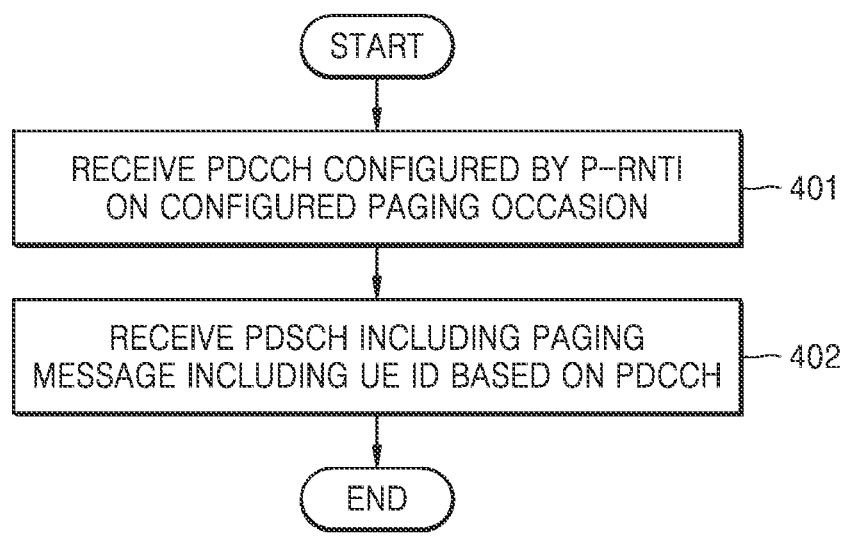
FIG. 4 is a flowchart of an operation of a UE in a wireless communication system, according to an embodiment of the disclosure.

FIG. 4 is a flowchart of an operation of a UE in a wireless communication system, according to an embodiment of the disclosure. FIG. 4 illustrates an operating method of the UE 120.

Referring to FIG. 4, in operation 401, the UE 120 may receive a physical downlink control channel (PDCCH) configured by a paging-radio network temporary identifier (P-RNTI) on a configured paging occasion. When an incoming call to the UE in an idle or inactive state occurs, a paging procedure may be used to notify that the incoming call has occurred and start network access to the UEs, or may be used to notify the UEs in a connected state that system information has changed.

The paging may be started from an access and mobility management function (AMF) and transmitted to the UE through the base station (e.g., gNB). More specifically, the paging may be started from the AMF, transmitted to the base station 110 through S1 application protocol (S1AP) signaling, and then transmitted to the UE through radio resource control (RRC) signaling. In this case, the UE 120 may determine whether a paging message is present by monitoring the PDCCH configured by the P-RNTI on the paging occasion. The paging occasion may be determined based on a discontinuous reception (DRX) cycle set for the UE by the base station.

In operation 402, the UE 120 receives a physical downlink shared channel (PDSCH) including a paging message including an identifier of the UE 120 based on the PDCCH. The UE 120 receiving the PDCCH configured by the P-RNTI may receive the PDSCH including the paging message. The paging message may include UE identifier (UE ID) information of the UE to be awakened by the base station.

A wireless communication system has evolved from a system providing voice-oriented services to a broadband wireless communication system providing high speed high quality packet data services of communication standards such as high speed packet access (HSPA), LTE or evolved universal terrestrial radio access (E-UTRA), LTE-A, and LTE-Pro of 3GPP, high rate packet data (HRPD) or ultra mobile broadband (UMB) of 3GPP2, and IEEE 802.16e.

In an LTE system as a representative example of a broadband wireless communication system, an orthogonal frequency division multiplexing (OFDM) scheme is employed in a downlink (DL), and a single carrier frequency division multiple access (SC-FDMA) scheme is employed in an uplink (UL). The UL refers to a radio link through which a UE (or MS) transmits data or a control signal to a base station (eNode B or BS), and the DL refers to a radio link through which a base station transmits data or a control signal to a UE. In the multiple access scheme as described above, data or control information of each user may be identified by performing assignment and operation so that time-frequency resources for carrying data or control information for each user do not overlap each other, that is, orthogonality therebetween is established.

As future communication systems after LTE, 5G communication systems have to be able to freely reflect various requirements of users and service providers. Therefore, services that satisfy various requirements at the same time have to be supported. Services considered for 5G communication systems include enhanced mobile broadband (eMBB), massive machine type communication (MMTC), and ultra reliability low latency communication (URLLC).

eMBB aims to provide a data rate that is higher than that supported by LTE, LTE-A, or LTE-Pro. For example, in 5G communication systems, eMBB has to be able to provide a peak data rate of 20 Gbps in a DL and a peak data rate of 10 Gbps in a UL in terms of a single base station. Also, the 5G communication systems have to provide a peak data rate and simultaneously provide an increased user perceived data rate of the UE. In order to satisfy such requirements, there is a need to improve various transmission and reception technologies including a more advanced multi-input multi-output (MIMO) transmission technology. Also, in a 2 GHz band used by LTE, signals are transmitted using up to 20 MHz transmission bandwidth. However, 5G communication systems use a frequency bandwidth wider than 20 MHz in 3 to 6 GHz frequency bands or 6 GHz or higher frequency bands. Therefore, the data rate required by 5G communication systems may be satisfied.

At the same time, mMTC is under consideration so as to support application services such as Internet of things (IoT) in 5G communication systems. In order to efficiently provide IoT, mMTC needs to support access of a massive UE in a cell, improve coverage of the UE, improve battery time, and reduce costs of the UE. Because IoT is attached to various sensors and various devices to provide a communication function, IoT has to be able to support a large number of UEs (e.g., 1,000,000 terminals/km²) in a cell. Also, due to the nature of the service, the UE supporting mMTC is likely to be located in a shaded area that is not covered by the cell, such as the basement of a building. Therefore, wider coverage than other services provided by the 5G communication systems may be required. The UE supporting mMTC has to be configured as an inexpensive UE, and it is difficult to frequently replace a battery of the UE. Therefore, a very long battery lifetime such as 10 to 15 years may be required.

Finally, URLLC is a cellular-based wireless communication service used for a specific purpose (mission-critical). URLLC may be used for services in remote control for robots or machinery, industrial automation, unmanned aerial vehicles, remote health care, emergency alerts, or the like. Therefore, communication provided by URLLC has to provide very low latency and very high reliability. For example, a service supporting URLLC has to satisfy air interface latency of less than 0.5 milliseconds and simultaneously has a packet error rate of $10^{-5}$ or less. Therefore, for services supporting URLLC, the 5G systems have to provide a smaller transmit time interval (TTI) than other services and simultaneously require a design matter that has to allocate a wide resource in a frequency band so as to ensure reliability of a communication link.

The three services of 5G, that is, eMBB, URLLC, and mMTC, may be multiplexed and transmitted in a single system. In this case, different transmission and reception technologies and transmission and reception parameters may be used between services so as to satisfy different requirements of the respective services. Of course, 5G is not limited to the above-described three services.

Hereinafter, a frame structure of a 5G system will be described in more detail with reference to the accompanying drawings.

Figure 5:
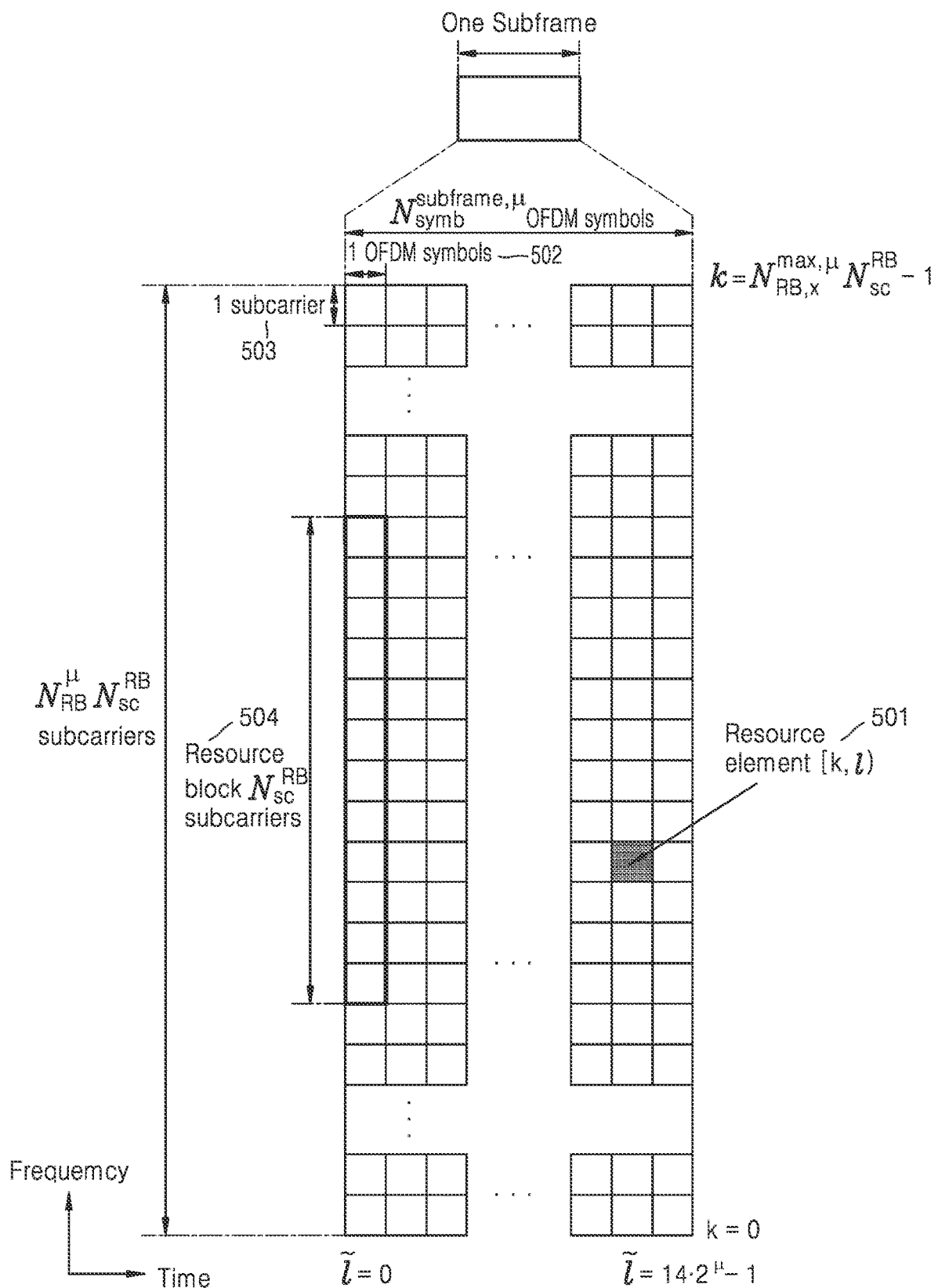
FIG. 5 illustrates a resource structure of a wireless communication system, according to an embodiment of the disclosure.

FIG. 5 illustrates a resource structure of a wireless communication system, according to an embodiment of the disclosure.

Specifically, FIG. 5 illustrates a basic structure of a time-frequency domain that is a radio resource domain in which data or a control channel is transmitted in a 5G system.

Referring to FIG. 5, the horizontal axis represents a time domain and the vertical axis represents a frequency domain. A basic unit of resources in the time-frequency domain is a resource element (RE) 501 and may be defined as one orthogonal frequency division multiplexing (OFDM) symbol 502 on the time domain and one subcarrier 503 on the frequency domain. In the frequency domain, $N_{SC}^{RB}$ (for example, 12) consecutive REs may constitute one resource block (RB) 504.

Figure 6:
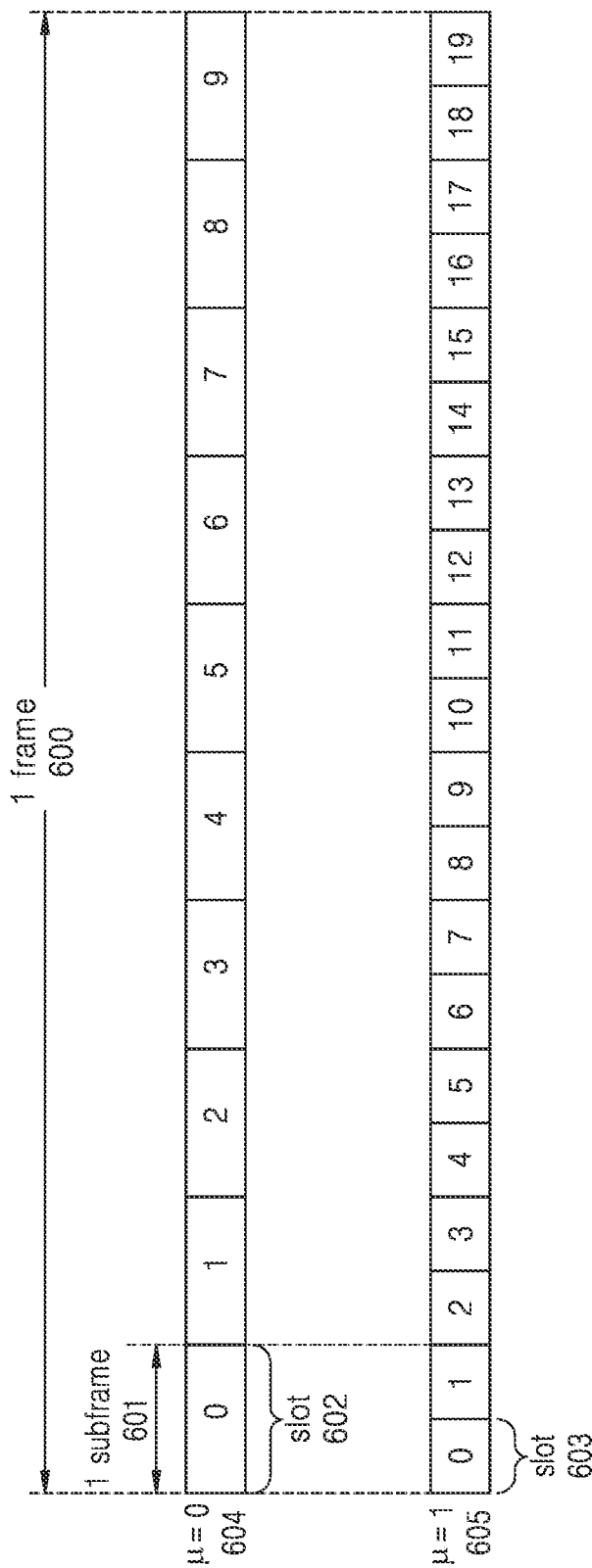
FIG. 6 illustrates a resource structure in a wireless communication system, according to an embodiment of the disclosure.

FIG. 6 illustrates a resource structure of a wireless communication system, according to an embodiment of the disclosure.

Specifically, FIG. 6 illustrates a slot structure considered in a 5G system.

FIG. 6 illustrates an example of a structure of a frame 600, a subframe 601, and a slot 602. One frame 600 may be defined as 10 ms. One subframe 601 may be defined as 1 ms. Therefore, one frame 600 may include a total of 10 subframes 601. One slot 602 or 603 may be defined as 14 OFDM symbols (that is, the number $N_{symb}^{slot}$ of symbols per slot=14). One subframe 601 may include one or more slots 602 and 603, and the number of slots 602 and 603 per one subframe 601 may vary according to a set value μ 604 or 605 for subcarrier spacing.

Referring to FIG. 6, the case of μ=0 (604) and the case of μ=1 (605) are illustrated as subcarrier spacing setting values. When μ=0 (604), one subframe 601 may include one slot 602. When μ=1 (605), one subframe 601 may include two slots 603. That is, the number $N_{slot}^{subframe,\mu}$ of slots per one subframe may vary according to the set value μ for the subcarrier spacing, and thus, the number $N_{slot}^{frame,\mu}$ of slots per one frame may vary. $N_{slot}^{subframe,\mu}$ and $N_{slot}^{frame,\mu}$ according to the set value μ for each subcarrier spacing may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a bandwidth part (BWP) configuration in a 5G communication system will be described in detail with reference to the drawings.

Figure 7:
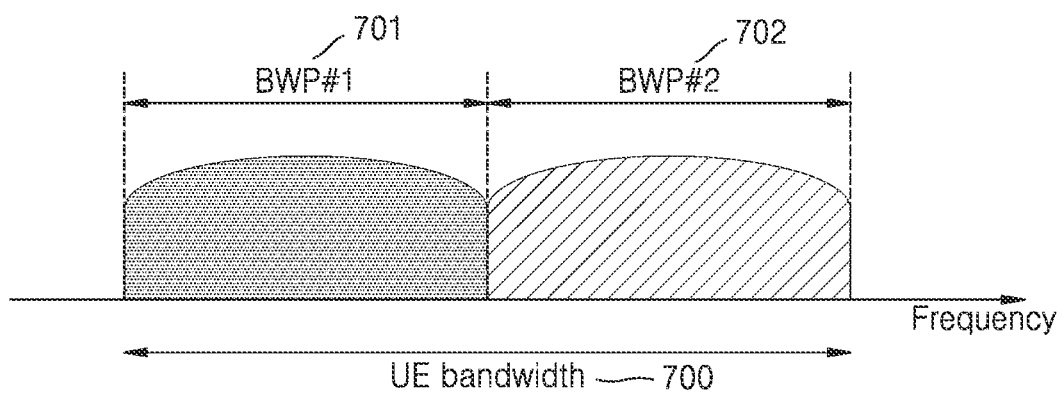
FIG. 7 illustrates a structure of a bandwidth part (BWP) in a wireless communication system, according to an embodiment of the disclosure.

FIG. 7 illustrates a structure of a BWP in a wireless communication system, according to an embodiment of the disclosure.

Specifically, FIG. 7 illustrates an example of configuring a BWP in a 5G communication system.

FIG. 7 illustrates an example in which a UE bandwidth 700 is configured as two BWPs, that is, BWP #1 (BWP#1) 701 and BWP #2 (BWP#2) 702. The base station may configure one or more BWPs for the UEs 120 and 130, and may configure the following information for each BWP.

TABLE 2

```
BP ::=                              SEQUENCE {
   bwp -Id                             BWP -Id,
   (Bandwidth part identifier)
   locationAndBandwidth                INTEGER (1..65536),
   (Bandwidth part location)
   subcarrierSpacing                   ENUMERATED {n0, n1, n2, n3, n4,
n5},
```

TABLE 2-continued

| (Subcarrier spacing) cyclicPrefix (Cyclic Prefix) | ENUMERATED { extended } |
|---|---|
| } | |

Of course, the disclosure is not limited to the above example. In addition to the above-described configuration information, various parameters related to the BWPs may be set for the UE 120. The base station may transmit the configuration information to the UE 120 through higher layer signaling, for example, RRC signaling.

For example, at least one BWP among the configured one or more BWPs may be activated. Whether to activate the configured BWP may be semi-statically transmitted from the base station 110 to the UE 120 through RRC signaling, or may be dynamically transmitted from the base station 110 to the UE 120 through downlink control information (DCI).

According to an embodiment of the disclosure, the UE 120 before the RRC connection may receive an initial BWP (Initial BWP) for initial access configured from the base station 110 through a master information block (MIB). More specifically, the UE 120 may receive configuration information about a control resource set (CORESET) and a search space through which a PDCCH for receiving system information (which may correspond to remaining system information (RMSI) or system information block 1 (SIB1)) required for initial access through the MIB in an initial access stage. The control resource set and the search space set by the MIB may be regarded as identity (ID) 0. The base station 110 may notify the UE 120 of configuration information such as frequency allocation information, time allocation information, and numerology for the control resource set #0 through the MIB. In addition, the base station 110 may notify the UE 120 of configuration information about the monitoring cycle and the paging occasion for the control resource set #0, that is, configuration information for the search space #0, through the MIB. The UE 120 may regard the frequency domain configured as the control resource set #0 obtained from the MIB, as an initial BWP for initial access. In this case, the ID of the initial BWP may be regarded as 0.

The configuration of the BWP supported by 5G may be used for various purposes.

According to an embodiment of the disclosure, when the bandwidth supported by the UE 120 is less than the system bandwidth, this may be supported by configuring the BWP. For example, the base station 110 may configure a frequency position of the BWP (configuration information 2) for the UE 120, so that the UE 120 may transmit and receive data at a specific frequency position within the system bandwidth.

According to an embodiment of the disclosure, the base station 110 may configure a plurality of BWPs for the UE 120 for the purpose of supporting different numerologies. For example, in order to support, to a certain UE, data transmission and reception using both a subcarrier spacing of 15 kHz and a subcarrier spacing of 30 kHz, two BWPs may be configured with a subcarrier spacing of 15 kHz and 30 kHz, respectively. Different BWPs may be frequency-division-multiplexed. When data is transmitted and received at specific subcarrier spacing, the BWP configured with the corresponding subcarrier spacing may be activated.

According to an embodiment of the disclosure, for the purpose of reducing power consumption of the UE 120, the base station may configure BWPs having different magnitudes of bandwidths for the UE 120. For example, when the UE 120 supports a very large bandwidth, for example, a bandwidth of 100 MHz, and always transmits and receives data in the corresponding bandwidth, very high power consumption may occur. In particular, monitoring an unnecessary DL control channel with a large bandwidth of 100 MHz in a situation in which traffic is absent may be very inefficient in terms of power consumption. In order to reduce power consumption of the UE 120, the base station 110 may configure, to the UE 120, a BWP of a relatively small bandwidth, for example, a BWP of 20 MHz. In a situation in which traffic is absent, the UE 120 may perform the monitoring operation in the 20 MHz BWP, and when data is generated, the UE 120 may transmit and receive data in a BWP of 100 MHz according to an indication of the base station 110.

In order to configure the BWP, the UEs before RRC connection may receive configuration information about the initial BWP through the MIB in the initial access phase. More specifically, the UE 120 may be configured with a control resource set for a DL control channel through which DCI for scheduling an SIB may be transmitted from an MIB of a physical broadcast channel (PBCH). For example, the bandwidth of the control resource set configured by MIB may be regarded as the initial BWP. Also, the UE 120 may receive the PDSCH, through which the SIB is transmitted, via the configured initial BWP. In addition to the purpose of receiving the SIB, the initial BWP may be utilized for other system information (OSI), paging, and random access.

When one or more BWPs are configured for the UE 120, the base station 110 may indicate the UE 120 to change the BWP by using a BWP indicator field in the DCI. As an example, in FIG. 7, when the currently activated BWP of the UE 120 is the BWP #1 701, the base station 110 may indicate the BWP #2 702 to the UE 120 as the BWP indicator in the DCI, and the UE 120 may change the BWP to the BWP #2 702 indicated by the BWP indicator in the received DCI.

As described above, because the DCI-based BWP change may be indicated by DCI scheduling a PDSCH or a physical uplink shared channel (PUSCH). Therefore, when the UE 120 receives a BWP change request, the UE 120 has to be able to receive or transmit the PDSCH or the PUSCH scheduled by the corresponding DCI in the changed BWP without difficulty. To this end, the standard stipulates the requirements for a BWP change delay time ($T_{BWP}$) and may be defined, for example, as shown in Table 3 below.

TABLE 3

| | NR Slot | BWP switch delay $T_{BWP}$ (slots) | |
|---|---|---|---|
| μ | length (ms) | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.

Note 2:
If the BWP switch involves changing of SCS, the BWP switch delay is determined by the larger one between the SCS before BWP switch and the SCS after BWP switch.

The requirements for the BWP change delay time support type 1 or type 2 according to the capability of the UE 120. The UE 120 may report the supportable BWP delay time type to the base station 110.

According to the above-described requirements for the BWP change delay time, the UE 120 may receive the DCI including the BWP change indicator in slot n. When the UE 120 receives the DCI including the BWP change indicator in slot n, the UE 120 may complete a change to a new BWP indicated by the BWP change indicator at a time point not later than slot n+$T_{BWP}$. Also, the UE 120 may perform transmission and reception for a data channel scheduled by the corresponding DCI in the changed new BWP. When the base station 110 determines to schedule a data channel with the new BWP, time domain resource assignment for the data channel may be determined considering the BWP change delay time ($T_{BWP}$) of the UE 120. That is, when scheduling the data channel with the new BWP, the base station 110 may schedule the data channel after the BWP change delay time so as to determine the time domain resource assignment for the data channel. Therefore, the UE 120 may not expect that the DCI indicating the BWP change indicates a slot offset (K0 or K2) value less than the BWP change delay time ($T_{BWP}$).

When the UE 120 receives the DCI (e.g., DCI format 1_1 or 0_1) indicating the BWP change, the UE 120 may not perform the transmission or reception during a time interval from the third symbol of the slot in which the PDCCH including the DCI is received to the start point of the slot indicated by the slot offset (K0 or K2) value indicated by the time domain resource assignment indicator field in the DCI. For example, when the UE 120 receives the DCI indicating the BWP change in slot n and the slot offset value indicated by the DCI is K, the UE 120 may not perform the transmission or reception from the third symbol of slot n to the symbol before slot n+K (i.e., the last symbol of slot n+K−1).

Next, a synchronization signal (SS)/PBCH block in 5G will be described.

The SS/PBCH block may refer to a physical layer channel block including a primary SS (PSS), a secondary SS (SSS), and a PBCH. Specifically, the structure of the SS/PBCH block is as follows.

The PSS is a signal serving as a reference for downlink time/frequency synchronization and may provide partial information of a cell ID.

The SSS is a signal serving as a reference for downlink time/frequency synchronization, and may provide remaining cell ID information that is not provided by the PSS. Additionally, the SSS may serve as a reference signal for demodulation of the PBCH.

The PBCH may provide essential system information necessary for transmitting and receiving the data channel and the control channel of the UE 120. The essential system information may include search space-related control information indicating radio resource mapping information of the control channel, scheduling control information about a separate data channel for transmitting system information, and the like.

The SS/PBCH block includes a combination of the PSS, the SSS, and the PBCH. One or more SS/PBCH blocks may be transmitted within 5 ms, and each transmitted SS/PBCH block may be identified by an index.

The UE 120 may detect the PSS and the SSS in the initial access stage and may decode the PBCH. The MIB may be obtained from the PBCH, and a control resource set #0 (which may correspond to a control resource set, a control resource set index or ID which is 0) and a search space #0 (which may correspond to a search space, an index or ID which is 0) may be configured. The UE 120 may perform monitoring on the control resource set #0 on the assumption that a selected SS/PBCH block and a demodulation reference signal (DMRS) transmitted from the control resource set #0 are quasi-colocated (QCLed). The UE 120 may receive system information as DCI transmitted in the control resource set #0. The UE 120 may obtain, from the received system information, configuration information related to a random access channel (RACH) required for initial access. The UE 120 may transmit a physical RACH (PRACH) to the base station 110 considering the selected SS/PBCH index, and the base station 110 receiving the PRACH may obtain information about the SS/PBCH block index selected by the UE 120. The base station 110 may determine that the UE 120 has selected a certain block among the SS/PBCH blocks and monitor the control resource set #0 associated therewith.

Next, DCI in a 5G system will be described in detail.

In the 5G system, scheduling information about UL data (or PUSCH) or DL data (or PDSCH) is transmitted from the base station to the UE through DCI. The UE 120 may monitor a fallback DCI format and a non-fallback DCI format with respect to the PUSCH or the PDSCH. The fallback DCI format may include a fixed field predefined between the base station 110 and the UE 120, and the non-fallback DCI format may include a configurable field.

The DCI may be transmitted via a PDCCH through a channel coding and modulation process. A cyclic redundancy check (CRC) is attached to a DCI message payload. The CRC is scrambled by a radio network temporary identifier (RNTI) corresponding to the identity of the UE 120. Different RNTIs may be used according to the purpose of the DCI message, for example, UE-specific data transmission, a power control command, or a random access response. That is, the RNTI is not explicitly transmitted, but is transmitted by being included in a CRC calculation process. When the DCI message transmitted via the PDCCH is received, the UE 120 checks the CRC by using the assigned RNTI. When a result of checking the CRC is correct, the UE 120 may determine that the DCI message has been transmitted to the UE 120.

For example, DCI that schedules a PDSCH for system information (SI) may be scrambled by an SI-RNTI. DCI that schedules a PDSCH for a random access response (RAR) message may be scrambled by an RA-RNTI. DCI that schedules a PDSCH for a paging message may be scrambled by a P-RNTI. DCI that notifies a slot format indicator (SFI) may be scrambled by an SFI-RNTI. DCI that notifies transmit power control (TPC) may be scrambled by a TPC-RNTI. DCI that schedules a UE-specific PDSCH or PUSCH may be scrambled by a cell RNTI (C-RNTI), a modulation coding scheme C-RNTI (MCS-C-RNTI), or a configured scheduling RNTI (CS-RNTI).

DCI format 0_0 may be used as a fallback DCI that schedules a PUSCH. In this case, a CRC may be scrambled by a C-RNTI. DCI format 0_0 in which the CRC is scrambled by the C-RNTI may include, for example, information shown in Table 4 below.

TABLE 4

Identifier for DCI formats-1 bit
　　The value of this bit field is always set to 0, indicating an UL DCI format
Frequency domain resource assignment-[$\log_2(N_{RB}^{UL,BWP}(N_{RB}^{UL,BWP} + 1)/2)$] bits
　　where $N_{RB}^{UL,BWP}$ is defined in clause 7.3.1.0
　　For PUSCH hopping with resource allocation type 1:

TABLE 4-continued

NUL_hop NUL_hop MSB bits are used to indicate the frequency offset according to subclause 6.3 of [6, TS 38.214], where NUL_hop = 1 if the higher layer parameter frequencyHoppingOffsetLists contains two offset values and NUL_hop = 2 if the higher layer parameter frequencyHoppingOffsetLists contains four offset values
$\lceil \log_2(N_{RB}^{UL,BWP}(N_{RB}^{UL,BWP} + 1)/2) \rceil - N_{UL\_hop}$ bits provides the frequency domain resource allocation according to Subclause 6.1.2.2.2 of [6, TS 38.214]
For non-PUSCH hopping with resource allocation type 1:
$\lceil \log_2(N_{RB}^{UL,BWP}(N_{RB}^{UL,BWP} + 1)/2) \rceil$ bits provides the frequency domain resource allocation according to Subclause 6.1.2.2.2 of [6, TS 38.214]
Time domain resource assignment-4 bits as defined in Subclause 6.1.2.1 of [6, TS 38.214]
Frequency hopping flag-1 bit according to Table 7.3.1.1.1-3, as defined in Clause 6.3 of [6, TS 38.214]
Modulation and coding scheme-5 bits as defined in Clause 6.1.4.1 of [6, TS 38.214]
New data indicator-1 bit
Redundancy version-2bits as defined in Table 7.3.1.1.1-2
HARQ process number-4 bits
TPC command for scheduled PUSCH-2 bits as defined in Subclause 7.1.1 of [5, TS 38.213]
Padding bits, if required.
UL/SUL indicator-1 bit for UEs configured with supplementaryUplink in SeryingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
  If the UL/SUL indicator is present in DCI format 0_0 and the higher layer parameter pusch-Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
  If the UL/SUL indicator is not present in DCI format 0_0 and pucch-Config is configured, the corresponding PUSCH scheduled by the DCI format 0_0 is for the UL or SUL for which high layer parameter pucch-Config is configured.
  If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as a non-fallback DCI that schedules a PUSCH. In this case, a CRC may be scrambled by a C-RNTI. DCI format 0_1 in which the CRC is scrambled by the C-RNTI may include, for example, information shown in Table 5 below.

TABLE 5

Identifier for DCI formats - 1 bit
The value of this bit field is always set to 0, indicating an UL DCI format
Carrier indicator 0 or 3 bits, as defined in Subclause 10.1 of [5, TS38.213].
UL/SUL indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.
Bandwidth part indicator - 0, 1 or 2 bits as determined by the number of UL BWPs $n_{BWP,RRC}$ configured by higher layers, excluding the initial UL bandwidth part. The bitwidth for this field is determined as $\lceil \log_2 (n_{BWP}) \rceil$ bits, where
$n_{BWP} = n_{BWP,RRC} + 1$ if $n_{BWP,RRC} \leq 3$, in which case the bandwidth part indicator is equivalent to the ascending order of the higher layer parameter BWP-Id;
otherwise $n_{BWP} = n_{BWP,RRC}$, in which case the bandwidth part indicator is defined in Table 7.3.1.1.2-1;
If a UE does not support active BWP change via DCI, the UE ignores this bit field.
Frequency domain resource assignment - number of bits determined by the following, where $N_{RB}^{UL,BWP}$ is the size of the active UL bandwidth part:
$N_{RBG}$ bits if only resource allocation type 0 is configured, where $N_{RBG}$ is defined in Subclause 6.1.2.2.1 of [6, TS 38.214].
$\lceil \log_2 (N_{RB}^{UL,BWP} (NRBUL,BWP + 1)/2) \rceil$ bits if only resource allocation type 1 is configured, or $\max(\lceil \log_2(N_{RB}^{UL,BWP}(N_{RB}^{UL,BWP} +1)/2 \rceil, N_{RBG}) +1$ bits of both resource allocation type 0 and 1 are configured.
If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
For resource allocation type 0, the $N_{RBG}$ LSBs provide the resource allocation as defined in Subclause 6.1.2.2.1 of [6, TS 38.214].

TABLE 5-continued

For resource allocation type 1, the $\lceil \log_2(N_{RB}^{UL,BWP} (N_{RB}^{UL,BWP} + 1)/2) \rceil$ LSBs
provide the resource allocation as follows:
For PUSCH hopping with resource allocation type 1:
$N_{UL\_hop}$ MSB bits are used to indicate the frequency offset according to
Subclause 6.3 of [6, TS 38.214], where $N_{UL\_hop}$ = 1 if the higher layer
parameter frequencyHoppingOffsetLists contains two offset values and
$N_{UL\_hop}$ = 2 if the higher layer parameter frequencyHoppingOffsetLists
contains four offset values
$\lceil \log_2 (N_{RB}^{UL,BWP} + 1)/2 \rceil - N_{UL\_hop}$ bits provides the frequency
domain resource allocation according to Subclause 6.1.2.2.2 of [6, TS
38.214]
For non-PUSCH hopping with resource allocation type 1:
$\lceil \log_2 (N_{RB}^{UL,BWP} + 1)/2 \rceil$ bits provides the frequency domain resource
allocation according to Subclause 6.1.2.2.2 of [6, TS 38.214]
If "Bandwidth part indicator" field indicates a bandwidth part other than the
active bandwidth part and if both resource allocation type 0 and 1 are configured
for the indicated bandwidth part, the UE assumes resource allocation type 0 for
the indicated bandwidth part if the bitwidth of the "Frequency domain resource
assignment" field of the active bandwidth part is smaller than the bitwidth of the
"Frequency domain resource assignment" field of the indicated bandwidth part.
Time domain resource assignment - 0, 1, 2, 3, or 4 bits as defined in Subclause
6.1.2.1 of [6, TS38.214]. The bitwidth for this field is determined as $\lceil \log_2(I) \rceil$ bits,
where I is the number of entries in the higher layer parameter pusch-
TimeDomainAllocationList if the higher layer parameter is configured; otherwise I is
the number of entries in the default table.
Frequency hopping flag - 0 or 1 bit:
0 bit if only resource allocation type 0 is configured or if the higher layer
parameter frequencyHopping is not configured;
1 bit according to Table 7.3.1.1.1-3 otherwise, only applicable to resource
allocation type 1, as defined in Subclause 6.3 of [6, TS 38.214].
Modulation and coding scheme - 5 bits as defined in Subclause 6.1.4.1 of [6, TS
38.214]
New data indicator - 1 bit
Redundancy version - 2 bits as defined in Table 7.3.1.1.1-2
HARQ process number - 4 bits
$1^{st}$ downlink assignment index - 1 or 2 bits:
1 bit for semi-static HARQ-ACK codebook;
2 bits for dynamic HARQ-ACK codebook.
$2^{nd}$ downlink assignment index - 0 or 2 bits:
2 bits for dynamic HARQ-ACK codebook with two HARQ-ACK sub-codebooks;
0 bit otherwise.
TPC command for scheduled PUSCH - 2 bits as defined in Subclause 7.1.1 of [5,
TS38.213]

SRS resource indicator—

$$\left\lceil \log_2 \left( \sum_{k=1}^{\min\{L_{max},N_{SRS}\}} \binom{N_{SRS}}{k} \right) \right\rceil \text{ or} \lceil \log_2(N_{SRS}) \rceil \text{bits, where}$$

$N_{SRS}$ is the number of configured SRS resources in the SRS resource set associated
with the higher layer parameter usage of value 'codeBook' or 'nonCodeBook', $$\left\lceil \log_2 \left( \sum_{k=1}^{\min\{L_{max},N_{SRS}\}} \binom{N_{SRS}}{k} \right) \right\rceil$$

bits according to Tables 7.3.1.1.2-28/29/30/31 if the
higher layer parameter txConfig = nonCodebook, where $N_{SRS}$ is the number of
configured SRS resources in the SRS resource set associated with the higher layer
parameter usage of value 'nonCodeBook' and
if UE supports operation with maxMIMO-Layers and the higher layer
parameter maxMIMO-Layers of PUSCH-ServingCellConfig of the serving cell is
configured, $L_{max}$ is given by that parameter
otherwise, $L_{max}$ is given by the maximum number of layers for PUSCH
supported by the UE for the serving cell for non-codebook based operation.
$\lceil \log_2(N_{SRS}) \rceil$ bits according to Tables 7.3.1.1.2-32 if the higher layer parameter
txConfig = codebook, where $N_{SRS}$ is the number of configured SRS resources in the
SRS resource set associated with the higher layer parameter usage of value
'codeBook'.
Precoding information and number of layers - number of bits determined by the
following:
0 bits if the higher layer parameter txConfig = nonCodebook;
0 bits for 1 antenna port and if the higher layer parameter txConfig = codebook;
4, 5, or 6 bits according to Table 7.3.1.1.2-2 for 4 antenna ports, if txConfig =
codebook, and according to whether transform precoder is enabled or disabled,
and the values of higher layer parameters maxRank, and codebookSubset;
2, 4, or 5 bits according to Table 7.3.1.1.2-3 for 4 antenna ports, if txConfig =

TABLE 5-continued codebook, and according to whether transform precoder is enabled or disabled,
and the values of higher layer parameters maxRank, and codebookSubset;
2 or 4 bits according to Table7.3.1.1.2-4 for 2 antenna ports, if txConfig =
codebook, and according to whether transform precoder is enabled or disabled,
and the values of higher layer parameters maxRank and codebookSubset;
1 or 3 bits according to Table7.3.1.1.2-5 for 2 antenna ports, if txConfig =
codebook, and according to whether transform precoder is enabled or disabled,
and the values of higher layer parameters maxRank and codebookSubset.
Antenna ports - number of bits determined by the following
2 bits as defined by Tables 7.3.1.1.2-6, if transform precoder is enabled, dmrs-
Type = 1, and maxLength = 1;
4 bits as defined by Tables 7.3.1.1.2-7, if transform precoder is enabled, dmrs-
Type = 1, and maxLength = 2;
3 bits as defined by Tables 7.3.1.1.2-8/9/10/11, if transform precoder is disabled,
dmrs-Type = 1, and maxLength = 1, and the value of rank is determined according to
the SRS resource indicator field if the higher layer parameter txConfig =
nonCodebook and according to the Precoding information and number of layers
field if the higher layer parameter txConfig = codebook;
4 bits as defined by Tables 7.3.1.1.2-12/13/14/15, if transform precoder is
disabled, dmrs-Type = 1, and maxLength = 2, and the value of rank is determined
according to the SRS resource indicator field if the higher layer parameter
txConfig = nonCodebook and according to the Precoding information and number
of layers field if the higher layer parameter txConfig = codebook;
4 bits as defined by Tables 7.3.1.1.2-16/17/18/19, if transform precoder is
disabled, dmrs-Type = 2, and maxLength = 1, and the value of rank is determined
according to the SRS resource indicator field if the higher layer parameter
txConfig = nonCodebook and according to the Precoding information and number
of layers field if the higher layer parameter txConfig = codebook;
5 bits as defined by Tables 7.3.1.1.2-20/21/22/23, if transform precoder is
disabled, dmrs-Type = 2, and maxLength = 2, and the value of rank is determined
according to the SRS resource indicator field if the higher layer parameter
txConfig = nonCodebook and according to the Precoding information and number
of layers field if the higher layer parameter txConfig = codebook.
where the number of CDM groups without data of values 1, 2, and 3 in Tables
7.3.1.1.2-6 to 7.3.1.1.2-23 refers to CDM groups {0}, {0, 1}, and {0, 1, 2} respectively.
If a UE is configured with both dmrs-UplinkForPUSCH-MappingTypeA and dmrs-
UplinkForPUSCH-MappingTypeB, the bitwidth of this field equals max $\{x_A, x_B\}$, where
$x_A$ is the "Antenna ports" bitwidth derived according to dmrs-UplinkForPUSCH-
MappingTypeA and $x_B$ is the "Antenna ports" bitwidth derived according to dmrs-
UplinkForPUSCH-MappingTypeB. A number of $|x_A - x_B|$ zeros are padded in the MSB
of this field, if the mapping type of the PUSCH corresponds to the smaller value of $x_A$
and $x_B$.
SRS request - 2 bits as defined by Table 7.3.1.1.2-24 for UEs not configured with
supplementaryUplink in SeryingCellConfig in the cell; 3 bits for UEs configured with
supplementaryUplink in SeryingCellConfig in the cell where the first bit is the non-
SUL/SUL indicator as defined in Table 7.3.1.1.1-1 and the second and third bits are
defined by Table 7.3.1.1.2-24. This bit field may also indicate the associated CSI-RS
according to Subclause 6.1.1.2 of [6, TS 38.214].
CSI request - 0, 1, 2, 3, 4, 5, or 6 bits determined by higher layer parameter
reportTriggerSize.
CBG transmission information (CBGTI) - 0 bit if higher layer parameter
codeBlockGroupTransmission for PDSCH is not configured, otherwise, 2, 4, 6, or 8
bits determined by higher layer parameter maxCodeBlockGroupsPerTransportBlock
for PUSCH.
PTRS-DMRS association - number of bits determined as follows
0 bit if PTRS-UplinkConfig is not configured and transform precoder is disabled, or
if transform precoder is enabled, or if maxRank = 1;
2 bits otherwise, where Table 7.3.1.1.2-25 and 7.3.1.1.2-26 are used to indicate
the association between PTRS port(s) and DMRS port(s) for transmission of one
PT-RS port and two PT-RS ports respectively, and the DMRS ports are indicated by
the Antenna ports field.
If "Bandwidth part indicator" field indicates a bandwidth part other than the active
bandwidth part and the "PTRS-DMRS association" field is present for the indicated
bandwidth part but not present for the active bandwidth part, the UE assumes the
"PTRS-DMRS association" field is not present for the indicated bandwidth part.
beta_offset indicator - 0 if the higher layer parameter betaOffsets = semiStatic;
otherwise 2 bits as defined by Table 9.3-3 in [5, TS 38.213].
DMRS sequence initialization - 0 bit if transform precoder is enabled; 1 bit if
transform precoder is disabled.
UL-SCH indicator - 1 bit. A value of "1" indicates UL-SCH shall be transmitted on the
PUSCH and a value of "0" indicates UL-SCH shall not be transmitted on the PUSCH.
Except for DCI format 0_1 with CRC scrambled by SP-CSI-RNTI, a UE is not expected
to receive a DCI format 0_1 with UL-SCH indicator of "0" and CSI request of all
zero(s).

DCI format 1_0 may be used as a fallback DCI that schedules a PDSCH. In this case, a CRC may be scrambled by a C-RNTI. DCI format 1_0 in which the CRC is scrambled by the C-RNTI may include, for example, information shown in Table 6 below.

TABLE 6

Identifier for DCI formats-1 bits
    The value of this bit field is always set to 1, indicating a DL DCI format
Frequency domain resource assignment-$\lceil \log_2(N_{RB}^{DL,BWP}(N_{RB}^{DL,BWP} + 1)/2) \rceil$ bits
    where $N_{RB}^{DL,BWP}$ is given by subclause 7.3.1.0
If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:
    Random Access Preamble index-6 bits according to ra-PreambleIndex in Subclause 5.1.2 of [8, TS38.321]
    UL/SUL indicator-1 bit. If the value of the "Random Access Preamble index" is not all zeros and if the UE is configured with supplementaryUplink in ServingCellConfig in the cell, this field indicates which UL carrier in the cell to transmit the PRACH according to Table 7.3.1.1-1; otherwise, this field is reserved
    SS/PBCH index-6 bits. If the value of the "Random Access Preamble index" is not all zeros, this field indicates the SS/PBCH that shall be used to determine the RACH occasion for the PRACH transmission; otherwise, this field is reserved.
    PRACH Mask index-4 bits. If the value of the "Random Access Preamble index" is not all zeros, this field indicates the RACH occasion associated with the SS/PBCH indicated by "SS/PBCH index" for the PRACH transmission, according to Subclause 5.1.1 of [8, TS38.321] ; otherwise, this field is reserved
    Reserved bits-10 bits
Otherwise, all remaining fields are set as follows:
    Time domain resource assignment-4 bits as defined in Subclause 5.1.2.1 of [6, TS 38.214]
    VRB-to-PRB mapping-1 bit according to Table 7.3.1.2.2-5
    Modulation and coding scheme-5 bits as defined in Subclause 5.1.3 of [6, TS 38.214]
    New data indicator-1 bit
    Redundancy version-2 bits as defined in Table 7.3.1.1.1-2
    HARQ process number-4 bits
    Downlink assignment index-2 bits as defined in Subclause 9.1.3 of [5, TS 38.213] , as counter DAI
    TPC command for scheduled PUCCH-2 bits as defined in Subclause 7.2.1 of [5, TS 38.213]
    PUCCH resource indicator-3 bits as defined in Subclause 9.2.3 of [5, TS 38.213]
    PDSCH-to-HARQ_feedback timing indicator-3 bits as defined in Subclause 9.2.3 of [5, TS38.213]

DCI format 1_1 may be used as a non-fallback DCI that schedules a PDSCH. In this case, a CRC may be scrambled by a C-RNTI. DCI format 1_1 in which the CRC is scrambled by the C-RNTI may include, for example, information shown in Table 7 below.

TABLE 7

Identifier for DCI formats-1 bits
    The value of this bit field is always set to 1, indicating a DL DCI format
Carrier indicator-0 or 3 bits as defined in Subclause 10.1 of [5, TS 38.213].
Bandwidth part indicator-0, 1 or 2 bits as determined by the number of DL BWPs $n_{BWP,RRC}$ configured by higher layers, excluding the initial DL bandwidth part. The bitwidth for this field is determined as $\lceil \log_2(n_{BWP}) \rceil$ bits, where
    $n_{BWP} = n_{BWP,RRC} +1$ if $n_{BWP,RRC} \leq 3$, in which case the bandwidth part indicator is equivalent to the ascending order of the higher layer parameter BWP-Id;
    otherwise $n_{BWP} = n_{BWP,RRC}$, in which case the bandwidth part indicator is defined in Table 7.3.1.1.2-1;
If a UE does not support active BWP change via DCI, the UE ignores this bit field.
Frequency domain resource assignment-number of bits determined by the following, where $N_{RB}^{DL,BWP}$ is the size of the active DL bandwidth part:
    $N_{RBG}$ bits if only resource allocation type 0 is configured, where $N_{RBG}$ is defined in Subclause 5.1.2.2.1 of [6, TS38.214],
    $\lceil \log_2(N_{RB}^{DL,BWP}(N_{RB}^{DL,BWP} + 1)/2) \rceil$ bits if only resource allocation type 1 is configured, or
    $\max(\lceil \log_2(N_{RB}^{DL,BWP}(N_{RB}^{DL,BWP} + 1)/2) \rceil, N_{RBG}) + 1$ bits if both resource allocation type 0 and 1 are configured.
    If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
    For resource allocation type 0, the $N_{RBG}$ LSBs provide the resource allocation as

TABLE 7-continued defined in Subclause 5.1.2.2.1 of [6, TS 38.214].
For resource allocation type 1, the $\lceil \log_2(N_{RB}^{DL,BWP}(N_{RB}^{DL,BWP} + 1)/2) \rceil$ LSBs
provide the resource allocation as defined in Subclause 5.1.2.2.2 of [6, TS 38.214]
If "Bandwidth part indicator" field indicates a bandwidth part other than the active
bandwidth part and if both resource allocation type 0 and 1 are configured for the
indicated bandwidth part, the UE assumes resource allocation type 0 for the
indicated bandwidth part if the bitwidth of the "Frequency domain resource
assignment" field of the active bandwidth part is smaller than the bitwidth of the
"Frequency domain resource assignment" field of the indicated bandwidth part.
Time domain resource assignment-0, 1, 2, 3, or 4 bits as defined in Subclause
5.1.2.1 of [6, TS 38.214]. The bitwidth for this field is determined as $\lceil \log_2(I) \rceil$ bits,
where I is the number of entries in the higher layer parameter pdsch-
TimeDomainAllocationList if the higher layer parameter is configured; otherwise I is
the number of entries in the default table.
VRB-to-PRB mapping-0 or 1 bit:
  0 bit if only resource allocation type 0 is configured or if interleaved VRB-to-PRB
  mapping is not configured by high layers;
  1 bit according to Table 7.3.1.2.2-5 otherwise, only applicable to resource
  allocation type 1, as defined in Subclause 7.3.1.6 of [4, TS 38.211].
PRB bundling size indicator-0 bit if the higher layer parameter prb-BundlingType is
not configured or is set to 'static', or 1 bit if the higher layer parameter prb-
BundlingType is set to 'dynamic' according to Subclause 5.1.2.3 of [6, TS 38.214].
Rate matching indicator-0, 1, or 2 bits according to higher layer parameters
rateMatchPatternGroup1 and rateMatchPatternGroup2, where the MSB is used to
indicate rateMatchPatternGroup1 and the LSB is used to indicate
rateMatchPatternGroup2 when there are two groups.
ZP CSI-RS trigger-0, 1, or 2 bits as defined in Subclause 5.1.4.2 of [6, TS 38.214].
The bitwidth for this field is determined as $\lceil \log_2(n_{ZP} + 1) \rceil$ bits, where $n_{zp}$ is the
number of aperiodic ZP CSI-RS resource sets configured by higher layer.
For transport block 1:
  Modulation and coding scheme-5 bits as defined in Subclause 5.1.3.1 of [6, TS
  38.214]
  New data indicator-1 bit
  Redundancy version-2 bits as defined in Table 7.3.1.1.1-2
For transport block 2 (only present if maxNrofCodeWordsScheduledByDCI equals 2):
  Modulation and coding scheme-5 bits as defined in Subclause 5.1.3.1 of [6, TS
  38.214]
  New data indicator-1 bit
  Redundancy version-2 bits as defined in Table 7.3.1.1.1-2
If "Bandwidth part indicator" field indicates a bandwidth part other than the active
bandwidth part and the value of maxNrofCodeWordsScheduledByDCI for the
indicated bandwidth part equals 2 and the value of
maxNrofCodeWordsScheduledByDCI for the active bandwidth part equals 1, the UE
assumes zeros are padded when interpreting the "Modulation and coding scheme",
"New data indicator", and "Redundancy version" fields of transport block 2
according to Subclause 12 of [5, TS38.213], and the UE ignores the "Modulation and
coding scheme", "New data indicator", and "Redundancy version" fields of transport
block 2 for the indicated bandwidth part.
HARQ process number-4 bits
Downlink assignment index-number of bits as defined in the following
  4 bits if more than one serving cell are configured in the DL and the higher layer
  parameter pdsch-HARQ-ACK-Codebook = dynamic, where the 2 MSB bits are the
  counter DAI and the 2 LSB bits are the total DAI;
  2 bits if only one serving cell is configured in the DL and the higher layer
  parameter pdsch-HARQ-ACK-Codebook = dynamic, where the 2 bits are the
  counter DAI;
  0 bits otherwise.
TPC command for scheduled PUCCH-2 bits as defined in Subclause 7.2.1 of [5, TS
38.213]
PUCCH resource indicator-3 bits as defined in Subclause 9.2.3 of [5, TS 38.213]
PDSCH-to-HARQ_feedback timing indicator-0, 1, 2, or 3 bits as defined in
Subclause 9.2.3 of [5, TS 38.213]. The bitwidth for this field is determined as $\lceil \log_2(I) \rceil$
bits, where I is the number of entries in the higher layer parameter dl-DataToUL-
ACK.
Antenna port(s)-4, 5, or 6 bits as defined by Tables 7.3.1.2.2-1/2/3/4, where the
number of CDM groups without data of values 1,2, and 3 refers to CDM groups {0}
{0,1}, and {0, 1,2} respectively. The antenna ports $\{p_0,...p_{v-1}\}$ shall be determined
according to the ordering of DMRS port(s) given by Tables 7.3.1.2.2-1/2/3/4.
If a UE is configured with both dmrs-DownlinkForPDSCH-MappingTypeA and dmrs-
DownlinkForPDSCH-MappingTypeB, the bitwidth of this field equals max$\{x_A, x_B\}$,
where $x_A$ is the "Antenna ports" bitwidth derived according to dmrs-
DownlinkForPDSCH-MappingTypeA and $x_B$ is the "Antenna ports" bitwidth derived
according to dmrs-DownlinkForPDSCH-MappingTypeB. A number of $|x_A - x_B|$ zeros
are padded in the MSB of this field, if the mapping type of the PDSCH corresponds
to the smaller value of $x_A$ and $x_B$.
Transmission configuration indication-0 bit if higher layer parameter tci-
PresentInDCI is not enabled; otherwise 3 bits as defined in Subclause 5.1.5 of [6,
TS38.214].
If "Bandwidth part indicator" field indicates a bandwidth part other than the active
bandwidth part, TABLE 7-continued if the higher layer parameter tci-PresentInDCI is not enabled for the CORESET
used for the PDCCH carrying the DCI format 1_1,
   the UE assumes tci-PresentInDCI is not enabled for all CORESETs in the
   indicated bandwidth part;
otherwise,
   the UE assumes tci-PresentInDCI is enabled for all CORESETs in the indicated
   bandwidth part.
SRS request-2 bits as defined by Table 7.3.1.1.2-24 for UEs not configured with
supplementaryUplink in SeryingCellConfig in the cell; 3 bits for UEs configured with
supplementaryUplink in ServingCellConfig in the cell where the first bit is the non-
SUL/SUL indicator as defined in Table 7.3.1.1.1-1 and the second and third bits are
defined by Table 7.3.1.1.2-24. This bit field may also indicate the associated CSI-RS
according to Subclause 6.1.1.2 of [6, TS 38.214].
CBG transmission information (CBGTI)-0 bit if higher layer parameter
codeBlockGroup Transmission for PDSCH is not configured, otherwise, 2, 4, 6, or 8
bits as defined in Subclause 5.1.7 of [6, TS38.214], determined by the higher layer
parameters maxCodeBlockGroupsPerTransportBlock and
maxNrofCodeWordsScheduledByDCI for the PDSCH.
CBG flushing out information (CBGFI)-1 bit if higher layer parameter
codeBlockGroupFlushIndicator is configured as "TRUE", 0 bit otherwise.
DMRS sequence initialization-1 bit.

Hereinafter, a method of assigning time domain resources for a data channel in a 5G communication system will be described.

The base station 110 may configure a table of time domain resource assignment information for the PDSCH and the PUSCH for the UE 120 through higher layer signaling (e.g., RRC signaling). A table including maxNrofDL-Allocations=16 entries may be configured for the PDSCH, and a table including maxNrofUL-Allocations=16 entries may be configured for the PUSCH. The time domain resource assignment information may include, for example, a PDCCH-to-PDSCH slot timing (K0) (corresponding to a time interval in slot units between a time point when the PDCCH is received and a time point when the PDSCH scheduled by the received PDCCH is transmitted) or a PDCCH-to-PUSCH slot timing (K2) (corresponding to a time interval in slot units between a time point when the PDCCH is received and a time point when the PUSCH scheduled by the received PDCCH is transmitted), information about a position and a length of a start symbol in which the PDSCH or the PUSCH is scheduled in the slot, and a PDSCH or PUSCH mapping type. For example, information as shown in Tables 8 and 9 below may be notified from the base station 110 to the UE 120.

TABLE 8

PDSCH-TimeDomainResourceAllocationList information element

PDSCH-TimeDomainResourceAllocationList ::= SEQUENCE (SIZE(1..maxNrofDL-Allocations)) OF PDSCH-TimeDomainResourceAllocation
PDSCH-TimeDomainResouroeAllocation ::= SEQUENCE {
   k0                                                                         INTEGER(0..32)
OPTIONAL,  -- Need S
   (PDCCH-to-PDSCH timing, slot unit)
mappingType                          ENUMERATED {typeA, typeB},
   (PDSCH mapping type)
startSymbolAndLength            INTEGER (0..127)
(start symbol and length of PDSCH)
}

TABLE 9

PUSCH-TimeDomainResourceAllocation information element

PUSCH-TimeDomainResourceAllocationList ::= SEQUENCE (SIZE(1..maxNrofUL-Allocations)) OF PUSCH-TimeDomainResourceAllocation
PUSCH-TimeDomainResourceAllocation ::= SEQUENCE {
   k2                                          INTEGER(0..32)       OPTIONAL,
-- Need S
   (PDCCH-to-PUSCH timing, slot unit)
   mappingType                       ENUMERATED {typeA, typeB},
   (PUSCH mapping type)
   startSymbolAndLength         INTEGER (0..127)
   (start symbol and length of PUSCH)
}

The base station 110 may notify the UE 120 of one of the entries in the table of the time domain resource assignment information through L1 signaling (e.g., DCI) (for example, it may be indicated by a "time domain resource assignment" field in the DCI). The UE 120 may obtain time domain resource assignment information for the PDSCH or the PUSCH based on the DCI received from the base station 110.

Hereinafter, a method of assigning frequency domain resources for a data channel in a 5G communication system will be described.

In 5G, two types (i.e., resource allocation type 0 and resource allocation type 1) are supported as a method of indicating frequency domain resource allocation information for a PDSCH and a PUSCH.

Resource Allocation Type 0

RB allocation information may be notified from the base station 110 to the UE 120 in the form of a bitmap for a resource block group (RBG). At this time, the RBG may include a set of consecutive virtual RBs (VRBs), and the size P of the RBG may be determined based on a value set as a higher layer parameter (rbg-Size) and a BWP size value defined in Table 10 below. As an example, Table 10 is a table for a nominal RBG size P.

TABLE 10

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The total number NRBG of RBGs of BWP i having a size of $N_{BWP,i}^{size}$ may be defined as follows.

$$N_{RBG} = \lceil (N_{BWP,i}^{size} + (N_{BWP,i}^{start} \bmod P))/P \rceil, \text{ where}$$

the size of the first RBG is $RBG_0^{size} = P - N_{BWP,i}^{start} \bmod P$,
the size of the last RBG is $RBG_{last}^{size} = (N_{BWP,i}^{start} + N_{BWP,i}^{size}) \bmod P$ if $(N_{BWP,i}^{start} + N_{BWP,i}^{size}) \bmod P > 0$ and P otherwise, the size of all other RBGs is P.

Each bit of the bitmap having an $N_{RBG}$ bit size may correspond to each RBG. RBGs may be indexed in the order of increasing frequency, starting from the lowest frequency position of the BWP. For $N_{RBG}$ RBGs in the BWP, RBG#0 to RBG#($N_{RBG}-1$) may be mapped from the most significant bit (MSB) to the least significant bit (LSB) of the RBG bitmap. When a specific bit value in the bitmap is 1, the UE 120 may determine that the RBG corresponding to the bit value is allocated, and when a specific bit value in the bitmap is 0, the UE 120 may determine that the RBG corresponding to the bit value is not allocated.

Resource Allocation Type 1

RB allocation information may be notified from the base station 110 to the UE 120 as information about the start position and length of the consecutively allocated VRBs. In this case, interleaving or non-interleaving may be additionally applied to the consecutively allocated VRBs. The resource allocation field of resource allocation type 1 may include a resource indication value (RIV), and the RIV may include a start point ($RB_{start}$) of the VRB and a length ($L_{RBS}$) of the consecutively allocated RB. More specifically, the RIV in the BWP having a size of $N_{BWP}^{size}$ may be defined as follows.

If $(L_{RBs}-1) \le \lfloor N_{BWP}^{size}/2 \rfloor$, $RIV = N_{BWP}^{size}(L_{RBs}-1) + RB_{start}$, if not, $RIV = N_{BWP}^{size}(N_{BWP}^{size} - L_{RBs} + 1) + (N_{BWP}^{size} - 1 - RB_{start})$. LRBs≥1 and LRBs shall not exceed $N_{BWP}^{size} - RB_{start}$.

(if $(L_{RBs}-1) \le \lfloor N_{BWP}^{size}/2 \rfloor$ then
$RIV = N_{BWP}^{size}(L_{RBs}-1) + RB_{start}$
else
$RIV = N_{BWP}^{size}(N_{BWP}^{size} - L_{RBs} + 1) + (N_{BWP}^{size} - 1 - RB_{start})$
Where LRBs≥1 and shall not exceed $N_{BWP}^{size} - RB_{start}$.)

The base station 110 may configure the resource allocation type for the UE 120 through higher layer signaling (for example, the higher layer parameter resourceAllocation may be configured to one of resourceAllocationType0, resourceAllocationType1, and dynamicSwitch). When the UE 120 is configured with both resource allocation types 0 and 1 (or when the higher layer parameter resourceAllocation is configured as dynamicSwitch), whether the bit corresponding to the MSB of the field indicating resource allocation in the DCI format indicating scheduling is resource allocation type 0 or resource allocation type 1 may be indicated, and resource allocation information may be indicated through bits other than the bit corresponding to the MSB based on the indicated resource allocation type. The UE 120 may interpret the resource allocation field information of the DCI field based on the indicated information. When the UE 120 is configured with either resource allocation type 0 or resource allocation type 1 (or when the higher layer parameter resourceAllocation is configured as either resourceAllocationType0 or resourceAllocationType1), resource allocation information may be indicated based on the resource allocation type in which the field indicating resource allocation in the DCI format indicating scheduling is configured, and the UE 120 may interpret the resource allocation field information of the DCI field based on the indicated information.

Hereinafter, a downlink control channel in a 5G communication system will be described in more detail with reference to the accompanying drawings.

Figure 8:
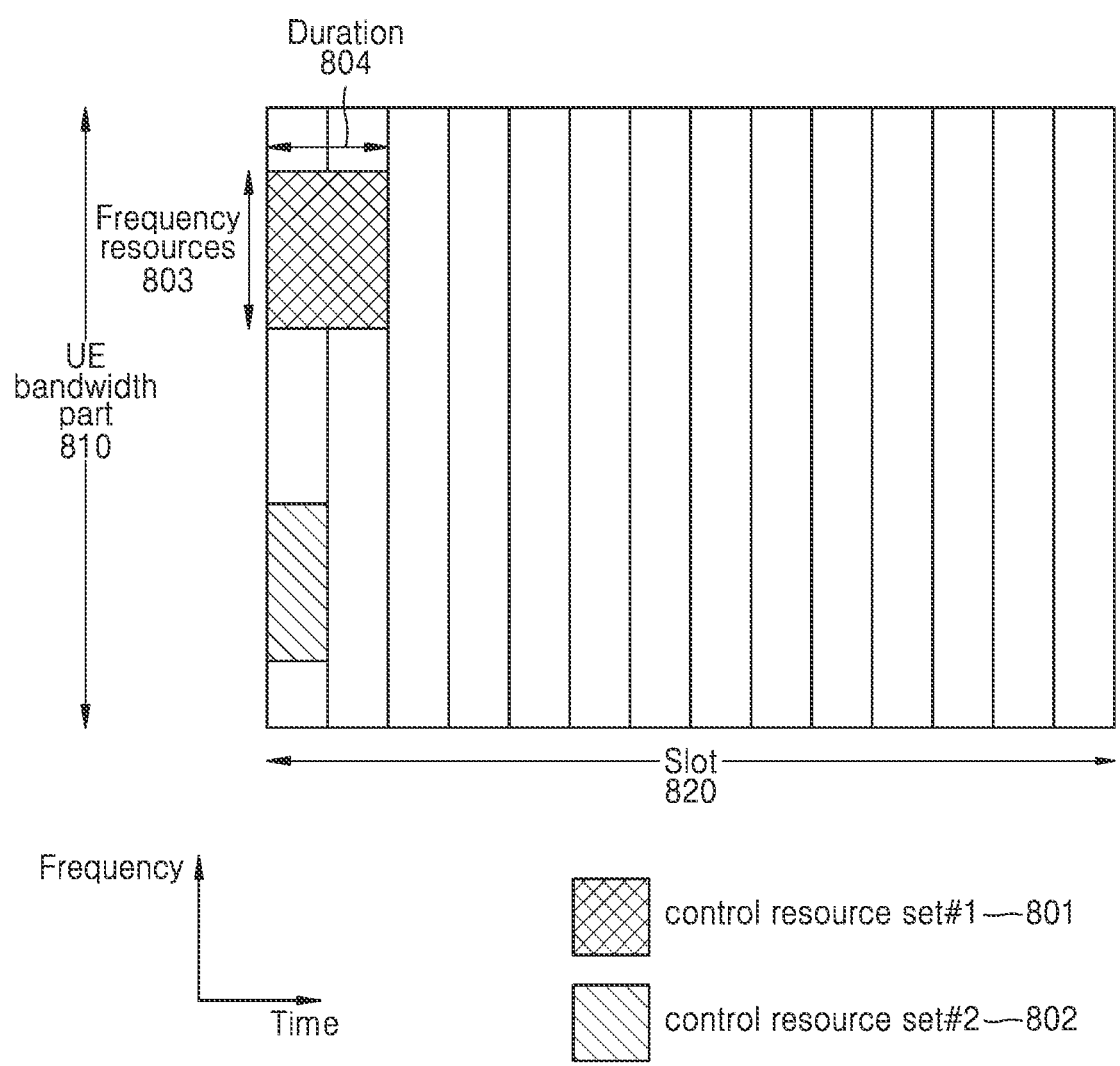
FIG. 8 illustrates a structure of a control resource set in a wireless communication system, according to an embodiment of the disclosure.

FIG. 8 illustrates a structure of a control resource set in a wireless communication system, according to an embodiment of the disclosure.

Specifically, FIG. 8 illustrates an example of a control resource set in which a downlink control channel is transmitted in a 5G wireless communication system, according to an embodiment of the disclosure. FIG. 8 illustrates an example in which a UE BWP 810 is configured on a frequency domain and two control resource sets (control resource set #1 801 and control resource set #2 802) are configured in one slot 820 on a time domain. The control resource sets 801 and 802 may be configured for a specific frequency resource 803 entirely within the UE BWP 810 on the frequency domain. One or more OFDM symbols may be configured on the time domain and may be defined as a control resource set duration 804.

Referring to FIG. 8, the control resource set #1 801 is configured with the control resource set duration of two symbols, and the control resource set #2 802 is configured with the control resource set duration of one symbol.

The base station 110 may configure the control resource set of the 5G for the UE 120 through higher layer signaling (e.g., SI, MIB, or RRC signaling). Configuring the control resource set to the UE 120 may mean providing information such as a control resource set identity, a frequency position of the control resource set, or a symbol duration of the control resource set. For example, the following information shown in Table 11 may be included.

TABLE 11

```
ControlResourceSet ::=                           SEQUENCE {
    -- Corresponds to L1 parameter 'CORESET-ID'
    controlResourceSetId
    ControlResourceSetId,
    (Control Resource Set Identity))
        frequencyDomainResources          BIT STRING (SIZE (45)),
    (Frequency domain resources allocation information)
        duration                                 INTEGER
(1..maxCoReSetDuration),
    (Time domain resources allocation information)
        cce-REG -MappingType                     CHOICE {
    (CCE-to-REG mapping type)
            interleaved
    SEQUENCE {
                    reg-BundleSize
        ENUMERATED {n2, n3, n6},
        (REG bundle size)
                    precoderGranularity
        ENUMERATED {sameAsREG-bundle, allContiguousRBs},
                    interleaverSize
        ENUMERATED {n2, n3, n6}
                    (interleaver size)
                    shiftIndex
        INTEGER(0..maxNrofPhysicalResourceBlocks-1)
                                OPTIONAL
                (interleaver shift)
    },
    nonInterleaved                               NULL
    },
    tci-StatesPDCCH
    SEQUENCE(SIZE (1..maxNrofTCI-StatesPDCCH)) OF TCI-StateId
                    OPTIONAL,
    (QCL configuration information)
        tci-PresentInDCI                     ENUMERATED
{enabled}
                OPTIONAL,      -- Need S
}
```

In Table 11, tci-StatesPDCCH (simply referred to as transmission configuration indication (TCI) state) configuration information may include information about one or more SS/PBCH block indices having a QCL relationship with a DMRS transmitted in the corresponding control resource set or a channel state information reference signal (CSI-RS) index.

Figure 9:
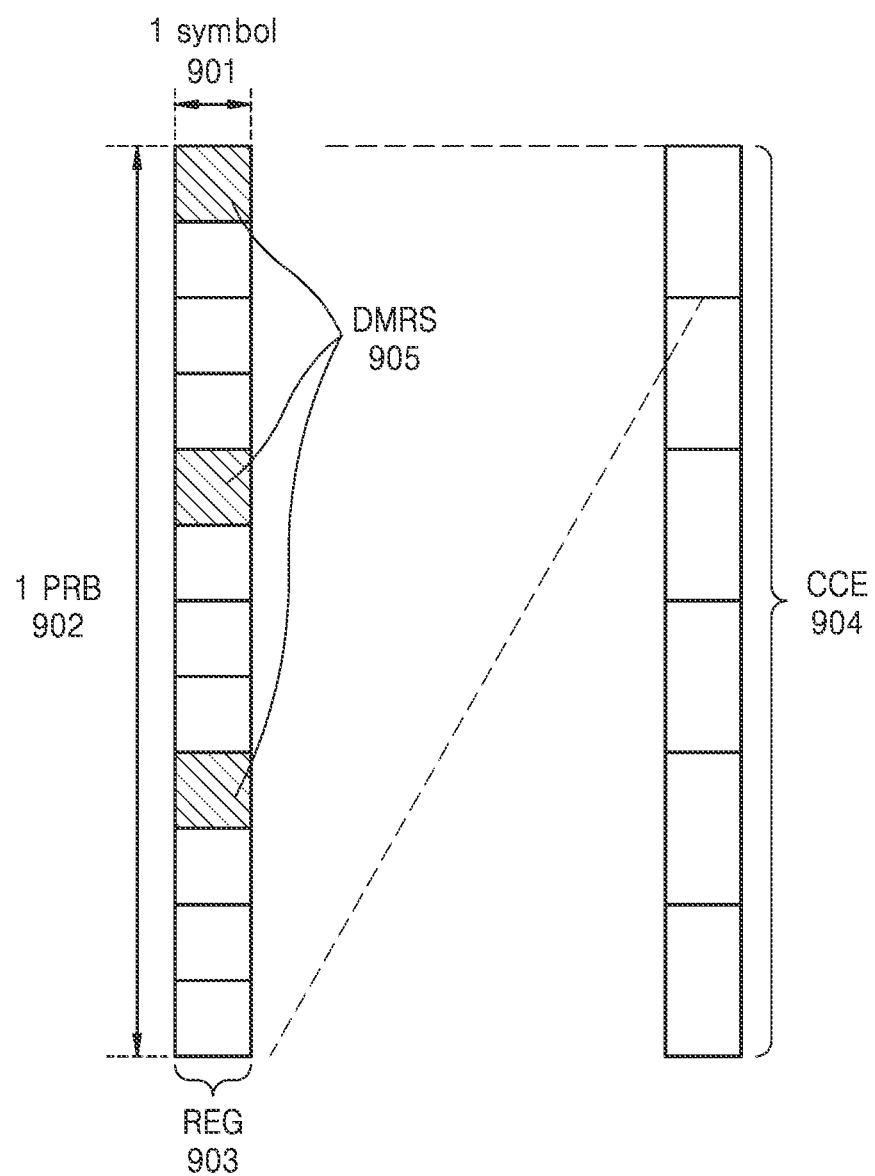
FIG. 9 illustrates a resource structure in a wireless communication system, according to an embodiment of the disclosure.

FIG. 9 illustrates a resource structure in a wireless communication system, according to an embodiment of the disclosure.

Specifically, FIG. 9 illustrates an example of a basic unit of time and frequency resources constituting a downlink control channel that is usable in 5G.

Referring to FIG. 9, the basic unit of time and frequency resources constituting the control channel may be referred to as a resource element group (REG) 903. The REG 903 may be defined as one OFDM symbol 901 on a time domain and one physical resource block (PRB) 902, that is, 12 subcarriers, on a frequency domain. The base station may configure a downlink control channel allocation unit by concatenating the REG 903.

Referring to FIG. 9, when the basic unit to which the downlink control channel is assigned in 5G is a control channel element (CCE) 904, one CCE 904 may include a plurality of REGs 903. In the example illustrated in FIG. 9, when the REG 903 includes 12 REs and one CCE 904 includes 6 REGs 903, one CCE 903 may include 72 REs. When the downlink control resource set is configured, the downlink control resource set may include a plurality of CCEs 904. A specific downlink control channel may be transmitted by being mapped to one or more CCEs 904 according to an aggregation level (AL) in the control resource set. The CCEs 904 in the control resource set may be identified by numbers. In this case, the numbers may be assigned to the CCEs 904 according to a logical mapping scheme.

Referring to FIG. 9, the basic unit of the downlink control channel, that is, the REG 903, may include both of REs to which the DCI is mapped and regions to which the DMRS 905, which is a reference signal for decoding the same, is mapped. As illustrated in FIG. 9, three DMRSs 905 may be transmitted in one REG 903. The number of CCEs required to transmit the PDCCH may be 1, 2, 4, 8, or 16 according to the AL, and a different number of CCEs may be used to implement link adaptation of the downlink control channel. For example, when AL=L, one downlink control channel may be transmitted through L CCEs. The UE has to detect a signal in a state in which the UE has not determined information about the downlink control channel. A search space representing a set of CCEs may be used for blind decoding. The search space is a set of downlink control channel candidates including CCEs that the UE has to attempt to decode on a given AL. Because there are various ALs that make 1, 2, 4, 8, or 16 CCEs into one bundle, the UE may have a plurality of search spaces. A search space set may be defined as a set of search spaces at all set ALs.

The search space may be classified into a common search space and a UE-specific search space. A certain group of UEs or all the UEs may detect the common search space of the PDCCH in order to receive cell-common control information such as a paging message or dynamic scheduling for system information. For example, PDSCH scheduling allocation information for transmission of SIB including cell operator information and the like may be received by detecting the common search space of the PDCCH. The common search space may be defined as a set of previously appointed CCEs because a certain group of UEs or all the UEs have to receive the PDCCH. The UE may receive the UE-specific PDSCH or PUSCH scheduling allocation information by detecting the UE-specific search space of the PDCCH. The UE-specific search space is a function of the UE ID and various system parameters, and may be defined in a UE-specific manner.

In 5G, a parameter for the search space of the PDCCH may be configured from the base station to the UE by higher layer signaling (e.g., SIB, MIB, RRC signaling, etc.). For example, the base station may set, to the UE, the number of PDCCH candidates at each AL L, a monitoring periodicity for the search space, monitoring occasion of symbol units in the slot for the search space, a search space type (common search space or UE-specific search space), a combination of RNTI and DCI format to be monitored in the search space, a control resource set index for monitoring the search space, etc. For example, the parameters for the search space for the PDCCH may include the information shown in Table 12 below.

TABLE 12

```
SearchSpace ::=                                          SEQUENCE {
    -- Identity of the search space. SearchSpaceId = 0 identifies the
SearchSpace configured via PSCH (MIB) or ServingCellConfigCommon.
    searchSpaceId                                        SearchSpaceId,
    (search space ID)
    controlResourceSetId
    ControlRescurceSetId,
    (control resource set ID)
    monitoringSlotPeriodicityAndOffset                   CHOICE {
    (monitoring slot periodicity and offset)
        sl1
        NULL,
        sl2
        INTEGER (0..1),
        sl4
        INTEGER (0..3),
        sl5
        INTEGER (0..4),
        sl8
        INTEGER (0..7),
        sl10
        INTEGER (0..9),
        sl16
        INTEGER (0..15),
        sl20
        INTEGER (0..19)
    }
                                                         OPTIONAL,
    duration(monitoring length)                INTEGER (2..2559)
    monitoringSymbolsWithinSlot                                    BIT  STRING
(SIZE (14))
        OPTIONAL,
    (monitoring symbols within slot)
    nrofCandidates                                       SEQUENCE {
    (number of PDCCH candidates per aggretation level)
        aggregationLevel1                                ENUMERATED
{n0, n1, n2, n3, n4, n5, n6, n8},
        aggregationLevel2                                ENUMERATED
{n0, n1, n2, n3, n4, n5, n6, n8},
        aggregationLevel4                                ENUMERATED
{n0, n1, n2, n3, n4, n5, n6, n8},
        aggregationLevel8                                ENUMERATED
{n0, n1, n2, n3, n4, n5, n6, n8},
        aggregationLevel16                               ENUMERATED
{n0, n1, n2, n3, n4, n5, n6, n8}
    },
    searchSpaceType                                      CHOICE {
    (search space type)
        -- Configures this search space as common search space (CSS) and
DCI formats to monitor.
        common
        SEQUENCE {
        (common search space)
        }
        ue-Specific
        SEQUENCE {
        (UE-specific search space)
                -- Indicates whether the UE monitors in this USS for DCI
formats 0-0 and 1-0 or for formats 0-1 and 1-1.
            formats
            ENUMERATED {formats0-0-And-1-0, formats0-1-And-1-1},
            . . .
        }
```

The base station 110 may configure one or more search space sets for the UE 120 according to configuration information. According to an embodiment of the disclosure, the base station 110 may configure search space set 1 and search space set 2 for the UE 120, may configure DCI format A scrambled by an X-RNTI in the search space set 1 to be monitored in the common search space, and may configure DCI format B scrambled by a Y-RNTI in the search space set 2 to be monitored in the UE-specific search space.

According to the configuration information, one or more search space sets may be present in the common search space or the UE-specific search space. For example, search space set #1 and search space set #2 may be configured as the common search space, and search space set #3 and search space set #4 may be configured as the UE-specific search space.

The combination of the following DCI format and RNTI may be monitored in the common search space. Of course, various embodiments of the disclosure are not limited to the following examples.

DCI format 0_0/1_0 with CRC scrambled by C-RNTI, CS-RNTI, MCS-C-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI The combination of the following DCI format and RNTI may be monitored in the UE-specific search space. Of course, various embodiments of the disclosure are not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs specified above may follow the following definitions and usages.

C-RNTI (Cell RNTI): For UE-specific PDSCH scheduling

MCS-C-RNTI (Modulation Coding Scheme C-RNTI): For UE-specific PDSCH scheduling

TC-RNTI (Temporary Cell RNTI): For UE-specific PDSCH scheduling

CS-RNTI (Configured Scheduling RNTI): For semi-statically configured UE-specific PDSCH scheduling RA-RNTI (Random Access RNTI): For PDSCH scheduling in random access phase P-RNTI (Paging RNTI): For PDSCH scheduling for transmitting paging SI-RNTI (System Information RNTI): For PDSCH scheduling for transmitting system information INT-RNTI (Interruption RNTI): For notifying whether PDSCH is punctured TPC-PUSCH-RNTI (Transmit Power Control for PUSCH RNTI): For indicating power control command for PUSCH TPC-PUCCH-RNTI (Transmit Power Control for PUCCH RNTI): For indicating power control command for PUCCH TPC-SRS-RNTI (Transmit Power Control for SRS RNTI): For indicating power control command for SRS The DCI formats specified above may follow the definitions shown in Table 13.

TABLE 13

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the AL L in the control resource set p and the search space set s may be represented by the following equation.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p} / L \rfloor \right\} + i \qquad \text{Equation 1}$$

L: Aggregation level $n_{CI}$: Carrier index $N_{CCE,p}$: Total number of CCEs existing within control resource set p $n_{s,f}^{\mu}$: Slot index $M_{p,s,max}^{(L)}$: Number of PDCCH candidate groups of aggregation level L $m_{s,nCI}=0, \ldots, M_{p,s,max}^{(L)}-1$: PDCCH candidate group index of aggregation level L $i=0, \ldots, L-1$ $Y_{p,n_{s,f}^{\mu}} = (A_p \cdot Y_{p,n_{s,f}-1^{\mu}}) \mod D$, $Y_{p,-1}=n_{RNTI} \neq 0$, $A_0=39827$, $A_1=39829$, $A_2=39839$, $D=65537$ $n_{RNTI}$: UE ID The Y_(p,n$^{\mu}_{s,f}$) value may correspond to 0 in the case of the common search space.

The Y_(p,n$^{\mu}_{s,f}$) value may correspond to a value that changes according to the UE identity (C-RNTI or ID that the base station sets for the UE) and the time index in the case of the UE-specific search space.

Figure 10:
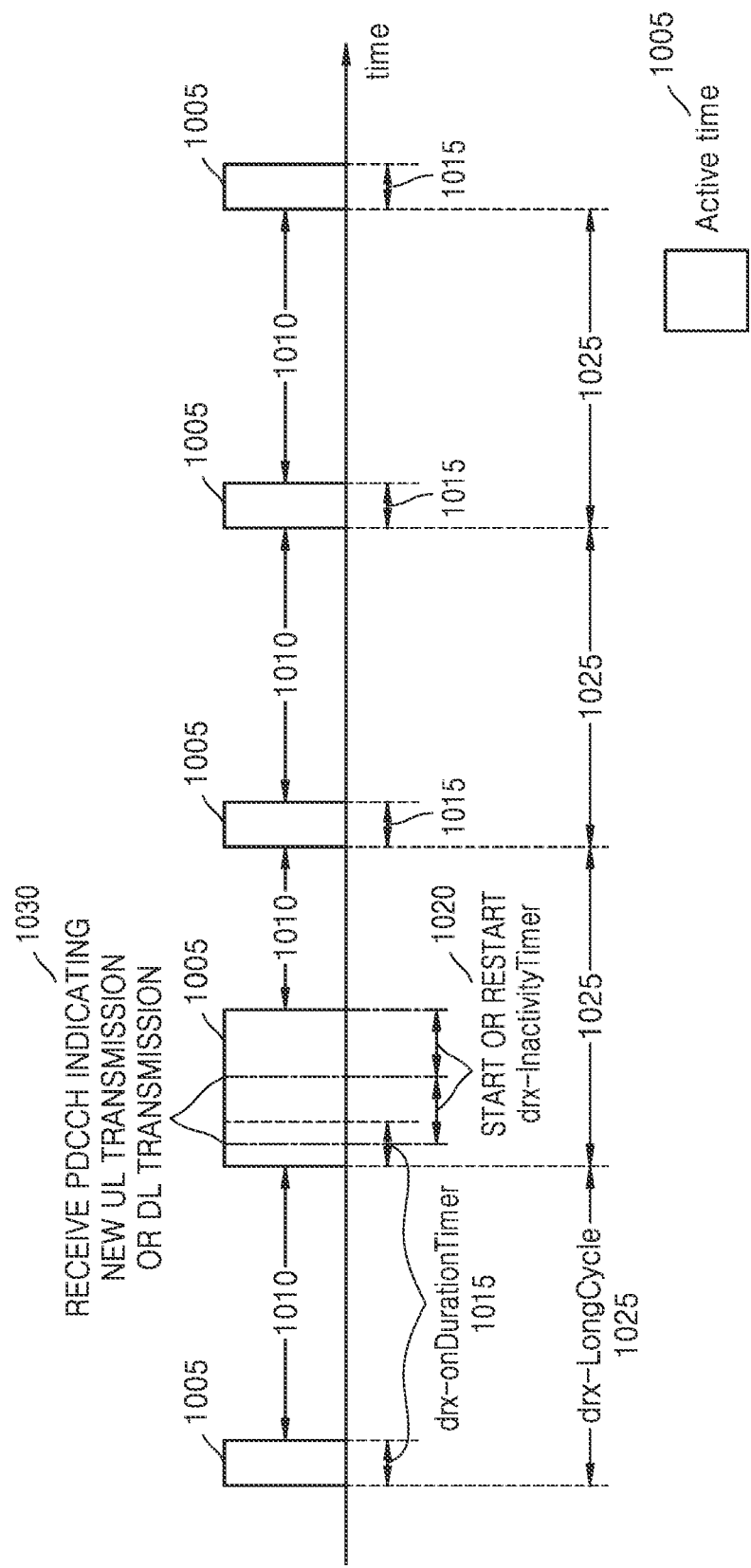
FIG. 10 illustrates a discontinuous reception (DRX) process in a wireless communication system, according to an embodiment of the disclosure.

FIG. 10 illustrates a discontinuous reception (DRX) process in a wireless communication system, according to an embodiment of the disclosure. Specifically, FIG. 10 is a diagram for describing DRX.

The DRX is an operation in which the UE using a service discontinuously receives data in an RRC connected state in which a radio link is established between the base station and the UE. When the DRX is applied, the UE turns on a receiver at a specific time to monitor the control channel. When no data is received for a certain periodicity, the UE turns off the receiver to reduce power consumption. The DRX operation may be controlled by a media access control (MAC) layer based on various parameters and a timer.

Referring to FIG. 10, an active time 1005 may refer to a time for which the UE wakes up every DRX cycle to monitor the PDCCH. The active time 1005 may be defined as follows.

drx-onDurationTimer or drx-InactivityTimer or drx-RetransmissionTimerDL or drx-RetransmissionTimerUL or ra-ContentionResolutionTimer is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

drx-onDurationTimer, drx-InactivityTimer, drx-RetransmissionTimerDL, drx-RetransmissionTimerUL, ra-ContentionResolutionTimer, and the like are timers, the values of which are set by the base station, and have a function of configuring the UE to monitor the PDCCH when a certain condition is satisfied.

A drx-onDurationTimer 1015 is a parameter for setting a minimum time for which the UE is awake in the DRX cycle. A drx-InactivityTimer 1020 is a parameter for setting a time for which the UE is additionally awake when receiving a PDCCH indicating new UL transmission or DL transmission (1030). A drx-RetransmissionTimerDL is a parameter for setting a maximum time for which the UE is awake in order to receive DL retransmission in a DL HARQ procedure. A drx-RetransmissionTimerUL is a parameter for setting a maximum time for which the UE is awake in order to receive a UL retransmission grant in a UL HARQ procedure. The drx-onDurationTimer 1015, the drx-InactivityTimer 1020, the drx-RetransmissionTimerDL, and the drx-RetransmissionTimerUL may be configured as, for example, time, the number of subframes, the number of slots, and the like. An ra-ContentionResolutionTimer is a parameter for monitoring a PDCCH in a random access procedure.

An inactive time 1010 may refer to a time configured not to monitor a PDCCH and/or a time configured not to receive a PDCCH during a DRX operation. For example, the inactive time 1010 may refer to the remaining time excluding the active time 1005 from the total time for which the UE performs the DRX operation. When the UE does not monitor the PDCCH for the active time 1005, the UE may enter a sleep or inactive state to reduce power consumption.

The DRX cycle may refer to a cycle during which the UE wakes up and monitors the PDCCH. That is, the DRX cycle may refer to an on-duration generation cycle or a time interval until the UE monitors a next PDCCH after monitoring a PDCCH. There are two types of DRX cycles, that is, a short DRX cycle and a long DRX cycle. The short DRX cycle may be optionally applied.

The long DRX cycle 1025 is a longer DRX cycle among two DRX cycles configured for the UE. While the UE is operating in the long DRX cycle, the UE may start the drx-onDurationTimer 1015 when the long DRX cycle 1025 elapses from a start point (e.g., a start symbol) of the drx-onDurationTimer 1015. When the UE operates in the long DRX cycle 1025, the UE may start the drx-onDurationTimer 1015 in a slot after drx-SlotOffset in a subframe satisfying Equation 2 below. drx-SlotOffset refers to a delay before starting the drx-onDurationTimer 1015. drx-SlotOffset may be configured as, for example, time, the number of slots, and the like.

$$[(SFN \times 10) + \text{subframe number}] \text{ modulo } (drx\text{-Long-Cycle}) = drx\text{-StartOffset} \quad \text{Equation 2}$$

In this case, drx-LongCycleStartOffset may include the long DRX cycle 1025 and the drx-StartOffset, and may be used to define a subframe to start the long DRX cycle 1025. drx-LongCycleStartOffset may be configured as, for example, time, the number of subframes, the number of slots, and the like.

The short DRX cycle is a shorter DRX cycle among two DRX cycles defined for the UE. The UE may start or restart the drx-InactivityTimer 1020 when a certain event occurs (for example, when a PDCCH indicating new UL transmission or DL transmission is received (1030), etc.) in the active time 1005 while the UE is operating in the long DRX cycle 1025. In this case, when the drx-InactivityTimer 1020 expires or when a DRX command MAC CE is received, the UE may operate in the short DRX cycle. For example, in FIG. 10, the UE starts drx-ShortCycleTimer at the expiration time of the previous drx-onDurationTimer 1015 or the drx-InactivityTimer 1020, the UE may operate in the short DRX cycle until drx-ShortCycleTimer expires. When the UE receives a PDCCH indicating new UL transmission or DL transmission (1030), the UE may extend the active time 1005 or delay the arrival of the inactive time 1010 in anticipation of additional UL or DL transmission in the future. The UE starts the drx-onDurationTimer 1015 again when the short DRX cycle has elapsed from the start point of the previous On duration while the UE is operating in the short DRX cycle. When the drx-ShortCycleTimer expires, the UE operates again in the long DRX cycle 1025.

When the UE operates in the short DRX cycle, the UE may start the drx-onDurationTimer 1015 after drx-SlotOffset in a subframe satisfying Equation 3 below. drx-SlotOffset refers to a delay before starting the drx-onDurationTimer 1015. drx-SlotOffset may be configured as, for example, time, the number of slots, and the like.

$$[(SFN \times 10) + \text{subframe number}] \text{ modulo } (drx\text{-ShortCycle}) = (drx\text{-StartOffset}) \text{ modulo } (drx\text{-ShortCycle}) \quad \text{Equation 3}$$

drx-ShortCycle and drx-StartOffset may be used to define a subframe to start the short DRX cycle. drx-ShortCycle and drx-StartOffset may be configured as, for example, time, the number of subframes, the number of slots, and the like.

The DRX operation has been described with reference to FIG. 10. According to an embodiment of the disclosure, the UE may reduce power consumption by performing the DRX operation. However, even when the UE performs the DRX operation, the UE does not always receive the PDCCH associated with the UE in the active time 1005. Therefore, in an embodiment of the disclosure, a signal for controlling the operation of the UE may be provided in order to more efficiently save the power of the UE.

Hereinafter, the carrier aggregation and scheduling method in a 5G communication system will be described in detail.

The UE 120 may access a primary cell through initial access, and the base station 110 may additionally configure one or more secondary cells for the UE 120. The UE 120 may perform communication through serving cells including the primary cell and secondary cells configured by the base station 110.

The base station 110 may additionally configure whether to perform cross-carrier scheduling on cells configured for the UE 120. For convenience of explanation, when the cross-carrier scheduling is configured, cells that perform scheduling (that is, cells that receive DCI corresponding to DL assignment or UL grant) are collectively referred to as "first cells," and cells on which scheduling is performed (that is, cells in which DL or UL data is actually scheduled and transmitted and received based on DCI) are referred to as "second cells."

When the UE 120 is configured from the base station 110 with cross-carrier scheduling for a specific cell A (scheduled cell) (in this case, a cell A corresponds to the "second cell"), the UE 120 does not perform PDCCH monitoring for the cell A in the cell A, and may perform PDCCH monitoring in another cell B indicated by cross-carrier scheduling (that is, scheduling cell) (in this case, a cell B corresponds to the "first cell"). For the purpose of configuring cross-carrier scheduling for the UE 120, the base station 110 may configure information about the "first cell" that performs scheduling for the "second cell" (e.g., a cell index of the cell corresponding to "the first cell"), a carrier indicator field (CIF) value for the "second cell," and the like. For example, the configuration information in Table 14 below may be notified from the base station 110 to the UE 120 through higher layer signaling (e.g., RRC signaling).

TABLE 14

| | |
|---|---|
| CrossCarrierSchedulingConfig ::= | SEQUENCE { |
| schedulingCellInfo | CHOICE { |
| own (self carrier scheduling) | SEQUENCE { - |
| - No cross carrier scheduling | |
| cif-Presence | BOOLEAN |
| }, | |
| other (cross carrier scheduling) | SEQUENCE { - |
| - Cross carrier scheduling | |
| schedulingCellId | ServCellIndex, |
| (scheduling cell index) | |
| cif-InSchedulingCell | INTEGER (1..7) |
| (CIF value) | |
| } | |
| }, | |
| ... | |
| } | |

The UE 120 may monitor the PDCCH for the cell configured by cross-carrier scheduling in the cell corresponding to the "first cell." The UE 120 may determine the cell index of the cell scheduled by the DCI received from the carrier indicator field value in the DCI format for scheduling data, and may transmit and receive data in the cell indicated by the carrier indicator based on the determined cell index.

The scheduled cell (cell A) and the scheduling cell (cell B) may be configured as different numerologies. The numerology may include a subcarrier spacing, a cyclic prefix, and the like. In the case in which the cell A and the cell B have different numerologies, the following minimum scheduling offset may be additionally considered between the PDCCH and the PDSCH when the PDCCH of the cell B schedules the PDSCH of the cell A.

Cross-Carrier Scheduling Method (1) When the subcarrier spacing ($\mu_B$) of the cell B is less than the subcarrier spacing ($\mu_A$) of the cell A, the PDSCH may be scheduled from the next PDSCH slot after the X symbol from the last symbols of the PDCCH received in the cell B. X may vary according to $\mu_B$, and may be defined as X=4 symbols when $\mu_B$=15 kHz, X=4 symbols when $\mu_B$=30 kHz, and X=8 symbols when $\mu_B$=60 kHz.

(2) When the subcarrier spacing ($\mu_B$) of the cell B is greater than the subcarrier spacing ($\mu_A$) of the cell A, the PDSCH may be scheduled from the time point after the X symbols from the last symbol of the PDCCH received in the cell B. X may vary according to $\mu_B$, and may be defined as X=4 symbols when $\mu_B$=30 kHz, X=8 symbols when $\mu_B$=60 kHz, and X=12 symbols when $\mu_B$=120 kHz.

Hereinafter, a paging method in a 5G communication system will be described in detail.

Figure 11:
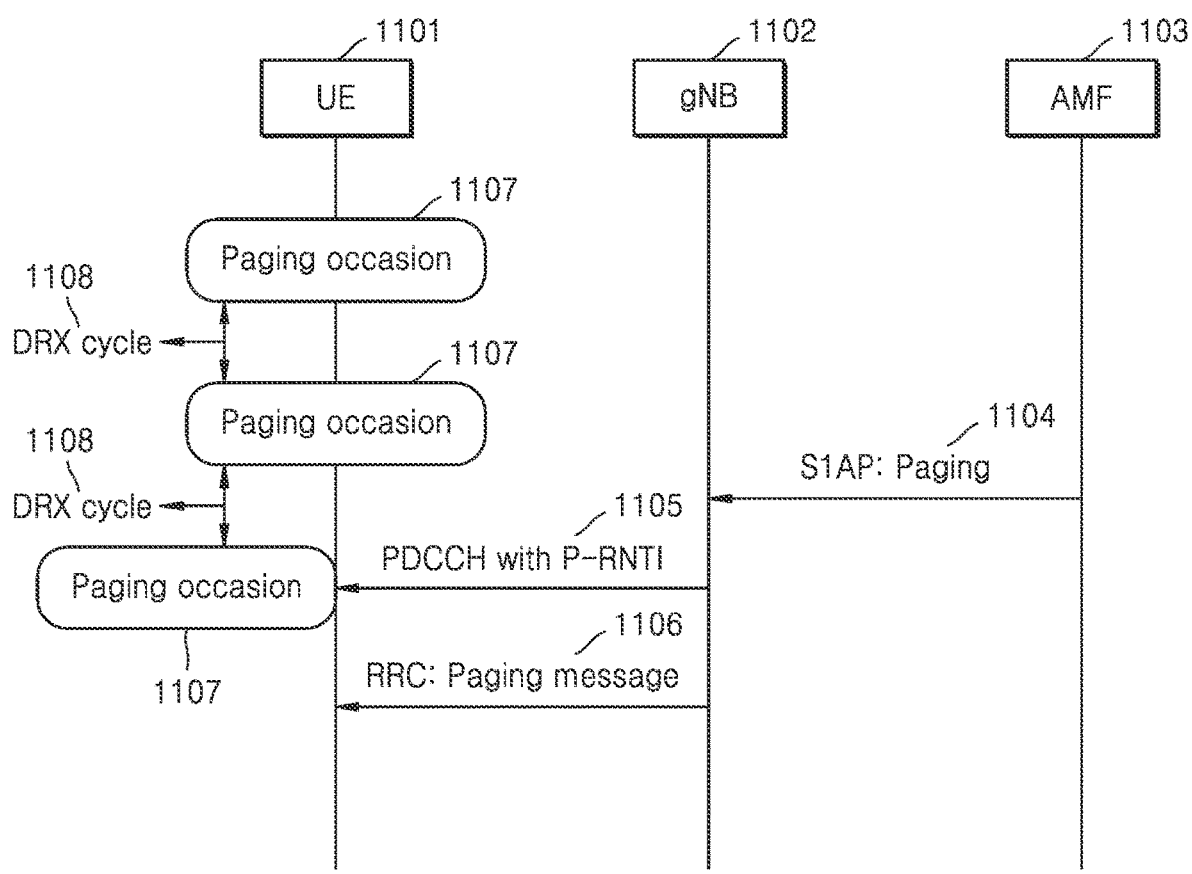
FIG. 11 illustrates a paging process in a wireless communication system, according to an embodiment of the disclosure.

FIG. 11 illustrates a paging process in a wireless communication system, according to an embodiment of the disclosure.

A UE 1101 may be the UE 120 described above, and a base station 1102 may be the base station 110 described above.

Specifically, FIG. 11 illustrates a paging procedure in a 5G communication system. When an incoming call to the UE in an idle or inactive state occurs, a paging procedure may be used to notify that the incoming call has occurred and start network access to the UEs, or may be used to notify the UEs in a connected state that system information has changed. Paging may be controlled by an AMF, and a paging message may be transmitted through a plurality of cells in a tracking area (TA).

Referring to FIG. 11, paging may start at an AMF 1103 and may be transmitted to the UE 1101 through the base station 1102 (e.g., gNB) (hereinafter, referred to as a gNB 1102). More specifically, the paging may be started from the AMF 1103, transmitted to the gNB 1102 through S1AP signaling 1104, and then transmitted to the UE 1101 through RRC signaling 1106. In this case, the UE 1101 may determine whether a paging message is present by monitoring a PDCCH 1105 configured by P-RNTI received from the gNB 1102 on a paging occasion 1107. The paging occasion 1107 may be determined based on a DRX cycle set for the UE 1101 by the base station (e.g., gNB) 1102. The UE 1101 receiving the PDCCH 1105 configured by the P-RNTI may receive, from the gNB 1102, the PDSCH including the paging message 1106. The paging message 1106 may include UE ID information of the UE 1101 to be awakened by the base station 1102.

In order to efficiently perform the paging procedure, the UE 1101 rests without performing a receiving operation for most of the time of the paging procedure, and in order to observe the paging information from the network, the UE 1101 has to be able to wake up briefly only at a set time interval. To this end, a paging occasion (PO) and a paging frame (PF) are defined in NR. The PO may be defined as a subframe or a time point in which a PDCCH configured by P-RNTI for receiving a paging message is present. The PF may be defined as one radio frame including one or more POs. According to FIG. 11, the UE 1101 may observe one PO per DRX cycle 1108.

Figure 12:
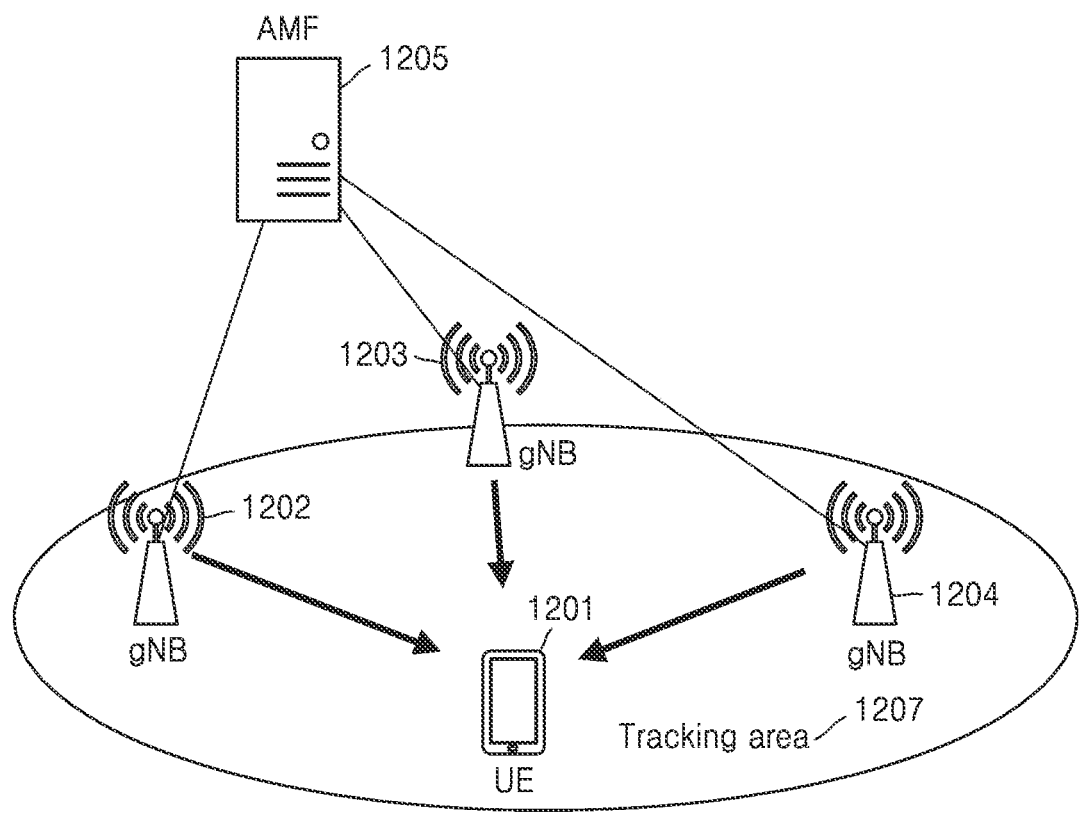
FIG. 12 illustrates a paging process in a wireless communication system, according to an embodiment of the disclosure.

FIG. 12 illustrates a paging process in a wireless communication system, according to an embodiment of the disclosure.

A UE 1201 may be the UE 120 described above, and base stations 1202, 1203, and 1204 may be the base station 110 described above.

Specifically, FIG. 12 illustrates an example of paging in a 5G communication system. When the UE 1201 is in an RRC_IDLE state, an NR network may determine the position of the UE 1201 in units of tracking areas (TA) 1207, not in units of cells. When accessing the NR network, the UE 1201 may be assigned a tracking area identity (TAI) list from an AMF 1205. The UE 1201 may freely move without updating the AMF 1205 within a cell in the TAI list. When an incoming call to the UE 1201 occurs, the AMF 1205 may transmit the same paging message to all the cells 1202, 1203, and 1204 in the TA 1207 currently configured for the UE 1201, and each of the cells 1202, 1203, and 1204 may transmit the paging message to the UE 1201. When the UE 1201 (re)selects a certain cell, the UE 1201 may obtain a tracking area code (TAC) of the cell through system information (e.g., SIB1) and may confirm, from the obtained TAC, whether the corresponding cell is a cell in its own TAI list. When the TAC of the selected cell is an ID that is not in the TAI list, the UE 1201 transmits a TAU message to the AMF 1205. The AMF 1205 transmits the TAI list together when transmitting a response (TAU accept) of the TAU message to the UE 1201, so that the TAI list is updated to the UE 1201 as the position of the UE 1201 moves.

Hereinafter, the operation of monitoring the paging of the UE will be described in detail.

The UE may monitor one PO per DRX cycle. One PO may be configured as a set of a plurality of PDCCH monitoring occasions, and a slot in which paging DCI may be transmitted may include a plurality of time slots (e.g., subframe or OFDM symbol). One PF may correspond to one radio frame and may include one or more POs or a start point of any PO.

It may be assumed that, during a multi-beam operation, the UE repeatedly transmits the same paging message or the same short message in all transmission beams. In this case, which beam to select and receive the paging message or the short message may be determined by the implementation of the UE. As an example, all paging messages for radio access network (RAN) initiated paging and core network (CN) initiated paging may be the same.

When the UE receives the RAN initiated paging, the UE may start an RRCConnection Resume procedure. When the UE receives CN initiated paging in an RRC_INACTIVE state, the UE may change to the RRC_IDLE mode, and the UE may notify the changed state of the UE (the state of the UE in the RRC_IDLE mode) to a network attached storage (NAS).

The PF and the PO for paging may be determined by the following equation.

A system frame number (SFN) corresponding to a paging frame may be determined by the following Equation 4. In Equation 4 below, A mod B may refer to a modulo operation that outputs a remainder obtained by dividing A by B.

$$(SFN+PF\_\text{offset}) \bmod T = (T \text{ div } N)*(UE\_ID \bmod N) \quad \text{Equation 4}$$

An index (i_s) indicating the index of the paging occasion may be determined by Equation 5 below.

$$i\_s = \text{floor } (UE\_ID/N) \bmod Ns \quad \text{Equation 5}$$

The parameters of Equations 4 and 5 for determining the paging frame and the paging occasion may be defined as follows.

T: DRX cycle set for the UE (DRX cycle may be set through higher layer signaling (e.g., RRC signaling, SIB, etc.))

N: Total number of paging frames in T

Ns: Number of paging occasions for one paging frame

PF_offset: Offset value for determining start point of paging frame

UE_ID: UE ID for determining paging frame and paging occasion. UE_ID may be determined as shown in Equation 6 below.

$$UE\_ID = 5G\text{-}S\text{-}TMSI \bmod 1024 \quad \text{Equation 6}$$

For example, the UE may receive 5G-S-TMSI through higher layer signaling. When the UE has not yet been registered in the network, the UE may assume that UE_ID is 0. Alternatively, the UE_ID for paging may correspond to a parameter determined by an international mobile subscriber identity (IMSI). In the disclosure, the UE_ID for paging is generalized and used as UE_ID. UE_ID may include both a value that may be set based on 5G-S-TMSI and a value that may be derived from an IMSI value.

The PDCCH (or PDCCH scrambled by P-RNTI) monitoring occasions for paging may be determined by information about a search space configuration for paging (e.g., a search space indicated by a higher layer signaling parameter pagingSearchSpace) and a configuration for the first PDCCH monitoring occasion of the paging occasion (e.g., higher layer signaling parameter firstPDCCH-MonitoringOccasionOfPO) and the number of PDCCH monitoring occasions per SS/PBCH block within the paging occasion (e.g., higher layer signaling parameter nrofPDCCH-MontiroingOccasionPerSSB-InPO). Definitions of paging-SearchSpace, firstPDCCH-MonitoringOccasionOfPO, and nrofPDCCH-MontiroingOccasionPerSSB-InPO may be specifically the same as shown in Table 15.

TABLE 15 pagingSearchSpace
ID of the Search space for paging (see TS 38.213 [13], clause 10.1).
If the field is absent, the UE does not receive paging in this BWP
(see TS 38.213 [13], clause 10).
firstPDCCH-MonitoringOccasionOfPO
Points out the first PDCCH monitoring occasion for paging of each
PO of the PF, see TS 38.304 [20].
nrofPDCCHMonitoringOccasionPerSSB-InPO
The number of PDCCH monitoring occasions corresponding to an
SSB for paging, see TS 38.304 [20], clause 7.1.

In the case in which the paging search space is configured as a search space having a search space ID of 0, when Ns=1, one paging occasion may be present in the paging frame, and when Ns=2, two paging occasions may be present in the paging frame. The first paging occasion (i_s=0) may be present in a first half frame in the paging frame, and the second paging occasion (i_s=1) may be present in a second half frame in the paging frame. The search space having a search space ID of 0 may correspond to a search space configured from an MIB.

When the paging search space is configured as a search space having a search space ID of not 0, the UE may monitor the $(i\_s+1)^{th}$ paging occasion. One paging occasion may include a set of "S*X" consecutive PDCCH monitoring occasions. "S" may correspond to the number of actually transmitted SS/PBCH blocks, and the corresponding information may be transmitted from the base station to the UE as a specific parameter (e.g., ssb-PositionsInBurst) value of an SIB. Also, "X" may correspond to the number of PDCCH monitoring occasions per SS/PBCH block within the paging occasion configured for the UE from the base station (e.g., higher layer signaling parameter nrofPDCCH-MontiroingOccasionPerSSB-InPO). When the corresponding configuration information is absent, the UE may assume X=1. The $[x*S+K]^{th}$ PDCCH monitoring occasion (where x=0, 1, 2, ..., X−1 and K=1, 2, 3, ..., S) in the paging occasion may correspond to the $K^{th}$ transmission SS/PBCH block. Starting from the first PDCCH monitoring occasion in the paging frame, PDCCH monitoring occasions that do not overlap the UL symbol may be sequentially numbered from 0. In this case, when firstPDCCH-MonitoringOccasionOfPO is configured through higher layer signaling, the start PDCCH monitoring occasion number of the $(i\_s+1)^{th}$ paging occasion may correspond to the $(i\_s+1)^{th}$ value in the firstPDCCH-MonitoringOccasionOfPO parameter. When firstPDCCH-MonitoringOccasionOfPO is not configured through higher layer signaling, the start PDCCH monitoring occasion number of the $(i\_s+1)^{th}$ paging occasion may be equal to i_s*S*X. When X>1 and the UE detects the PDCCH corresponding to the P-RNTI at a certain paging occasion, the UE does not need to perform monitoring for the remaining or subsequent PDCCH monitoring occasions in the corresponding paging occasion.

One paging occasion associated with a certain paging frame may be started within the corresponding paging frame or after the corresponding paging frame.

PDCCH monitoring occasions for any paging occasion may be present over a plurality of radio frames. When the search space for paging is configured as a search space having a search space ID of not 0, PDCCH monitoring occasions for one paging occasion may be present over a plurality of cycles of the paging search space.

Table 16 below is a part related to DRX for paging in TS 38.304.

TABLE 16

7 Paging
7.1 Discontinuous Reception for paging
The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging DCI can be sent (TS 38.213 [4]). One Paging Frame (PF) is one Radio Frame and may contain one or multiple PO(s) or starting point of a PO.
In multi-beam operations, the UE assumes that the same paging message and the same Short Message are repeated in all transmitted beams and thus the selection of the beam(s) for the reception of the paging message and Short Message is up to UE implementation.
The paging message is same for both RAN initiated paging and CN initiated paging.
The UE initiates RRC Connection Resume procedure upon receiving RAN initiated paging. If the UE receives a CN initiated paging in RRC_INACTIVE state, the UE moves to RRC_IDLE and informs NAS.
The PF and PO for paging are determined by the following formulae:
    SFN for the PF is determined by:
      (SFN + PF_offset) mod T = (T div N)*(UE_ID mod N)
    Index (i_s), indicating the index of the PO is determined by:
      i_s =floor (UE_ID/N) mod Ns
The PDCCH monitoring occasions for paging are determined according to pagingSearchSpace as specified in TS 38.213 [4] and firstPDCCH-MonitoringOccasionOfPO and nrofPDCCH-MonitoringOccasionPerSSB-InPO if configured as specified in TS 38.331 [3]. When SearchSpaceId =0 is configured for pagingSearchSpace, the PDCCH monitoring occasions for paging are same as for RMSI as defined in clause 13 in TS 38.213 [4].
When SearchSpaceId = 0 is configured for pagingSearchSpace, Ns is either 1 or 2. For Ns = 1, there is only one PO which starts from the first PDCCH monitoring occasion for paging in the PF. For Ns = 2, PO is either in the first half frame (i_s = 0) or the second half frame (i_s = 1) of the PF.
When SearchSpaceId other than 0 is configured for pagingSearchSpace, the UE monitors the $(i\_s + 1)^{th}$ PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The $[x*S + K]^{th}$ PDCCH monitoring occasion for paging in the PO corresponds to the $K^{th}$ transmitted SSB, where x = 0, 1, . . . , X-1, K = 1, 2, . . . , S.
The PDCCH monitoring occasions for paging which do not overlap with UL symbols (determined according to tdd-UL-DL-ConfigurationCommon) are sequentially numbered from zero starting from the first PDCCH monitoring occasion for paging in the PF.
When firstPDCCH-MonitoringOccasionOfPO is present, the starting PDCCH monitoring occasion number of $(i\_s + 1)^{th}$ PO is the $(i\_s + 1)^{th}$ value of the firstPDCCH-MonitoringOccasionOfPO parameter; otherwise, it is equal to i_s * S*X. If X > 1, when the UE detects a PDCCH transmission addressed to P-RNTI within its PO, the UE is not required to monitor the subsequent PDCCH monitoring occasions for this PO.
    NOTE 1: A PO associated with a PF may start in the PF or after the PF.
    NOTE 2: The PDCCH monitoring occasions for a PO can span multiple radio frames. When
          SearchSpaceId other than 0 is configured for paging-SearchSpace the PDCCH
          monitoring occasions for a PO can span multiple periods of the paging search
          space.
The following parameters are used for the calculation of PF and i_s above:
    T: DRX cycle of the UE (T is determined by the shortest of the UE specific DRX value(s),
       if configured by RRC and/or upper layers, and a default DRX value broadcast in
       system information. In RRC_IDLE state, if UE specific DRX is not configured by upper
       layers, the default value is applied).
    N: number of total paging frames in T
    Ns: number of paging occasions for a PF
    PF_offset: offset used for PF determination
    UE_ID: 5G-S-TMSI mod 1024
Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPagingFrameOffset as defined in TS 38.331 [3]. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.
If the UE has no 5G-S-TMSI, for instance when the UE has not yet registered onto the network, the UE shall use as default identity UE_ID = 0 in the PF and i_s formulas above. 5G-S-TMSI is a 48 bit long bit string as defined in TS 23.501 [10]. 5G-S-TMSI shall in the formulae above be interpreted as a binary number where the left most bit represents the most significant bit.

The base station may transmit a PDCCH for paging to the UE, and the PDCCH may include scheduling information about a PDSCH including a paging message. The paging message may include ID information of one or more UEs to be awakened by the base station. More specifically, information shown in Table 17 below may be included.

TABLE 17

Paging message

```
-- ASN1START
-- TAG-PAGING-START
Paging ::=                  SEQUENCE {
    pagingRecordList            PagingRecordList                    OPTIONAL,
-- Need N
    (paging record list)
    lateNonCriticalExtension    OCTET STRING                        OPTIONAL,
    nonCriticalExtension        SEQUENCE{ }                         OPTIONAL
}
PagingRecordList ::=        SEQUENCE (SIZE(1..maxNrofPageRec)) OF PagingRecord
PagingRecord ::=            SEQUENCE {
    ue-Identity                 PagingUE-Identity,
    (ue identity(ID))
    accessType                  ENUMERATED {non3GPP}    OPTIONAL,   -- Need N
    (access type)
    . . .
}
PagingUE-Identity ::=       CHOICE }
    ng-5G-S-TMSI                NG-5G-S-TMSI,
    fullI-RNTI                  I-RNTI-Value,
    . . .
}
```

After receiving the PDCCH for paging from the base station, the UE may receive the PDSCH scheduled by the PDCCH. UEs having the same UE_ID indicated from the paging message transmitted through the received PDSCH may wake up and perform a subsequent operation procedure (e.g., random access, RRC connection, etc.).

Hereinafter, a DCI format scrambled by P-RNTI in a 5G communication system will be described in detail. The DCI format scrambled by the P-RNTI may include, for example, the following fields.

Short Message Indicator—2 bits

Short Message—8 bits, (according to Clause 6.5 of [9, TS38.331]). When only scheduling information for paging is transmitted, this field is reserved.

Frequency domain resource allocation information— $\lceil \log_2(N_{RB}^{DL,BWP}(N_{RB}^{DL,BWP}+1)/2) \rceil$ bits. When only a short message is transmitted, this field is reserved. $N^{DL,BWP}_{RB}$ is defined as the number of RBs in the downlink BWP.

Time domain resource assignment information—4 bits. When only a short message is transmitted, this field is reserved.

VRB-to-PRB mapping—1 bit according to Table 7.3.1.2.2-5 When only a short message is transmitted, this field is reserved.

Modulation and coding scheme—5 bits. When only a short message is transmitted, this field is reserved.

TB scaling—2 bits as defined in Clause 5.1.3.2 of [6, TS38.214]. When only a short message is transmitted, this field is reserved.

Reserved bits—8 bits for operation in a cell with shared spectrum channel access; otherwise, 6 bits

TABLE 18

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

Table 18 shows the short message indicator in the DCI format scrambled by the P-RNTI.

Referring to Table 18, when a bit field is 00, the short message indicator may indicate "reserved." When the bit field is 01, the short message indicator may indicate that only scheduling information for paging is present in the DCI. When the bit field is 10, the short message indicator may indicate that only short message is present in the DCI. When the bit field is 11, the short message indicator may indicate that both scheduling information for paging and short message are present in the DCI.

Hereinafter, a method of configuring a TCI state for a PDCCH (or a PDCCH DMRS) in a 5G communication system will be described in detail. The TCI state may be used for indicating or exchanging QCL information between the UE and the base station.

The base station may configure and indicate the TCI state for the PDCCH (or the PDCCH DMRS) through appropriate signaling. As an example, the base station may configure and indicate a TCI state between two different RSs or channels through appropriate signaling, so that a QCL relationship between different RSs or channels may be notified.

The TCI state may mean announcing a QCL relationship between the PDCCH (or PDCCH DMRS) and another RS or channel. At this time, that a certain reference antenna port A (reference RS #A) and another target antenna port B (target RS #B) are QCLed to each other means that the UE is allowed to apply all or part of large-scale channel parameters estimated at the antenna port A to the channel measurement from the antenna port B. As an example, that different RSs or channels are QCLed means that, in estimating the channel through a certain reference RS antenna port A (reference RS #A) and another target RS antenna port B (target RS #B), which have a QCL relationship, the UE is allowed to apply all or part of large-scale channel parameters estimated from the antenna port A to the channel measurement from the antenna port B.

The QCL needs to associate different parameters with each other according to a situation, such as 1) time tracking affected by average delay and delay spread, 2) frequency tracking affected by Doppler shift and Doppler spread, 3) radio resource management (RRM) affected by average gain, and 4) beam management (BM) affected by spatial parameters. Therefore, NR supports four types of QCL relationships as shown in Table 19 below.

TABLE 19

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameters may collectively refer to all or part of various parameters such as angle of arrival (AoA), power angular spectrum (PAS) of AoA, angle of departure (AoD), PAS of AoD, transmit/receive channel correlation, transmit/receive beamforming, and spatial channel correlation.

The above-described QCL relationship may be set for the UE through an RRC parameter TCI-state and QCL information (QCL-Info) as shown in Table 20 below. Referring to Table 20 below, the base station may set one or more TCI states for the UE and notify up to two QCL relationships (qcl-Type1, qcl-Type2) for the RS referencing the ID of the TCI state, that is, the target RS. In this case, each QCL information (QCL-Info) included in each TCI state includes a serving cell index and a BWP index of the reference RS indicated by the corresponding QCL information, a type and an ID of the reference RS, and a QCL type, as shown in Table 10.

TABLE 20

```
TCI-State ::=                    SEQUENCE {
        tci-StateId                              TCI-StateId,
        (corresponding TCI state ID)
        qcl-Type1                                QCL-Info,
        (QCL information of the first reference RS of RS (target RS) referring to the corresponding
TCI state ID)
        qcl-Type2                                QCL-Info
                OPTIONAL,       -- Need R
        (QCL information of the second reference RS of the RS (target RS) referring to the
corresponding TCI state ID)
        ...
}
QCL-Info ::=                     SEQUENCE {
        cell                                     ServCellIndex
                OPTIONAL,       -- Need R
        (The serving cell index of the reference RS indicated by the corresponding QCL information)
        bwp-Id                                   BWP-Id
                        OPTIONAL, -- Cond CSI-RS-Indicated
        (BWP index of reference RS indicated by the corresponding QCL information)
        referenceSignal                          CHOICE {
                csi-rs                                   NZP-CSI-RS-
ResourceId,
                ssb                                      SSB-
Index
        (One of the CSI-RS ID or SSB ID indicated by the corresponding QCL information)
        },
        qcl-Type                                 ENUMERATED {typeA, typeB, typeC,
typeD),
        ...
}
```

Figure 13:
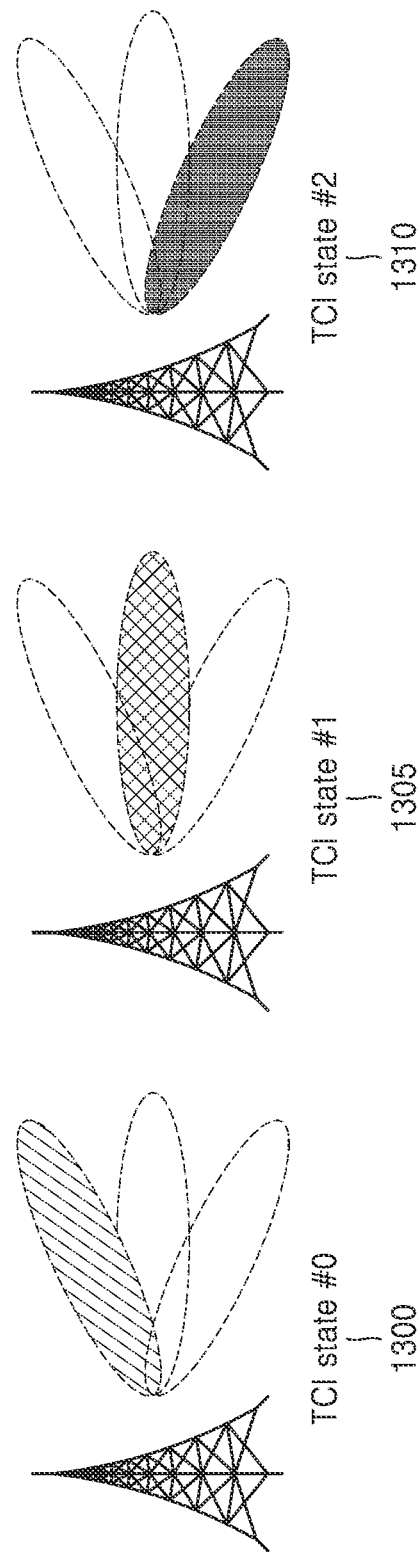
FIG. 13 illustrates base station beam allocation according to a transmission configuration indication (TCI) state configuration in a wireless communication system, according to an embodiment of the disclosure.

FIG. 13 illustrates base station beam allocation according to a TCI state configuration in a wireless communication system, according to an embodiment of the disclosure.

Referring to FIG. 13 illustrates an example of base station beam allocation according to TCI state configuration. Referring to FIG. 13, the base station may transmit information about N different beams to the UE through N different TCI states.

For example, when N=3 as illustrated in FIG. 13, the base station may associate qcl-Type2 parameters included in three TCI states 1300, 1305, and 1310 with CSI-RS or SSB corresponding to different beams and configure the qcl-Type2 parameters as QCL type D. The base station may announce that antenna ports referencing different TCI states 1300, 1305, or 1310 are associated with different spatial RX parameters (that is, different beams). Specifically, a combination of TCI states applicable to the PDCCH DMRS antenna port is shown in Table 21 below. In Table 21 below, the fourth row is a combination assumed by the UE before RRC configuration, and the configuration after RRC is impossible.

TABLE 21

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 14:
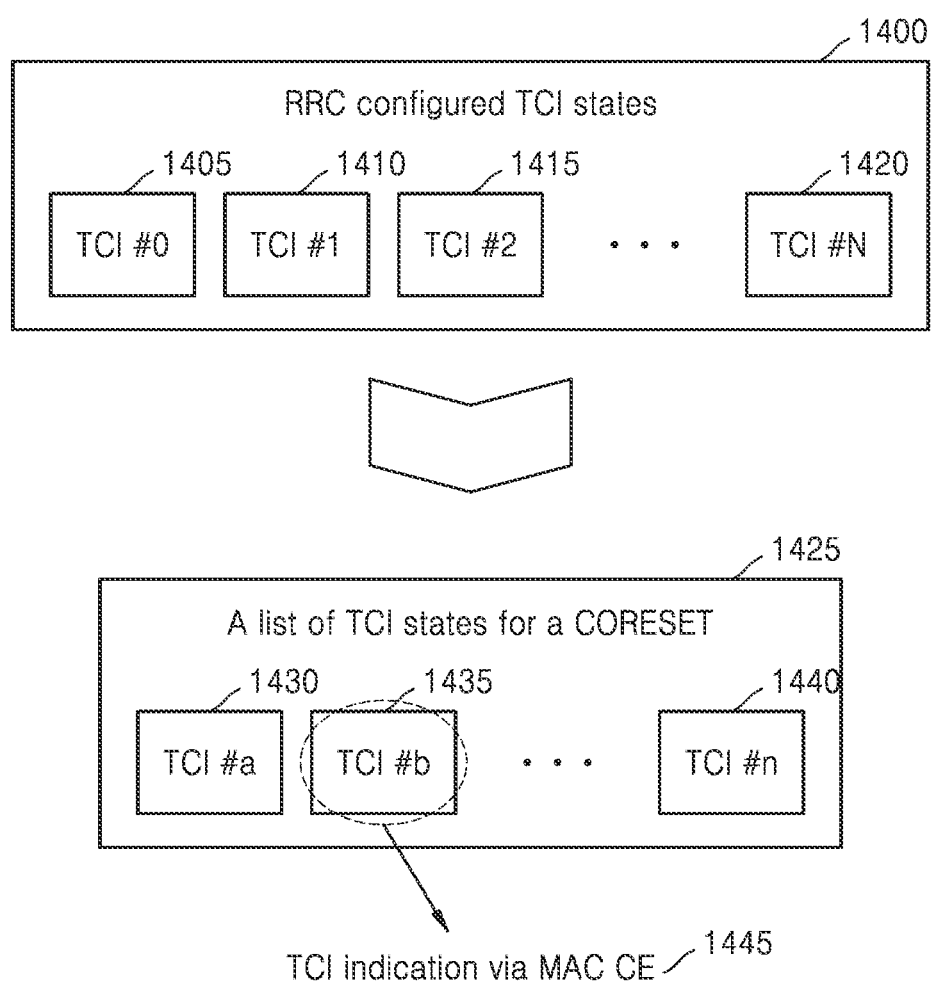
FIG. 14 illustrates a hierarchical signaling process in a wireless communication system, according to an embodiment of the disclosure.

FIG. 14 illustrates a hierarchical signaling process in a wireless communication system, according to an embodiment of the disclosure.

In NR, a hierarchical signaling method as illustrated in FIG. 14 is supported for dynamic allocation of a PDCCH beam. Referring to FIG. 14, the base station may configure N TCI states (TCI #0 1405, TCI #1 1410, TCI #2 1415, . . . , TCI #N 1420) for the UE through RRC signaling 1400. Also, some of the above-described N TCI states may be configured as TCI states for a CORESET (1425). The base station may indicate one of the TCI states (TCI #a 1430, TCI #b 1435, . . . , TCI #n 1440) for a CORESET to the UE through MAC control element (MAC CE) signaling (1445). The UE may receive the PDCCH based on beam information included in the TCI state indicated by the MAC CE signaling.

FIG. 15 illustrates an example of a signaling structure in a wireless communication system, according to an embodiment of the disclosure.

Specifically, FIG. 15 illustrates a TCI indication MAC CE signaling structure for a PDCCH DMRS. Referring to FIG. 15, the TCI indication MAC CE signaling for the PDCCH DMRS may include 2 bytes (16 bits). Also, the TCI indication MAC CE signaling for the PDCCH DMRS includes a 1-bit reserved bit 1510, a 5-bit serving cell ID 1515, a 2-bit BWP ID 1520, a 2-bit CORESET ID 1525, and a 6-bit TCI state ID 1530.

The base station may configure one or more TCI states for a specific control resource set for the UE and activate one of the configured TCI states through a MAC CE activation command. For example, {TCI state#0, TCI state#1, TCI state#2} is configured as a TCI state in a control resource set #1, and the base station may transmit, to the UE, a command for performing activation so that TCI state #0 is assumed as the TCI state for the control resource set #1 through the MAC CE. Based on the activation command for the TCI state received by the MAC CE, the UE may correctly receive the DMRS of the corresponding control resource set based on the QCL information in the activated TCI state.

When the UE does not receive a TCI state configuration indicating QCL information for a DMRS antenna port for receiving a PDCCH of a control resource set configured through an MIB (or control resource set#0 having a control resource set ID (or index) of 0), the UE may assume that the following physical layer channels are QCLed in terms of average gain, QCL-TypeA, and QCL-TypeD characteristics.

- DMRS (or DMRS antenna port) associated with the PDCCH of the control resource set configured in the MIB (or control resource set #0 having a control resource set ID of 0)
- DMRS antenna port associated with the reception of the PDSCH corresponding thereto (or PDSCH scheduled by the PDCCH transmitted to control resource set #0)
- The corresponding SS/PBCH block corresponding thereto (or SS/PBCH block associated with control resource set #0, or SS/PBCH block for transmitting MIB for configuring the corresponding control resource set #0)

Table 22 below is a part of TS 38.213 related to the above contents.

TABLE 22

The UE may assume that the DM-RS antenna port associated with PDCCH receptions in the CORESET configured by pdcch-ConfigSIB1 in MIB, the DM-RS antenna port associated with corresponding PDSCH receptions, and the corresponding SS/PBCH block are quasi co-located with respect to average gain, QCL-TypeA, and QCL-TypeD properties, when applicable [6, TS 38.214], if the UE is not provided a TCI state indicating quasi co-location information of the DM-RS antenna port for PDCCH reception in the CORESET. The value for the DM-RS scrambling sequence initialization is the cell ID. A SCS is provided by subCarrierSpacingCommon in MIB.

When the UE is configured with the search space having a search space ID of 0 with respect to a common search space set for monitoring SI-RNTI/P-RNTI (or when the common search space set for monitoring SI-RNTI/P-RNTI is a search space set configured by MIB or search space #0), the UE may monitor a PDCCH in a monitoring occasion associated with an SS/PBCH block A. At this time, the SS/PBCH block A may be determined as follows.

- The UE ay receive a command for activating a specific TCI state for control resource set #0 through a MAC CE. At this time, the corresponding TCI state may include a CSI-RS associated with any SS/PBCH. The SS/PBCH associated with the CSI-RS of the TCI state activated through the MAC CE, which is most recently received by the UE, may correspond to the SS/PBCH block A.
- When performing random access, the UE may transmit, to the base station, a preamble (or physical random access channel (PRACH)) associated with a specific SS/PBCH. The SS/PBCH identified through the random access procedure that has been most recently performed by the UE may correspond to the SS/PBCH block A.

Table 23 below is a part of TS 38.213 related to the above contents.

TABLE 23

If a UE is provided a zero value for searchSpaceID in PDCCH-ConfigCommon for a Type0/0A/2-PDCCH CSS set, the UE determines monitoring occasions for PDCCH candidates of the Type0/0A/2-PDCCH CSS set as described in Subclause 13, and the UE is provided a C-RNTI, the UE monitors PDCCH candidates only at monitoring occasions associated with a SS/PBCH block, where the SS/PBCH block is determined by the most recent of
  a MAC CE activation command indicating a TCI state of the active BWP that includes a CORESET with index 0, as described in [6, TS 38.214], where the TCI-state includes a CSI-RS which is quasi-co-located with the SS/PBCH block, or
  a random access procedure that is not initiated by a PDCCH order that triggers a contention-free random access procedure For the control resource set (control resource set #X) having an index of not 0,

- When the UE does not receive the TCI state for the control resource set #X, or when the UE receives one or more TCI states, but does not receive a MAC CE activation command for activating one of the TCI states, the UE may assume that the DMRS transmitted in control resource set #X is QCLed with the SS/PBCH block identified in the initial access process.
- When the UE receives a configuration for one or more TCI states as part of a handover procedure (or as part of a "reconfiguration with synch" procedure), but does not receive a MAC CE activation command for activating one of the TCI states, the UE may assume that the DMRS transmitted in control resource set #X is QCLed with the SS/PBCH or CSI-RS resource identified during the random access procedure initiated by the handover procedure (or the "reconfiguration with synch" procedure).

Table 24 below is a part of TS 38.213 related to the above contents.

TABLE 24

For a CORESET other than a CORESET with index 0,
  if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCH-ToAddList and tci- StatesPDCCH-ToReleaseList but has not received a MAC CE activation command for one of the TCI states as described in [11, TS 38.321], the UE assumes that the DM-RS antenna port associated with PDCCH receptions is quasi co-located with the access procedure;
  if a UE has been provided a configuration of more than one TCI states by tci-StatesPDCCH-ToAddList and tci-StatesPDCCH-ToReleaseList for the CORESET as part of Reconfiguration with sync procedure as described in [12, TS 38.331] but has not received a MAC CE activation command for one of the TCI states as described in [11, TS 38.321], the UE assumes that the DM-RS antenna port associated with PDCCH receptions is quasi co-located with the SS/PBCH block or the CSI-RS resource the UE identified during the random access procedure initiated by the Reconfiguration with sync procedure as described in [12, TS 38.331].

With respect to the control resource set having an index of 0 (control resource set #0), the UE may assume that the DMRS antenna port of the PDCCH received in control resource set #0 is QCLed with the following physical resources.

A DL RS included in the TCI state activated by the MAC CE activation command, or When the UE does not receive the MAC CE activation command for the TCI state, SS/PBCH block identified by the UE through the most recent random access procedure (however, random access other than contention-based random access triggered by PDCCH order)

Table 25 below is a part of TS 38.213 related to the above contents.

TABLE 25

For a CORESET with index 0, the UE assumes that a DM-RS antenna port for PDCCH receptions in the CORESET is quasi co-located with
  the one or more DL RS configured by a TCI state, where the TCI state is indicated by a MAC CE activation command for the CORESET, if any, or
  a SS/PBCH block the UE identified during a most recent random access procedure not initiated by a PDCCH order that triggers a contention-free
  random access procedure, if no MAC CE activation command indicating
  a TCI state for the CORESET is received after the most recent random access procedure.

Hereinafter, the terms such as paging PDCCH, PDCCH for paging, PDCCH corresponding to paging, PDCCH scrambled by P-RNTI, and PDCCH configured by P-RNTI may all be used as the same meaning.

Hereinafter, the terms such as paging PDSCH, PDSCH for paging, PDSCH transmitted by paging message, PDSCH scrambled by P-RNTI, and PDSCH configured by P-RNTI may all be used as the same meaning.

NR has a CSI framework for indicating UE CSI measurement and reporting in the base station. The CSI framework of the NR may include at least two elements, that is, resource setting and report setting. The report setting may have a connection relationship with each other by referencing at least one ID of the resource setting.

According to an embodiment of the disclosure, the resource setting may include information related to an RS for the UE to measure CSI. The base station may configure at least one resource setting for the UE. As an example, the base station and the UE may exchange signaling information as shown in Table 26 in order to transmit information about the resource setting.

TABLE 26

```
-- ASN1START
-- TAG-CSI-RESOURCECONFIG-START
CSI-ResourceConfig ::=        SEQUENCE {
    csi-ResourceConfigId          CSI-ResourceConfigId,
    csi-RS-ResourceSetList        CHOICE {
      nzp-CSI-RS-SSB              SEQUENCE {
        nzp-CSI-RS-ResourceSetList      SEQUENCE   (SIZE   (1..maxNrofNZP-CSI-RS-ResourceSetsPerConfig)) OF NZP-CSI-RS-ResourceSetId
                                                                  OPTIONAL, -- Need R
          csi-SSB-ResourceSetList    SEQUENCE  (SIZE   (1..maxNrofCSI-SSB-ResourceSetsPerConfig)) OF CSI-SSB-ResourceSetId
                                                                  OPTIONAL -- Need R
      },
        csi-IM-ResourceSetList       SEQUENCE  (SIZE   (1..maxNrofCSI-IM-ResourceSetsPerConfig)) OF CSI-IM-ResourceSetId
    },
    bwp-Id         BWP-Id,
    resourceType         ENUMERATED {aperiodic, semiPersistent, periodic },
    ...
}
-- TAG-CSI-RESOURCECONFIG-STOP
-- ASN1STOP
```

In Table 26, signaling information CSI-ResourceConfig includes information about each resource setting. According to the signaling information, each resource setting may include a resource setting index (csi-ResourceConfigId), a BWP index (bwp-ID), a time domain transmission configuration of resource (resourceType), or a resource set list (csi-RS-ResourceSetList) including at least one resource set. The time domain transmission configuration of resource may be configured as aperiodic transmission, semi-persistent transmission, or periodic transmission. The resource set list may be a set including a resource set for channel measurement or a set including a resource set for interference measurement. When the resource set list is a set including a resource set for channel measurement, each resource set may include at least one resource. This may be an index of a CSI RS (CSI-RS) resource or an SS/PBCH block (SSB). When the resource set list is a set including a resource set for interference measurement, each resource set may include at least one interference measurement resource (CSI interference measurement (CSI-IM)).

For example, when the resource set includes a CSI-RS, the base station and the UE may exchange signaling information as shown in Table 27 in order to transmit information about the resource set.

In Table 28, signaling information NZP-CSI-RS-Resource includes information about each CSI-RS. Information included in the signaling information NZP-CSI-RS-Resource may have the following meaning.

nzp-CSI-RS-ResourceId: CSI-RS resource index resourceMapping: resource mapping information of CSI-RS resource powerControlOffset: ratio between PDSCH EPRE (Energy Per RE) and CSI-RS EPRE powerControlOffsetSS: ratio between SS/PBCH block EPRE and CSI-RS EPRE scramblingID: Scrambling index of CSI-RS sequence periodicityAndOffset: CSI-RS resource transmission periodicity and slot offset

TABLE 27

```
-- ASN1START
-- TAG-NZP-CSI-RS-RESOURCESET-START
NZP-CSI-RS-ResourceSet ::=    SEQUENCE {
   nzp-CSI-ResourceSetId      NZP-CSI-RS-ResourceSetId,
   nzp-CSI-RS-Resources                 SEQUENCE (SIZE (1..maxNrofNZP-CSI-RS-
ResourcesPerSet)) OF NZP-CSI-RS-ResourceId,
   repetition              ENUMERATED {on, off }               OPTIONAL,
-- Need S
   aperiodicTriggeringOffset    INTEGER(0..6)                  OPTIONAL,
-- Need S
   trs-Info            ENUMERATED {true}                       OPTIONAL,
-- Need R
   . . .
}
-- TAG-NZP-CSI-RS-RESOURCESET-STOP
-- ASN1STOP
```

In Table 27, signaling information NZP-CSI-RS-ResourceSet includes information about each resource set. According to the signaling information, each resource set may include at least information about a resource set index (nzp-CSI-ResourceSetId) or an index set of the included CSI-RS (nzp-CSI-RS-Resources), and may include a part of information (repetition) about a spatial domain transmission filter of the included CSI-RS resource or tracking purpose (trs-Info) of the included CSI-RS resource.

The CSI-RS may be the most representative RS included in the resource set. The base station and the UE may exchange signaling information as shown in Table 28 in order to transmit information about the CSI-RS resource.

qcl-InfoPeriodicCSI-RS: TCI-state information when the CSI-RS is a periodic CSI-RS resourceMapping included in the signaling information NZP-CSI-RS-Resource indicates resource mapping information of the CSI-RS resource, and may include frequency resource (resource element (RE)) mapping, the number of ports, symbol mapping, CDM type, frequency resource density, and frequency band mapping information. The number of ports configurable therethrough, frequency resource density, a CDM type, and time-frequency domain RE mapping may have values determined in one of the rows of Table 29 below.

TABLE 28

```
-- ASN1START
-- TAG-NZP-CSI-RS-RESOURCE-START
NZP-CSI-RS-Resource ::=    SEQUENCE {
   nzp-CSI-RS-ResourceId      NZP-CSI-RS-ResourceId,
   resourceMapping            CSI-RS-ResourceMapping,
   powerControlOffset         INTEGER (-8..15),
   powerControlOffsetSS                 ENUMERATED{db-3, db0, db3, db6}
OPTIONAL,   -- Need R
   scramblingID         ScramblingId,
   periodicityAndOffset    CSI-ResourcePeriodicityAndOffset    OPTIONAL,
-- Cond PeriodicOrSemiPersistent
   qcl-InfoPeriodicCSI-RS    TCI-StateId          OPTIONAL, -- Cond
Periodic
   . . .
}
-- TAG-NZP-CSI-RS-RESOURCE-STOP
-- ASN1STOP
```

TABLE 29

| Row | Ports X | Density P | cdm-Type | $(\bar{k}, \bar{l})$ | CDM group index j | k' | l' |
|---|---|---|---|---|---|---|---|
| 1 | 1 | 3 | No CDM | $(k_0, l_0), (k_0 + 4, l_0), (k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | CDM4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | CDM4 (FD2, TD2) | $(k_0, l_0), (k_1, l_0), (k_2, l_0)$ | 0, 1, 2 | 0, 1 | 0, 1 |
| 11 | 16 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | CDM4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1), (k_1, l_0 + 1), (k_2, l_0 + 1),$ $(k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | CDM8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM4 (FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2, TD4) | $(k_0, l_0), (k_1, l_0), (k_2, l_0), (k_3, l_0)$ | 0, 1, 2, 3 | 0, 1 | 0, 1, 2, 3 |

Table 29 shows a frequency resource density configurable according to the number (X) of CSI-RS ports, a CDM type, a frequency domain and time domain start position $(\bar{k}, \bar{l})$ of a CSI-RS component RE pattern, and a frequency domain RE number (k') and a time domain RE number (l') of the CSI-RS component RE pattern. The above-described CSI-RS component RE pattern may be a basic unit constituting a CSI-RS resource. Through Y (=1+max(k')) REs on the frequency domain and Z (=1+max(l')) REs on the time domain, the CSI-RS component RE pattern may include YZ REs. When the number of CSI-RS ports is 1, the CSI-RS RE position may be designated without limitation of subcarriers in the PRB, and the CSI-RS RE position may be designated by a 12-bit bitmap. When the number of CSI-RS ports is {2, 4, 8, 12, 16, 24, 32} ports and Y=2, the CSI-RS RE position may be designated for every two subcarriers in the PRB, and the CSI-RS RE position may be designated by a 6-bit bitmap. When the number of CSI-RS ports is 4 and Y=4, the CSI-RS RE position may be designated for every four subcarriers in the PRB, and the CSI-RS RE position may be designated by a 3-bit bitmap. Similarly, the time domain RE position may be designated by a 14-bit bitmap. At this time, according to a Z value in Table 29, the length of the bitmap may change as in the designation of the frequency position. However, because the principle thereof is similar to that described above, the redundant descriptions will be omitted below.

According to an embodiment of the disclosure, the report setting may have a connection relationship with each other by referencing at least one ID of the resource setting, and the resource setting(s) having a connection relationship with the report setting provides configuration information including information about the RS for measuring channel information. When the resource setting(s) having the connection relationship with the report setting is used to measure channel information, the measured channel information may be used to report the channel information according to a reporting method configured in the report setting having the connection relationship.

According to an embodiment of the disclosure, the report setting may include configuration information related to a CSI reporting method. As an example, the base station and the UE may exchange signaling information as shown in Table 30 in order to transmit information about the report setting.

TABLE 30

```
-- ASN1START
-- TAG-CSI-REPORTCONFIG-START
CSI-ReportConfig ::=            SEQUENCE {
    reportConfigId              CSI-ReportConfigId,
    carrier                     ServCellIndex                   OPTIONAL,   -- Need S
    resourcesForChannelMeasurement                              CSI-ResourceConfigId,
    csi-IM-ResourcesForInterference                             CSI-ResourceConfigId            OPTIONAL, --
Need R
    nzp-CSI-RS-ResourcesForInterference                         CSI-ResourceConfigId            OPTIONAL, -
- Need R
    reportConfigType            CHOICE {
        periodic                SEQUENCE {
            reportSlotConfig                                    CSI-ReportPeriodicityAndOffset,
```

TABLE 30-continued

```
        pucch-CSI-ResourceList          SEQUENCE (SIZE (1..maxNrofBWPs)) OF
PUCCH-CSI-Resource
      },
      semiPersistentOnPUCCH             SEQUENCE {
        reportSlotConfig                CSI-ReportPeriodicityAndOffset,
        pucch-CSI-ResourceList          SEQUENCE (SIZE (1..maxNrofBWPs)) OF
PUCCH-CSI-Resource
      }
      semiPersistentOnPUSCH             SEQUENCE {
        reportSlotConfig                ENUMERATED {sl5, sl10, sl20, sl40, sl80, sl160,
sl320},
        reportSlotOffsetList            SEQUENCE (SIZE (1.. maxNrofUL-Allocations)) OF
INTEGER(0..32),
        p0alpha                         P0-PUSCH-AlphaSetId
      }
      aperiodic                         SEQUENCE {
        reportSlotOffsetList            SEQUENCE (SIZE (1..maxNrofUL-Allocations)) OF
INTEGER(0..32)
      }
    },
    reportQuantity                      CHOICE {
      none                              NULL,
      cri-RI-PMI-CQI                    NULL,
      cri-RI-i1                         NULL,
      cri-RI-i1-CQI                     SEQUENCE {
        pdsch-BundleSizeForCSI                          ENUMERATED {n2, n4}
OPTIONAL    -- Need S
      },
      cri-RI-CQI                        NULL,
      cri-RSRP                          NULL,
      ssb-Index-RSRP                    NULL,
      cri-RI-LI-PMI-CQI                 NULL
    },
    reportFreqConfiguration             SEQUENCE {
      cqi-FormatIndicator               ENUMERATED { widebandCQI, subbandCQI }
OPTIONAL,   -- Need R
      pmi-FormatIndicator               ENUMERATED { widebandPMI, subbandPMI }
OPTIONAL,   -- Need R
      csi-ReportingBand                 CHOICE {
        subbands3                       BIT STRING(SIZE(3)),
        subbands4                       BIT STRING(SIZE(4)),
        subbands5                       BIT STRING(SIZE(5)),
        subbands6                       BIT STRING(SIZE(6)),
        subbands7                       BIT STRING(SIZE(7)),
        subbands8                       BIT STRING(SIZE(8)),
        subbands9                       BIT STRING(SIZE(9)),
        subbands10                      BIT STRING(SIZE(10)),
        subbands11                      BIT STRING(SIZE(11)),
        subbands12                      BIT STRING(SIZE(12)),
        subbands13                      BIT STRING(SIZE(13)),
        subbands14                      BIT STRING(SIZE(14)),
        subbands15                      BIT STRING(SIZE(15)),
        subbands16                      BIT STRING(SIZE(16)),
        subbands17                      BIT STRING(SIZE(17)),
        subbands18                      BIT STRING(SIZE(18)),
        . . .,
        subbands19-v1530                BIT STRING(SIZE(19))
      } OPTIONAL   -- Need S
    }                                                   OPTIONAL,   -- Need
R
    timeRestrictionForChannelMeasurements               ENUMERATED {configured,
notConfigured},
    timeRestrictionForInterferenceMeasurements          ENUMERATED {configured,
notConfigured},
    codebookConfig          CodebookConfig                              OPTIONAL,
-- Need R
    dummy                   ENUMERATED {n1, n2}                         OPTIONAL,
-- Need R
    groupBasedBeamReporting            CHOICE {
      enabled                          NULL,
      disabled                         SEQUENCE {
        nrofReportedRS                                ENUMERATED {n1, n2, n3, n4}
OPTIONAL    -- Need S
      }
    },
    cqi-Table               ENUMERATED {table1, table2, table3, spare1}
OPTIONAL,   -- Need R
    subbandSize             ENUMERATED {value1, value2},
    non-PMI-PortIndication              SEQUENCE  (SIZE  (1..maxNrofNZP-CSI-RS-
ResourcesPerConfig)) OF PortIndexFor8Ranks OPTIONAL,   -- Need R
```

TABLE 30-continued

```
...,
[[
semiPersistentOnPUSCH-v1530    SEQUENCE {
    reportSlotConfig-v1530     ENUMERATED {sl4, sl8, sl16}     OPTIONAL -- Need
}
R
]]
}
```

In Table 30, signaling information CSI-ReportConfig includes information about each report setting. Information included in the signaling information CSI-ReportConfig may have the following meaning.

reportConfigId: Report setting index carrier: Serving cell index resourcesForChannelMeasurement: Resource setting index for channel measurement that has connection relationship with report setting csi-IM-ResourcesForInterference: Resource setting index having CSI-IM resource for interference measurement that has connection relationship with report setting nzp-CSI-RS-ResourcesForInterference: Resource setting index having CSI-RS resource for interference measurement that has connection relationship with report setting reportConfigType: which indicates time domain transmission configuration and transmission channel of channel report and may have aperiodic transmission, semi-persistent PUCCH transmission, semi-persistent PUSCH transmission, or periodic transmission configuration reportQuantity: which indicates type of channel information to be reported, and may have types of channel information ('cri-RI-PMI-CQI', 'cri-RI-i1', 'cri-RI-i1-CQI', 'cri-RI-CQI', 'cri-RSRP', 'ssb-Index-RSRP', 'cri-RI-LI-PMI-CQI') when no channel report is transmitted ('none') and when channel report is transmitted. Elements included in the type of channel information refer to channel quality indicator (CQI), precoding matric indicator (PMI), CSI-RS resource indicator (CRI), SS/PBCH block resource indicator (SSBRI), layer indicator (LI), rank indicator (RI), and/or L1-reference signal received power (L1-RSRP).

reportFreqConfiguration: which indicates whether the channel information to be reported includes only information about the entire band (wideband) or includes information about each subband and, when information about each subband is included, may have configuration information for the subband including channel information.

timeRestrictionForChannelMeasurements: Whether time domain restrictions on the RS for channel measurement among the RSs referenced by channel information to be reported.

timeRestrictionForInterferenceMeasurements: Whether time domain restrictions on the RS for interference measurement among the RSs referenced by the channel information to be reported.

codebookConfig: Codebook information referenced by channel information to be reported groupBasedBeamReporting: Whether beam grouping of channel reporting cqi-Table: CQI table index referenced by channel information to be reported subbandSize: Index indicating subband size of channel information non-PMI-PortIndication: Port mapping information referenced when reporting non-PMI channel information When the base station indicates channel information reporting through higher layer signaling or L1 signaling, the UE may perform channel information reporting with reference to the above configuration information included in the indicated report setting.

The base station may indicate CSI report to the UE through higher layer signaling including RRC signaling or MAC CE signaling, or L1 signaling (e.g., common DCI, group-common DCI, UE-specific DCI).

For example, the base station may indicate an aperiodic CSI report to the UE through higher layer signaling or DCI using DCI format 0_1. The base station configures parameters for aperiodic CSI report of the UE or a plurality of CSI report trigger states including parameters for CSI report through higher layer signaling. The parameters for the CSI report or the CSI report trigger state may include a set including a slot interval or a possible slot interval between a PDCCH including the DCI and a PUCCH or a PUSCH including the CSI report, an RS ID for channel state measurement, types of the included channel information, and the like. When the base station indicates some CSI report trigger states to the UE through DCI, the UE reports channel information according to the CSI report configuration of the report setting configured in the indicated CSI report trigger state. The time domain resource assignment of the PUCCH or PUSCH including the CSI report of the UE may be indicated through all or part of a slot interval with the PDCCH indicated through DCI, a start symbol and symbol length indication in a slot for time domain resource assignment of the PUSCH, and a PUCCH resource indication. For example, the position of the slot in which the PUSCH including the CSI report of the UE is transmitted may be indicated through the slot interval with the PDCCH indicated through DCI, and the start symbol and the symbol length in the slot may be indicated through the time domain resource assignment field of the DCI described above.

For example, the base station may indicate the semi-persistent CSI report to the UE through higher layer signaling or DCI using DCI format 0_1. The base station may activate or deactivate the semi-persistent CSI report through higher layer signaling including MAC CE signaling or DCI scrambled by SP-CSI-RNTI. When the semi-persistent CSI report is activated, the UE may periodically report channel information according to the configured slot interval. When the semi-persistent CSI report is deactivated, the UE may stop the activated periodic channel information report. The base station configures parameters for semi-persistent CSI report of the UE or a plurality of CSI report trigger states including parameters for semi-persistent CSI report through higher layer signaling. The parameters for the CSI report or the CSI report trigger state may include a set including a slot interval or a possible slot interval between a PDCCH including DCI indicating the CSI report and a PUCCH or a PUSCH including the CSI report, a slot interval between a slot in which higher layer signaling indicating the CSI report is activated and the PUCCH or PUSCH including the CSI report, a slot interval periodicity of the CSI report, types of the included channel information, and the like. When the base station activates some CSI report trigger states or some report settings to the UE through higher layer signaling or DCI, the UE may report channel information according to the report setting included in the indicated CSI report trigger state or the CSI report configuration configured in the activated report setting. The time domain resource assignment of the PUCCH or PUSCH including the CSI report of the UE may be indicated through all or part of a slot interval periodicity of the CSI report, a slot interval with a slot in which higher layer signaling is activated or a slot interval with a PDCCH indicated through DCI, a start symbol and symbol length indication in a slot for time domain resource assignment of the PUSCH, and a PUCCH resource indication. For example, the position of the slot in which the PUSCH including the CSI report of the UE is transmitted may be indicated through the slot interval with the PDCCH indicated through DCI, and the start symbol and the symbol length in the slot may be indicated through the time domain resource assignment field of DCI format 0_1 described above. For example, the position of the slot in which the PUCCH including the CSI report of the UE is transmitted may be indicated through a slot interval periodicity of the CSI report configured through higher layer signaling, and a slot interval between a slot in which higher layer signaling is activated and a PUCCH including the CSI report, and the start symbol and the symbol length in the slot may be indicated through the start symbol and the symbol length in which the PUCCH resource configured through higher layer signaling is allocated.

For example, the base station may indicate the periodic CSI report to the UE through higher layer signaling. The base station may activate or deactivate the periodic CSI report through higher layer signaling including RRC signaling. When the periodic CSI report is activated, the UE may periodically report channel information according to the configured slot interval. When the periodic CSI report is deactivated, the UE may stop the activated periodic channel information report. The base station configures the report setting including the parameters for the periodic CSI report of the UE through higher layer signaling. The parameters for the CSI report may include a slot interval between a slot in which higher layer signaling indicating the CSI report is activated and a PUCCH or a PUSCH including the CSI report, a slot interval periodicity of the CSI report, an RS ID for channel state measurement, types of the included channel information, and the like. The time domain resource assignment of the PUCCH or PUSCH including the CSI report of the UE may be indicated through all or part of a slot interval periodicity of the CSI report, a slot interval with a slot in which higher layer signaling is activated or a slot interval with a PDCCH indicated through DCI, a start symbol and symbol length indication in a slot for time domain resource assignment of the PUSCH, and a PUCCH resource indication. For example, the position of the slot in which the PUCCH including the CSI report of the UE is transmitted may be indicated through a slot interval periodicity of the CSI report configured through higher layer signaling, and a slot interval between a slot in which higher layer signaling is activated and a PUCCH including the CSI report, and the start symbol and the symbol length in the slot may be indicated through the start symbol and the symbol length in which the PUCCH resource configured through higher layer signaling is allocated.

When the base station indicates the aperiodic CSI report or the semi-persistent CSI report to the UE through DCI, it may be determined whether the UE may perform a valid channel report through the indicated CSI report in consideration of a CSI computation time required for the CSI report. For the aperiodic CSI report or the semi-persistent CSI report indicated through DCI, the UE may perform a valid CSI report from a UL symbol after Z symbols when the last symbol included in the PDCCH including the DCI indicating the CSI report is ended. The above-described Z symbol may change according to the numerology of the downlink BWP corresponding to the PDCCH including the DCI indicating the CSI report, the numerology of the uplink BWP corresponding to the PUSCH through which the CSI report is transmitted, and types or characteristics of channel information reported in the CSI report (report quantity, frequency band granularity, number of ports of RS, codebook type, etc.). In other words, in order for a certain CSI report to be determined as a valid CSI report (in order for the corresponding CSI report to be a valid CSI report), the UL transmission of the CSI report includes timing advance and must not be performed before the Zref symbol. In this case, the Zref symbol is an uplink symbol that starts a cyclic prefix (CP) after a time $T_{proc,CSI}$ $(Z)(2048+144)\cdot\kappa 2^{-\mu}\cdot T_c$ from the moment the last symbol of the triggering PDCCH is ended. The detailed value of Z follows the following description, $T_c=1/(\Delta f_{max}\cdot N_f)$, $\Delta f_{max}=480\cdot 10^3$ Hz, $f_f=4096$, $\kappa=64$, $k=64$, and μ are numerology. At this time, μ may be appointed to cause the greatest $T_{proc,CSI}$ value among ($\mu_{PDCCH}$, $\mu_{CSI-RS}$, $\mu_{UL}$). $\mu_{PDCCH}$ may refer to subcarrier spacing used in PDCCH transmission, $\mu_{CSI-RS}$ may refer to subcarrier spacing used in CSI-RS transmission, and μUL may refer to subcarrier spacing of an uplink channel used in uplink control information (UCI) transmission for CSI reporting. As another example, μ may be appointed to cause the greatest $T_{proc,CSI}$ value among ($\mu_{PDCCH}$, $\mu_{UL}$). The definitions of $\mu_{PDCCH}$ and $\mu_{UL}$ are the same as described above. For convenience of description, satisfying the above conditions is referred to as satisfying CSI reporting validity condition 1.

Also, when the RS for channel measurement for the aperiodic CSI report indicated to the UE through DCI is an aperiodic RS, a valid CSI report may be performed from a UL symbol after Z' symbols when the last symbol included in the RS is ended. The above-described Z' symbol may change according to the numerology of the downlink BWP corresponding to the PDCCH including the DCI indicating the CSI report, the numerology of the bandwidth corresponding to the RS for channel measurement for the CSI report, the numerology of the uplink BWP corresponding to the PUSCH through which the CSI report is transmitted, and types or characteristics of channel information reported in the CSI report (report quantity, frequency band granularity, number of ports of RS, codebook type, etc.). In other words, in order for a certain CSI report to be determined as a valid CSI report (in order for the corresponding CSI report to be a valid CSI report), the UL transmission of the CSI report includes timing advance and must not be performed before the Zref symbol. In this case, the Zref symbol is an uplink symbol that starts a CP after a time $T_{proc,CSI}'=(Z')(2048+144)\cdot\kappa 2^{-\mu}\cdot T_C$ from the moment the last symbol of the aperiodic CSI-RS or the aperiodic CSI-IM triggering the triggering PDCCH is ended. The detailed value of Z' follows the following description, $T_c=1/(\Delta f_{max}\cdot N_f)$, $\Delta f_{max}=480\cdot 10^3$ Hz, $N_f$=4096, κ=64, and μ are numerology. At this time, μ may be appointed to cause the greatest Tproc,CSI value among ($μ_{PDCCH}$, $μ_{CSI-RS}$, $μ_{UL}$). $μ_{PDCCH}$ may refer to subcarrier spacing used in triggering PDCCH transmission, $μ_{CSI-RS}$ may refer to subcarrier spacing used in CSI-RS transmission, and $μ_{UL}$ may refer to subcarrier spacing of an uplink channel used in uplink control information (UCI) transmission for CSI reporting. As another example, μ may be appointed to cause the greatest Tproc,CSI value among ($μ_{PDCCH}$, $μ_{UL}$). At this time, the definitions of $μ_{PDCCH}$ and $μ_{UL}$ are the same as described above. For convenience of description, satisfying the above conditions is referred to as satisfying CSI reporting validity condition 2.

When the base station indicates the aperiodic CSI report for the aperiodic RS to the UE through DCI, the UE may perform a valid CSI report from the first uplink symbol satisfying both the time point after the Z symbols when the last symbol included in the PDCCH including the DCI indicating the CSI report is ended and a time point after the Z' symbols when the last symbol including the RS is ended. That is, in the case of the aperiodic CSI reporting based on the aperiodic RS, a valid CSI report is determined when both the CSI reporting validity conditions 1 and 2 are satisfied.

When the CSI report time point indicated by the base station does not satisfy the CSI computation time requirement, the UE may determine that the CSI report is invalid and may not consider updating the channel information state for the CSI report.

The Z and Z' symbols for the above-described CSI computation time calculation follow Tables 31 and 32 below. For example, the Z and Z' symbols follow Z1 and Z1' values in Table 32 when the channel information reported in the CSI report includes only wideband information, the number of ports of the RS is 4 or less, the RS resource is one, and the codebook type is "type1-SinglePanel" or the reported channel information type (report quantity) is "cri-RI-CQI." This will be referred to as delay requirement 2. In addition, when the PUSCH including the CSI report does not include TB or HARQ-ACK and the CPU occupation of the UE is 0, the Z and Z' symbols follow the Z1 and Z1' values in Table 31. This will be referred to as delay requirement 1. The above-described CPU occupation will be described in detail below. Also, when the report quantity is "cri-RSRP" or "ssb-Index-RSRP," the Z and Z' symbols follow Z3 and Z3' values in Table 32. X1, X2, X3, and X4 in Table 32 refer to the UE capability for the beam report time, and KB1 and KB2 in Table 32 refer to the UE capability for the beam change time. When not corresponding to the types or characteristics of the channel information reported in the CSI report, the Z and Z' symbols follow Z2 and Z2' values in Table 32.

TABLE 31

| μ | $Z_1$ [symbols] | |
| --- | --- | --- |
| | $Z_1$ | $Z_1'$ |
| 0 | 10 | 8 |
| 1 | 13 | 11 |
| 2 | 25 | 21 |
| 3 | 43 | 36 |

TABLE 32

| μ | $Z_1$ [symbols] | | $Z_2$ [symbols] | | $Z_3$ [symbols] | |
| --- | --- | --- | --- | --- | --- | --- |
| | $Z_1$ | $Z_1'$ | $Z_2$ | $Z_2'$ | $Z_3$ | $Z_3'$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

When the base station indicates the aperiodic/semi-persistent/periodic CSI report to the UE, the base station may configure the CSI reference resource in units of slots in order to determine the reference time of the RS for measuring channel information reported in the CSI report. For example, when indicating to transmit CSI report #X in an uplink slot n', the CSI reference resource of the CSI report #X transmitted in the uplink slot n' may be defined as a downlink slot n-$n_{CSI-ref}$. The downlink slot n is calculated as n=$\lfloor n' \cdot 2^{μ_{DL}} / 2^{μ_{UL}} \rfloor$ considering the DL and UL numerologies $μ_{DL}$ and $μ_{UL}$. $n_{CSI-ref}$, which is the slot interval between the downlink slot n and the CSI reference resource, follows $n_{CSI-ref}$=4·$2^{μ_{DL}}$ when a single CSI-RS resource is connected to the CSI report according to the number of CSI-RS resources for channel measurement when CSI report #0 transmitted in the uplink slot n' is a semi-persistent or periodic CSI report, and follows when $n_{CSI-ref}$=5·$2^{μ_{DL}}$ multiple CSI-RS resources are connected to the CSI report. When the CSI report #0 transmitted in the uplink slot n' is an aperiodic CSI report, $n_{CSI-ref}$ is calculated as $n_{CSI-ref}$=$\lceil Z'/N_{symb}^{slot} \rceil$ considering the CSI computation time Z' for channel measurement. $N_{symb}^{slot}$ is the number of symbols included in one slot, and $N_{symb}^{slot}$=14 symb is assumed in NR.

When the base station indicates the UE to transmit a certain CSI report in the uplink slot n' through higher layer signaling or DCI, the UE may report CSI by performing channel measurement or interference measurement on at least one of a CSI-RS resource, a CSI-IM resources, or an SSB resource, which is transmitted not later than a CSI reference resource slot of the CSI report transmitted in the uplink slot n' among a CSI-RS resource, a CSI-IM resource, or an SSB resource associated with the CSI report. The CSI-RS resource, the CSI-IM resource, or the SSB resource associated with the CSI report may refer to a CSI-RS resource, a CSI-IM resource, or an SSB resource included in the resource set configured in the resource setting referenced by the report setting for the CSI report of the UE configured through higher layer signaling, or a CSI-RS resource, a CSI-IM resource, or an SSB resource indicated by the ID of a CSI-RS resource, CSI-IM resource, SSB resource, or RS set referenced by the CSI report trigger state including parameters for the CSI report.

In embodiments of the disclosure, CSI-RS/CSI-IM/SSB occasion refers to a transmission time point of CSI-RS/CSI-IM/SSB resource(s) determined by higher layer configuration or a combination of higher layer configuration and DCI triggering. As an example, in the semi-persistent or periodic CSI-RS resource, the slot transmitted according to the slot periodicity and the slot offset configured through higher layer signaling is determined, and the transmission symbol(s) in the slot is determined with reference to one of the resource mapping methods in the slot in Table 29 according to the resource mapping information (resourceMapping). As another example, in the aperiodic CSI-RS resource, the slot transmitted according to the slot offset with the PDCCH including DCI indicating the channel report configured through higher layer signaling is determined, and the transmission symbol(s) in the slot is determined with reference to one of the resource mapping methods in the slot in Table 29 according to the resource mapping information (resourceMapping).

The above-described CSI-RS occasion may be determined by independently considering the transmission time point of each CSI-RS resource or comprehensively considering the transmission time point of one or more CSI-RS resources included in the resource set. Therefore, the following two interpretations are possible for the CSI-RS occasion according to each resource set configuration.

Interpretation 1-1: From the start time point of the earliest symbol to the end time point of the latest symbol in which one specific resource among one or more CSI-RS resources included in the resource set(s) configured in the resource setting referenced by the report setting configured for the CSI report is transmitted.

Interpretation 1-2: From the start time point of the earliest symbol, in which the CSI-RS resource transmitted at the earliest time point is transmitted among all CSI-RS resources included in the resource set(s) configured in the resource setting referenced by the report setting configured for the CSI report, to the end time point of the latest symbol, in which the CSI-RS transmitted at the latest time point is transmitted.

Hereinafter, in the embodiments of the disclosure, the interpretation may be individually applied considering both the two interpretations for the CSI-RS occasion. Also, both the interpretations may be considered for the CSI-IM occasion and the SSB occasion, as in the CSI-RS occasion. However, because the principle thereof is similar to that described above, the redundant descriptions will be omitted below.

In embodiments of the disclosure, CSI-RS/CSI-IM/SSB occasions for CSI report #X transmitted in the uplink slot n' refers to a set of the CSI-RS occasion, the CSI-IM occasion, and the SSB occasion not later than the CSI reference resource of the CSI report #X transmitted in the uplink slot n' among the CSI-RS occasion, the CSI-IM occasion, and the SSB occasion included in the CSI-RS resource, the CSI-IM resource, and the SSB resource included in the resource set configured in the resource setting referenced by the report setting configured for CSI report #X.

In embodiments of the disclosure, the latest CSI-RS/CSI-IM/SSB occasion among the CSI-RS/CSI-IM/SSB occasions for the CSI report #X transmitted in the uplink slot n' may be interpreted in two ways as follows.

Interpretation 2-1: A set of the latest CSI-RS occasion among the CSI-RS occasions for the CSI report #X transmitted in the uplink slot n', the latest CSI-IM occasion among the CSI-RS occasions for the CSI report #X transmitted in the uplink slot n', and the latest SSB occasion among the SSB occasions for the CSI report #0 transmitted in the uplink slot n'

Interpretation 2-2: The latest occasion among the CSI-RS occasion, the CSI-IM occasion, and the SSB occasion for the CSI report #X transmitted in the uplink slot n'

In embodiments of the disclosure, the two interpretations for the latest CSI-RS/CSI-IM/SSB occasion among the CSI-RS/CSI-IM/SSB occasions for the CSI report #X transmitted in the uplink slot n' may be all considered and individually applied. Also, when considering the above-described two interpretations (interpretation 1-1 and interpretation 1-2) for the CSI-RS occasion, the CSI-IM occasion, and the SSB occasion, four different interpretations (application of interpretation 1-1 and interpretation 2-1, application of interpretation 1-1 and interpretation 2-2, application of interpretation 1-2 and interpretation 2-1, and application of interpretation 1-2 and interpretation 2-2) may be all considered and individually applied to the latest CSI-RS/CSI-IM/SSB occasions among the CSI-RS/CSI-IM/SSB occasions for the CSI report #X transmitted in the uplink slot n' in embodiments of the disclosure.

The base station may indicate the CSI report considering the amount of channel information that the UE may simultaneously calculate for the CSI report, that is, the number of channel information calculation units (CSI processing units (CPUs)) of the UE. When the number of channel information calculation units that the UE may simultaneously calculate is $N_{CPU}$, the UE may not expect the CSI report indication of the base station that requires more channel information calculations than $N_{CPU}$, or may not consider the update of channel information that requires more channel information calculations than $N_{CPU}$. The UE may report $N_{CPU}$ to the base station through higher layer signaling, or the base station may configure $N_{CPU}$ for the UE through higher layer signaling.

It is assumed that the CSI report indicated to the UE by the base station occupies all or part of the CPU for channel information calculation among the total number $N_{CPU}$ of pieces of channel information that the UE may calculate simultaneously. For each CSI report, for example, when the number of channel information calculation units required for CSI report n (n=0, 1, . . . , N−1) is $O_{CPU}^{(n)}$, the number of channel information calculation units required for a total of N CSI reports may be $\Sigma_{n=0}^{N-1} O_{CPU}^{(n)}$. The channel information calculation unit required for each reportQuantity configured in the CSI report may be configured as shown in Table 33 below.

TABLE 33

$O_{CPU}^{(n)}$ = 0: Case in which reportQuantity configured in CSI report is configured as 'none' and trs-Info is configured in CSI-RS resource set associated with CSI report
$O_{CPU}^{(n)}$ = 1: Case in which reportQuantity configured in CSI report is configured as 'none', 'cri-RSRP', or 'ssb-Index-RSRP' and trs-Info is not configured in CSI-RS resource set associated with CSI report
Case in which reportQuantity configured in CSI report is configured as 'cri-RI-PMI-CQI', 'cri-RI-i1', 'cri-RI-i1-CQI', 'cri-RI-CQI', or 'cri-RI-LI-PMI-CQI'
>>$O_{CPU}^{(n)}$ = $N_{CPU}$: Case in which aperiodic CSI report is triggered and CSI report is not multiplexed with either or both of TB/HARQ-ACK, and case in which the CSI report is wideband CSI, corresponds to up to 4 CSI-RS ports, and corresponds to single resource in which CRI report is absent, codebookType corresponds to 'typeI-SinglePanel', or reportQuantity corresponds to 'cri-RI-CQI'
(The corresponding case is a case corresponding to the above-described delay requirement 1, and may be considered as a case in which the UE uses all available CPUs to quickly calculate and report CSI)
>>$O_{CPU}^{(n)}$ = Ks: All cases other than the above case. Ks represents the number of CSI-RS resources within CSI-RS resource set for channel measurement When the number of channel information calculations that the UE requires for multiple CSI reports at a specific time point is greater than the number $N_{CPU}$ of channel information calculation units that the UE may calculate simultaneously, the UE may not consider the update of channel information for some CSI reports. Among a plurality of indicated CSI reports, the CSI report that does not consider the update of channel information may be determined considering at least the time for which channel information calculation required for the CSI report occupies the CPU and the priority of the channel information to be reported. For example, the update of the channel information for the CSI report in which the time for which the channel information calculation required for the CSI report occupies the CPU starts at the latest time may not be considered, and the update of channel information may not be preferentially considered for a CSI report having a low priority of channel information.

The priority of the channel information may be determined with reference to Table 34 below.

TABLE 34

CSI priority value $\text{Pri}_{iCSI}(y, k, c, s) = 2 \cdot N_{cells} \cdot M_s \cdot y + N_{cells} \cdot M_s \cdot k + M_s \cdot c + s$, y = 0 Case of aperiodic CSI report transmitted through PUSCH, y = 1 case of semi-persistent CSI report transmitted through PUSCH, y = 2 case of semi-persistent CSI report transmitted through PUCCH, y = 3 case of periodic CSI report transmitted through PUCCH k = 0 Case in which CSI report includes Ll-RSRP, k = 1 Case in which CSI report does not include Ll-RSRP c: Serving cell index, $N_{cells}$: Maximum number (maxNrofServingCells) of serving cells configured through higher layer signaling s: CSI report configuration index (reportConfigID), Ms: Maximum number (maxNrofCSI-ReportConfigurations) of CSI report configurations configured through higher layer signaling The CSI priority for the CSI report may be determined through the priority value $\text{Pri}_{iCSI}(y,k,c,s)$ in Table 24. Referring to Table 24, the CSI priority value may be determined through a type of channel information included in the CSI report, time domain reporting characteristics of the CSI report (aperiodic, semi-persistent, periodic), a channel through which the CSI report is transmitted (PUSCH, PUCCH), a serving cell index, and a CSI report configuration index. A CSI priority for a CSI report having a small priority value may be determined as high by comparing the priority value $\text{Pri}_{iCSI}(y,k,c,s)$.

The time for which the channel information calculation required for the CSI report indicated to the UE by the base station occupies the CPU may be referred to as a CPU occupation time. As an example, the CPU occupation time may be determined considering all or part of the type of channel information included in the CSI report (report quantity), the time domain characteristics of the CSI report (aperiodic, semi-persistent, periodic), the slot or symbol occupied by higher layer signaling or DCI indicating the CSI report, and the slot or symbol occupied by the RS for channel state measurement.

Hereinafter, the CSI-RS resource configured for the tracking purpose (i.e., the case in which the CSI-RS resource set is configured as trs-Info) is referred to as tracking RS (TRS). The TRS may have the following characteristics.

For periodic TRS, TRS may be QCLed with the SS/PBCH block in terms of QCL-TypeC or QCL-TypeD, or Periodic TRS may be QCLed with SSB in terms of QCL-TypeC, and may be QCLed with NZP-CSI-RS configured as "repetition" in terms of QCL-TypeD.

Aperiodic TRS may be QCLed with periodic TRS.

The UE has to assume the same port index for all CSI-RS resources configured with TRS in the same CSI-RS resource set.

All CSI-RS resources in the CSI-RS resources set configured as TRS may be configured to have the same periodicity, bandwidth, and subcarrier position.

Figure 16:
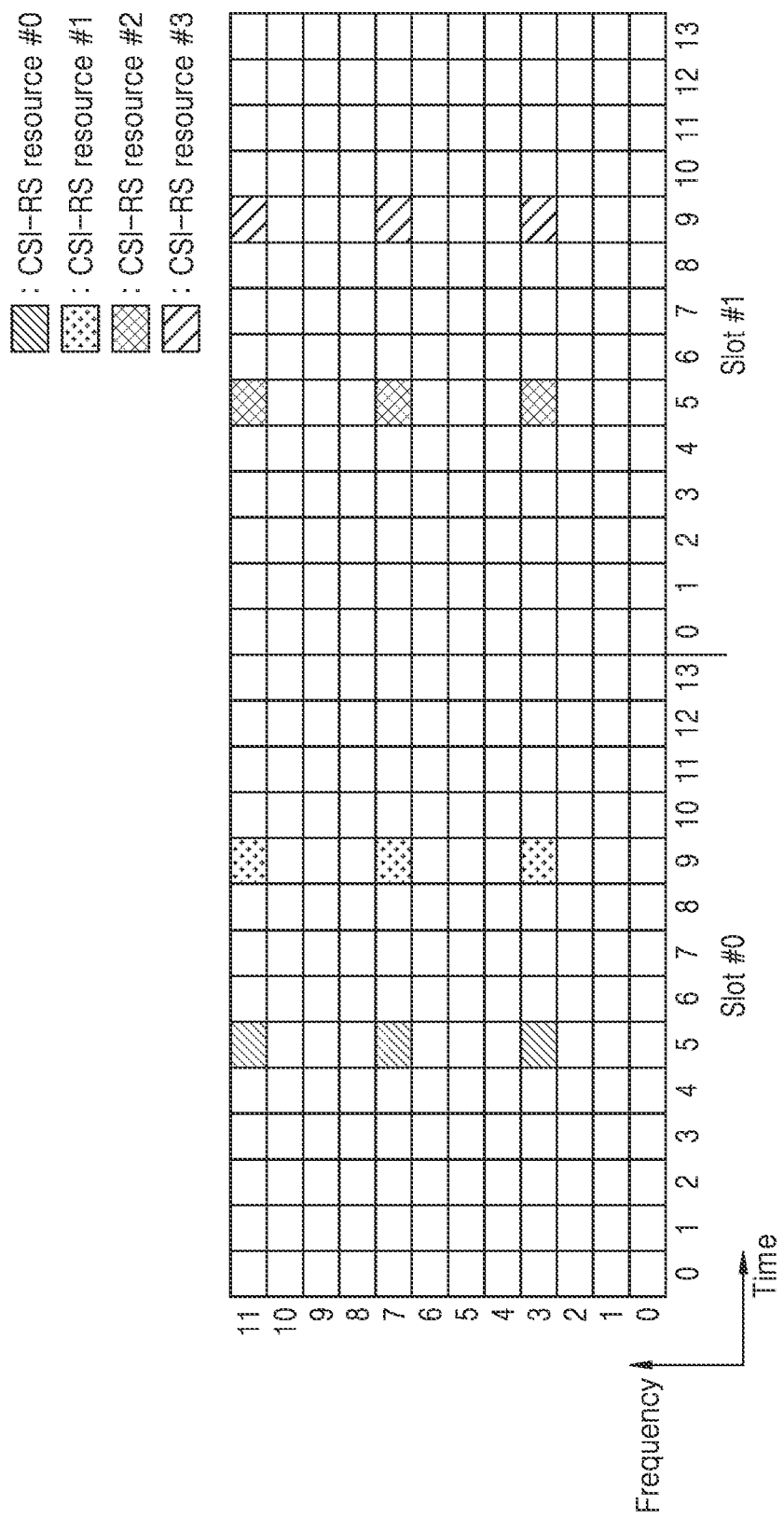
FIG. 16 illustrates an example of a channel state information reference signal (CSI-RS) resource mapping configured with a tracking reference signal (TRS), according to an embodiment of the disclosure.

FIG. 16 illustrates an example of a CSI-RS resource mapping configured with a TRS, according to an embodiment of the disclosure.

The CSI-RS resource mapping method configured with the TRS may be specifically described with reference to FIG. 16.

Referring to FIG. 16, four CSI-RS resources corresponding to the TRS may be periodically transmitted in two consecutive slots in a low frequency range (e.g., a band of 6 GHz or less or frequency range 1).

For example, two CSI-RS resources corresponding to the TRS may be periodically transmitted in one slot in a high frequency range (e.g., a band of 6 GHz or more or frequency range 2), or four CSI-RS resources may be periodically transmitted in two consecutive slots.

For example, the CSI-RS resource configured with the TRS may be transmitted in three REs per RB in the frequency range (this may be said that the density is 3).

As described above, in the wireless communication system, the base station may transmit paging for the purpose of waking up the UE in the idle mode or the inactive mode. The base station may transmit, to the UE, the PDCCH and the PDSCH for paging. The UE may receive, from the base station, configuration information for monitoring the PDCCH for paging, and the paging frame and the paging occasion may be determined based on the configuration information. The UE may monitor the PDCCH for paging in one or more PDCCH monitoring occasions within the paging occasion. In this case, in order for the UE to decode the paging PDCCH and the paging PDSCH, a series of pre-operations (e.g., time and frequency synchronization operations, etc.) may be required. To this end, it is necessary to monitor an arbitrary RS.

Figure 17:
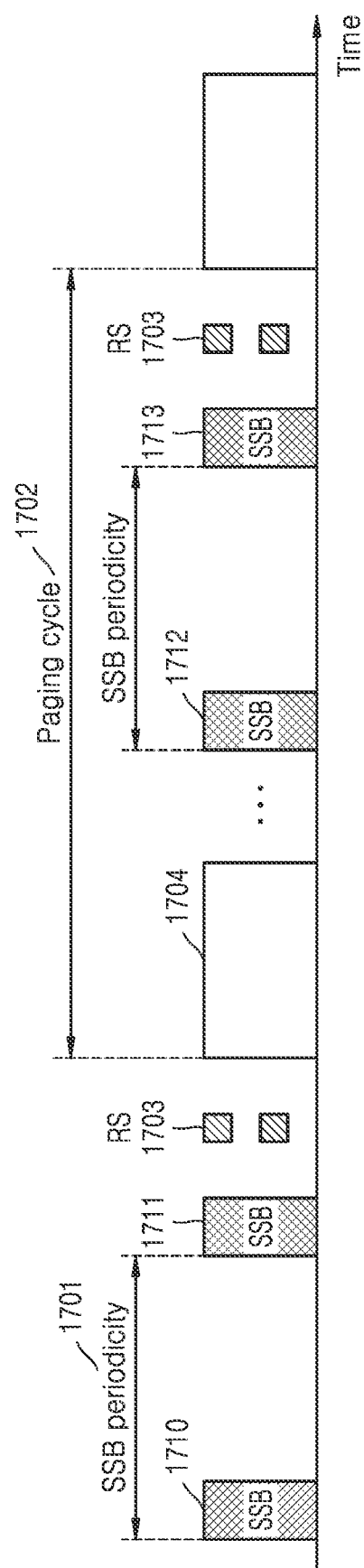
FIG. 17 illustrates an example of a method of transmitting a reference signal in a wireless communication system, according to an embodiment of the disclosure.

FIG. 17 illustrates an example of a method of transmitting an RS in a wireless communication system, according to an embodiment of the disclosure.

Referring to FIG. 17, the UE in the idle or inactive state may monitor paging at a specific cycle (paging cycle) 1702. At this time, in order to decode the paging PDCCH and the paging PDSCH, the UE may additionally monitor the SS/PBCH block (SSB) and perform a pre-operation (e.g., a time and frequency synchronization operation, etc.) for decoding a subsequent physical layer channel.

As an example, it may be assumed that the SSBs 1710, 1711, 1712, and 1713 are transmitted to the UE in the idle or inactive mode at a specific period (SSB periodicity) 1701. Therefore, the UE may wake up in advance before waking up at a paging occasion 1704, may monitor the SSBs 1710 and 1711, may perform a pre-operation, and may decode a paging PDCCH and a paging PDSCH at the paging occasion 1704 after the SSBs 1710 and 1711 are received.

As in the series of processes described above, when the UE monitors paging at an arbitrary paging occasion, the UE needs to wake up more times in order to monitor the SSB. Therefore, power consumption of the UE may increase. In particular, when the paging cycle 1702 and the SSB periodicity 1701 are not aligned, the number of times the UE wakes up for SSB monitoring may further increase. Also, when the UE performs subsequent paging decoding based on the pre-operation (e.g., time and frequency synchronization) performed by monitoring the SSB, performance degradation may occur in the UE.

As a method of solving the above-described problem, a method of additionally transmitting an RS for the pre-operation of the UE in the idle or inactive mode may be considered. In the example of FIG. 17, the base station may additionally configure and transmit an RS 1703 to the UE. Also, the UE may receive the RS 1703 based on configuration from the base station, and the UE may perform the pre-operation based on the received RS 1703, and then perform a decoding operation on a paging PDCCH and a paging PDSCH.

According to an embodiment of the disclosure, when the RS 1703 is set more flexibly than the SSB 1710, optimized transmission and reception may be performed in order to minimize the power consumption of the UE (that is, in order to minimize the number of times the UE wakes up to monitor the RS 1703 and improve the pre-operation (time and frequency synchronization) performance). However, in order to secure configuration flexibility of the RS 1703, the overhead of configuration information transmission may be increased. A method of transmitting and receiving the RS 1703 considering such a trade-off is required.

Methods of effectively transmitting and receiving an RS in an idle mode and an inactive mode, according to various embodiments of the disclosure, are provided.

Hereinafter, higher layer signaling may be at least one of the following signalings or at least one combination thereof
MIB (Master Information Block)
SIB (System Information Block) or SIB X (X=1, 2, . . . )
RRC (Radio Resource Control)
MAC (Medium Access Control) CE (Control Element)
UE Capability Reporting
UE assistance information message Also, S1 signaling may be signaling corresponding to at least one of the following physical layer channel or signaling methods or at least one combination thereof
PDCCH (Physical Downlink Control Channel)
DCI (Downlink Control Information)
UE-specific DCI
Group common DCI
Common DCI
Scheduling DCI (e.g., DCI used for scheduling DL or UL data)
Non-scheduling DCI (e.g., DCI not used for scheduling DL or UL data)
PUCCH (Physical Uplink Control Channel)
UCI (Uplink Control Information)

Hereinafter, the definitions of mathematical operators are as follows.
floor(X): Function of printing the greatest integer less than X
ceil(X): Function of printing the least integer greater than X
A mod B: Function of outputting the remainder obtained by dividing A by B (modulo operator)
max(X,Y): Function of printing the greater of X and Y
min(X,Y): Function of outputting the lesser of X and Y In the disclosure, the RS used in the idle mode or the inactive mode is referred to as IDLE-RS (IRS) (that is, RS for idle mode). The IRS is a name used for convenience in describing the disclosure, and may be used in the same manner as CSI-RS, TRS, RS, and the like.

In an embodiment of the disclosure, the base station may configure various pieces of information about IRS for the UE through higher layer signaling (e.g., MIB, SIB, RRC, etc.). The IRS configuration information may include, for example, the following information.
nzp-CSI-RS-ResourceId: CSI-RS resource index
resourceMapping: resource mapping information of CSI-RS resource
powerControlOffset: ratio between PDSCH EPRE (Energy Per RE) and CSI-RS EPRE
powerControlOffsetSS: ratio between SS/PBCH block EPRE and CSI-RS EPRE
scramblingID: Scrambling index of CSI-RS sequence
periodicityAndOffset: CSI-RS resource transmission periodicity and slot offset
qcl-InfoPeriodicCSI-RS: TCI-state information when the CSI-RS is a periodic CSI-RS All or part of the configuration information of the IRS may be explicitly configured, may follow a predefined value, or may be implicitly determined based on various system parameter values. The UE may perform reception and monitoring operations for the IRS based on explicit configuration information, implicit configuration information, and predefined parameter values of the base station.

A method of configuring an IRS, a method of transmitting an IRS, and a method of receiving an IRS, according to various embodiments of the disclosure, may be provided.

First Embodiment: Embodiment for Resource Mapping

In the first embodiment of the disclosure, an IRS may be mapped and transmitted according to a resource mapping method to be described later.
Y1 CSI-RS resources corresponding to TRS may be periodically transmitted in X1 consecutive slots in a low frequency range (e.g., a band of 6 GHz or less or frequency range 1).
Y2 CSI-RS resources corresponding to TRS may be periodically transmitted in X2 slots in a high frequency range (e.g., a band of 6 GHz or more or frequency range 2), or Y3 CSI-RS resources may be periodically transmitted in X3 consecutive slots.

The CSI-RS resource configured with the TRS may be transmitted in Z REs per RB in the frequency range (this may be said that the density is Z).

In an embodiment of the disclosure, the transmission density of the IRS in time and frequency resources may be less than that of the TRS. For example, the TRS may follow the following resource mapping.
Four CSI-RS resources corresponding to the TRS may be periodically transmitted in two consecutive slots in a low frequency range (e.g., a band of 6 GHz or less or frequency range 1).
Two CSI-RS resources corresponding to the TRS may be periodically transmitted in one slot in a high frequency range (e.g., a band of 6 GHz or more or frequency range 2), or four CSI-RS resources may be periodically transmitted in two consecutive slots.

The CSI-RS resource configured with the TRS may be transmitted in three REs per RB in the frequency range (this may be said that the density is 3).

In the parameter values of the IRS, X1 may be greater than 2, Y1 may be less than 4, X2 may be greater than 1, Y2 may be less than 2, X3 may be greater than 2, Y3 may be less than 4, or Z may be less than 3. In this case, all or part of the parameter values of the correct IRS may follow a predefined fixed value or may be explicitly configured through higher layer signaling.

As an example, when explicitly configured, X1, Y1, X2, Y2, X3, Y3, and Z values of all or part of the parameter values may be respectively configured.

As an example, when explicitly configured, other parameter values for calculating X1, Y1, X2, Y2, X3, Y3, and Z values of all or part of the parameter values, for example, a scaling value A, may be set. The UE may determine the parameter values of the IRS by applying the scaling value A to a predefined parameter value of the TRS. For example, the base station may set A=2/3 as the scaling value for Z for the UE. According to the corresponding setting, the UE may determine resource mapping information by assuming that the Z value of the IRS is 3*A. It is possible to similarly apply to other parameter values X1, Y1, X2, Y2, X3, and Y3.

In an embodiment of the disclosure, the parameter values of the IRS may be used as the same values as the parameter values of the TRS. That is, X1=2, Y1=4, X2=1, Y2=2, X3=2, Y3=4, and Z=3.

In an embodiment of the disclosure, the parameter values related to the time domain density may have the same parameter values as the TRS (i.e. X1=2, Y1=4, X2=1, Y2=2, X3=2), and the parameter values related to the frequency domain density may have values different from the TRS (e.g., values having a frequency domain density lower than the TRS, that is, Z<3).

In an embodiment of the disclosure, the parameter values related to the time domain density may have values different from the TRS (e.g., values having a lower time domain density than the TRS) (i.e., X1 is greater than 2, Y1 is less than 4, X2 is greater than 1, Y2 is less than 2, X3 is greater than 2, or Y3 is less than 4), and parameter values related to frequency domain density may have the same value as the TRS (i.e., Z=3).

In an embodiment of the disclosure, the parameter values of the IRS may be identical to or different from the corresponding parameter values of the TRS.

According to the first embodiment of the disclosure, the base station may configure the IRS for the UE, and the UE may receive the IRS based on configuration information of the base station.

Second Embodiment: Example of Scrambling ID Determination

A second embodiment of the disclosure proposes a method of determining an IRS scrambling sequence. In general, the IRS sequence may be determined as shown in Table 35 below.

TABLE 35

The UE shall assume the reference-signal sequence r(m) is defined by $$r(m) \frac{-1}{\sqrt{2}}(1 - 2 \cdot c(2m)) + j\frac{1}{\sqrt{2}}(1 - 2 \cdot c(2m+1))$$

where the pseudo-random sequence c(i) is defined in clause 5.2.1. The pseudo-random sequence generator shall initialised with TABLE 35-continued $c_{init} = (2^{10}(N_{symb}^{slot} n_{s,f}^{\mu} + 1 + 1)(2n_{ID} + 1) + n_{ID}) \bmod 2^{31}$
at the start of each OFDM symbol where $n_{s,f}^{\mu}$ is the slot number within a radio frame, l is the OFDM symbol number within a slot, and $n_{ID}$ equals the higher-layer parameter scramblingID
or sequenceGenerationConfig.

In an embodiment of the disclosure, the base station may explicitly configure the scrambling ID for the IRS for the UE through higher layer signaling.

In an embodiment of the disclosure, the UE may assume that the scrambling ID is the ID of the corresponding cell. More specifically, the UE may receive the SS/PBCH to obtain cell ID information, and may assume that the cell ID information is a scrambling ID for determining the IRS sequence.

In an embodiment of the disclosure, the UE may assume that the scrambling ID configured in the RRC connected mode is the scrambling ID for determining the IRS sequence. Specifically, the UE may receive the scrambling ID for the RS explicitly configured in the RRC connected mode, and the corresponding scrambling ID may be equally applied to the IRS.

In an embodiment of the disclosure, the UE in the idle state may assume that the scrambling ID is the ID of the corresponding cell, and the UE in the inactive state may assume that the scrambling ID configured in the RRC connected mode is the scrambling ID of the IRS.

Third Example: Example of QCL Assumption Determination

A third embodiment of the disclosure proposes a method of determining QCL for an IRS.

In an embodiment of the disclosure, the base station may explicitly configure QCL information for the IRS for the UE. In this case, the IRS may be QCLed with the SS/PBCH. That is, when the base station configures the IRS for the UE, the base station may notify index information of the SS/PBCH QCLed with the corresponding IRS together. When receiving the IRS, the UE may assume that the IRS is QCLed with the SS/PBCH corresponding to the SS/PBCH index configured in the corresponding IRS, and may receive the IRS In an embodiment of the disclosure, the QCL assumption of the IRS may be implicitly determined based on other system parameters. For example, the UE may assume the QCL for the IRS in the same manner as the QCL assumed when monitoring the paging PDCCH or the paging PDSCH. More specifically, when the DMRS port of the paging PDCCH or the paging PDSCH monitored by the UE is QCLed with SS/PBCH X, the UE may assume that the ISR is also QCLed with SS/PBCH X.

In general, because the IRS may be transmitted in order to effectively perform paging decoding, the IRS transmission occasion may exist at a time point earlier than the paging occasion. That is, when the paging occasion is time point A, the IRS transmission occasion may exist at time point A-Δ, which is earlier than time point A by an arbitrary offset value (Δ). At this time, the UE may assume a QCL relationship for the IRS in the same manner as the RS QCLed with a paging PDCCH DMRS at the earliest paging occasion among paging occasions existing after the IRS as QCL information for the IRS. For example, when the UE assumes that the DMRS port of the paging PDDCH is QCLed with SS/PBCH X at the earliest paging occasion among the paging occasions existing after the corresponding IRS with respect to the IRS transmitted at an arbitrary time point, the UE may assume that the corresponding IRS is also QCLed with SS/PBCH X.

Fourth Embodiment: Embodiment of BWP Determination

In an embodiment of the disclosure, the size of the transmission bandwidth of the RS may be set from the base station to the UE through higher layer signaling, and the UE may receive the RS within the transmission bandwidth set from the base station. The following parameters may be configured in order to set the transmission bandwidth of the RS.

Number of RBs (nrofRBs): Number of RBs through which RS resource is transmitted

Starting RB (startingRB): Starting point of RB through which RS resource is transmitted A fourth embodiment of the disclosure proposes a method of determining a BWP through which an IRS may be transmitted.

Method 1

In an embodiment of the disclosure, the IRS may be transmitted within a bandwidth corresponding to an initial BWP (or a BWP having a BWP ID of 0). The initial BWP may correspond to a BWP that is configurable from the base station to the UE through system information, and the UE may perform an initial access procedure within the initial bandwidth.

For example, the size of the bandwidth through which the IRS is transmitted may be the same as the size of the bandwidth of the initial BWP. The base station may not notify the UE of explicit configuration information about the size of the bandwidth of the IRS, and the UE may assume that the transmission bandwidth of the IRS is the size of the bandwidth of the initial BWP.

As another example, the size of the bandwidth through which the IRS is transmitted may be less than or equal to the size of the bandwidth of the initial BWP. The base station may explicitly notify the UE of configuration information about the size of the bandwidth of the IRS through higher layer signaling (e.g., MIB, SIB, etc.), and the UE may assume the transmission bandwidth of the IRS based on the configuration information of the base station. In this case, the size of the bandwidth of the IRS set for the UE by the base station may not be set to a value greater than the size of the bandwidth of the initial BWP.

In another example, the size of the transmission bandwidth of the IRS may be explicitly set from the base station to the UE through higher layer signaling (e.g., MIB, SIB, etc.). When there is no configuration information about the size of the transmission bandwidth of the IRS, the size of the transmission bandwidth of the IRS may be regarded as the same as the size of the bandwidth of the initial BWP. That is, when the base station sets the size of the transmission bandwidth of the IRS for the UE, the UE may receive the IRS within the set transmission bandwidth of the IRS. When the base station does not provide, to the UE, a set value for the size of the transmission bandwidth of IRS, the UE may consider that the transmission bandwidth of the IRS is the same as the bandwidth of the initial BWP, and may receive the corresponding IRS.

When the base station explicitly sets the transmission bandwidth for the IRS for the UE, the size (number of RBs, nrofRBs) and the position (starting RB, startingRB) of the bandwidth through which the IRS may be transmitted may be configured based on the initial BWP. For example, the position of the starting RB at which the transmission bandwidth of the IRS starts may be configured based on the lowest RB index of the initial BWP. For example, assuming that the lowest RB index of the initial BWP is 0, the index value of the starting RB may be configured.

Method 2

In an embodiment of the disclosure, the IRS may be transmitted within a bandwidth corresponding to control resource set #0. Control resource set #0 may correspond to a control resource set that may be configured from the base station to the UE through the MIB transmitted via the PBCH, and the UE may monitor the PDCCH through control resource set #0 and may perform an initial access procedure.

For example, the size of the bandwidth through which the IRS is transmitted may be the same as the size of the bandwidth of control resource set #0. The base station may not notify the UE of explicit configuration information about the size of the bandwidth of the IRS, and the UE may assume that the transmission bandwidth of the IRS has the size of the bandwidth of control resource set #0.

As another example, the size of the bandwidth through which the IRS is transmitted may be less than or equal to the size of the bandwidth of control resource set #0. The base station may explicitly notify the UE of configuration information about the size of the bandwidth of the IRS through higher layer signaling (e.g., MIB, SIB, etc.), and the UE may assume the transmission bandwidth of the IRS based on the configuration information of the base station. In this case, the size of the bandwidth of the IRS set for the UE by the base station may not be set to a value greater than the size of the bandwidth of control resource set #0.

In another example, the size of the transmission bandwidth of the IRS may be explicitly set from the base station to the UE through higher layer signaling (e.g., MIB, SIB, etc.). When there is no configuration information about the size of the transmission bandwidth of the IRS, the size of the transmission bandwidth of the IRS may be regarded as the same as the size of the bandwidth of control resource set #0. That is, when the base station sets the size of the transmission bandwidth of the IRS for the UE, the UE may receive the IRS within the set transmission bandwidth of the IRS. When the base station does not provide, to the UE, a set value for the size of the transmission bandwidth of IRS, the UE may consider that the transmission bandwidth of the IRS is the same as the bandwidth of control resource set #0, and may receive the corresponding IRS.

When the base station explicitly sets the transmission bandwidth for the IRS for the UE, the size (number of RBs, nrofRBs) and the position (starting RB, startingRB) of the bandwidth through which the IRS may be transmitted may be configured based on control resource set #0. For example, the position of the starting RB at which the transmission bandwidth of the IRS starts may be configured based on the lowest RB index of control resource set #0. For example, assuming that the lowest RB index of control resource set #0 is 0, the index value of the starting RB may be set.

Method 3

In an embodiment of the disclosure, the IRS may be transmitted within a bandwidth corresponding to a control resource set configured to monitor a paging PDCCH (i.e., associated with a paging search space). The paging search space may be configured to be associated with control resource set #0 configured through the MIB or control resource set #X (V≠0) configured through SIB1.

For example, the size of the bandwidth through which the IRS is transmitted may be the same as the size of the bandwidth of the control resource set configured to monitor the paging PDCCH. The base station may not notify the UE of explicit configuration information about the size of the bandwidth of the IRS, and the UE may assume that the transmission bandwidth of the IRS has the size of the bandwidth of the control resource set configured to monitor the paging PDCCH.

As another example, the size of the bandwidth through which the IRS is transmitted may be less than or equal to the size of the bandwidth of the control resource set configured to monitor the paging PDCCH. The base station may explicitly notify the UE of configuration information about the size of the bandwidth of the IRS through higher layer signaling (e.g., MIB, SIB, etc.), and the UE may assume the transmission bandwidth of the IRS based on the configuration information of the base station. In this case, the size of the bandwidth of the IRS set for the UE by the base station may not be set to a value greater than the size of the bandwidth of the control resource set configured to monitor the paging PDCCH.

In another example, the size of the transmission bandwidth of the IRS may be explicitly set from the base station to the UE through higher layer signaling (e.g., MIB, SIB, etc.). When there is no configuration information about the size of the transmission bandwidth of the IRS, the size of the transmission bandwidth of the IRS may be regarded as the same as the size of the bandwidth of the control resource set configured to monitor the paging PDCCH. That is, when the base station sets the size of the transmission bandwidth of the IRS for the UE, the UE may receive the IRS within the set transmission bandwidth of the IRS. When the base station does not provide, to the UE, a set value for the size of the transmission bandwidth of IRS, the UE may consider that the transmission bandwidth of the IRS is the same as the bandwidth of the control resource set configured to monitor the paging PDCCH, and may receive the corresponding IRS.

When the base station explicitly sets the transmission bandwidth for the IRS for the UE, the size (number of RBs, nrofRBs) and the position (starting RB, startingRB) of the bandwidth through which the IRS may be transmitted may be configured based on the control resource set configured to monitor the paging PDCCH. For example, the position of the starting RB at which the transmission bandwidth of the IRS starts may be configured based on the lowest RB index of the control resource set configured to monitor the paging PDCCH. For example, assuming that the lowest RB index of the control resource set configured to monitor the paging PDCCH is 0, the index value of the starting RB may be set.

The above-described methods may be performed in combination. For example, Method 1, Method 2, and Method 3 of the fourth embodiment of the disclosure may be performed in combination.

The base station may configure whether to perform the above-described embodiments of the disclosure for the UE. The UE may receive, from the base station, configuration information about whether to perform the above-described embodiments of the disclosure, and may differently control the operation for each embodiment of the disclosure based on the corresponding configuration information.

Whether the above-described embodiments of the disclosure may be performed may be notified from the UE to the base station based on the UE capability reporting. The base station may obtain whether the functions of the above-described embodiments of the disclosure are supported through the capability reporting from the UE. Based on this, the operations based on the above-described embodiments of the disclosure may be appropriately controlled to the corresponding UE.

The above-described embodiments of the disclosure may be implemented in combination. For example, the first embodiment, the second embodiment, the third embodiment, and the fourth embodiment of the disclosure may be implemented in combination with each other.

Figure 18:
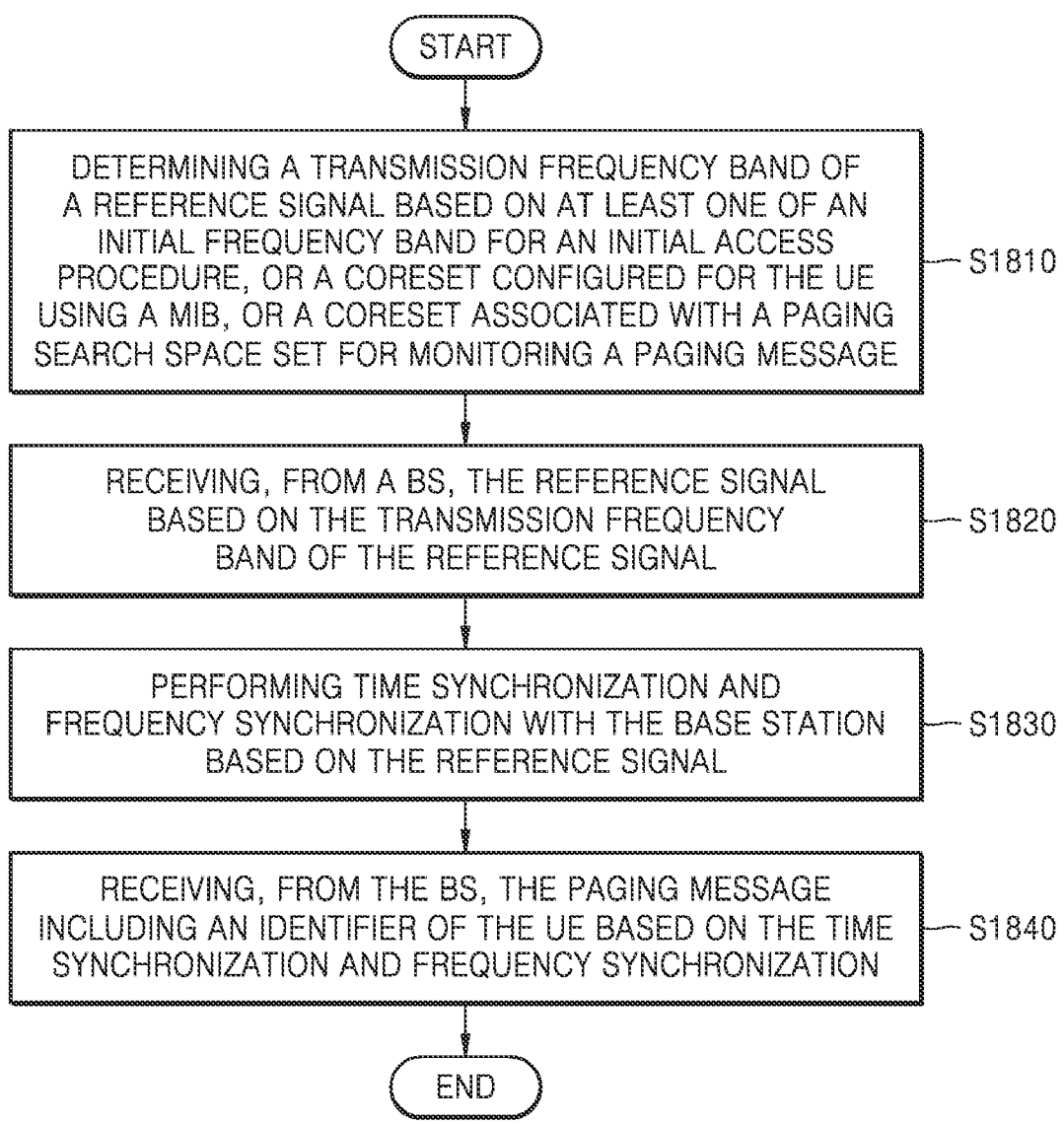
FIG. 18 illustrates an example of a method performed by a UE in a wireless communication system, according to an embodiment of the disclosure.

FIG. 18 illustrates an example of a method performed by a UE in a wireless communication system, according to an embodiment of the disclosure.

At operation S1810, the UE may determine a transmission frequency band of a reference signal based on at least one of an initial frequency band for an initial access procedure, or a CORESET configured for the UE using an MIB, or a CORESET associated with a paging search space set for monitoring a paging message. For example, the reference signal (e.g., IRS, TRS, CSI-RS, etc.) may be received by the UE in an IDLE state or an INACTIVE state.

At operation S1820, the UE may receive, from a base station (BS), the reference signal based on the transmission frequency band of the reference signal.

In an embodiment of the disclosure, the UE may determine the transmission frequency band as a frequency band included in at least one of the initial frequency band, or the CORESET, or the CORESET associated with the paging search space set.

In an embodiment of the disclosure, the UE may determine the transmission frequency band with the same value as at least one of the initial frequency band, a frequency band of the CORESET, or a frequency band of the CORESET associated with the paging search space set.

In an embodiment of the disclosure, the UE may receive, from the BS, configuration information of the reference signal including size information of the transmission frequency band via higher layer signaling. The UE may determine the transmission frequency band of the reference signal based on the configuration information. For example, the transmission frequency band is determined to be less than or equal to at least one of the initial frequency band, a frequency band of the CORESET, or a frequency band of the CORESET associated with the paging search space set.

In an embodiment of the disclosure, the UE may receive, from the BS, configuration information of the reference signal via higher layer signaling. The UE may determine the transmission frequency band based on whether size information of the transmission frequency band is included in the configuration information of the reference signal.

For example, in case that the transmission frequency band is included in the configuration information of the reference signal, the transmission frequency band may be determined based on the configuration information of the reference signal. In case that the transmission frequency band is not included in the configuration information of the reference signal, the transmission frequency band may be determined with the same value as at least one of the initial frequency band, a frequency band of the CORESET, or a frequency band of the CORESET associated with the paging search space set.

In an embodiment of the disclosure, the UE may receive, from the BS via higher layer signaling, configuration information of the reference signal including size information of the transmission frequency band and location information of the transmission frequency band. The UE may determine the transmission frequency band based on at least one of the initial frequency band, the CORESET, the CORESET associated with the paging search space set, the size information, or the location information.

At operation S1830, the UE may perform time synchronization and frequency synchronization with the base station based on the reference signal.

At operation S1840, the UE may receive, from the BS, the paging message including an identifier of the UE based on the time synchronization and frequency synchronization.

Figure 19:
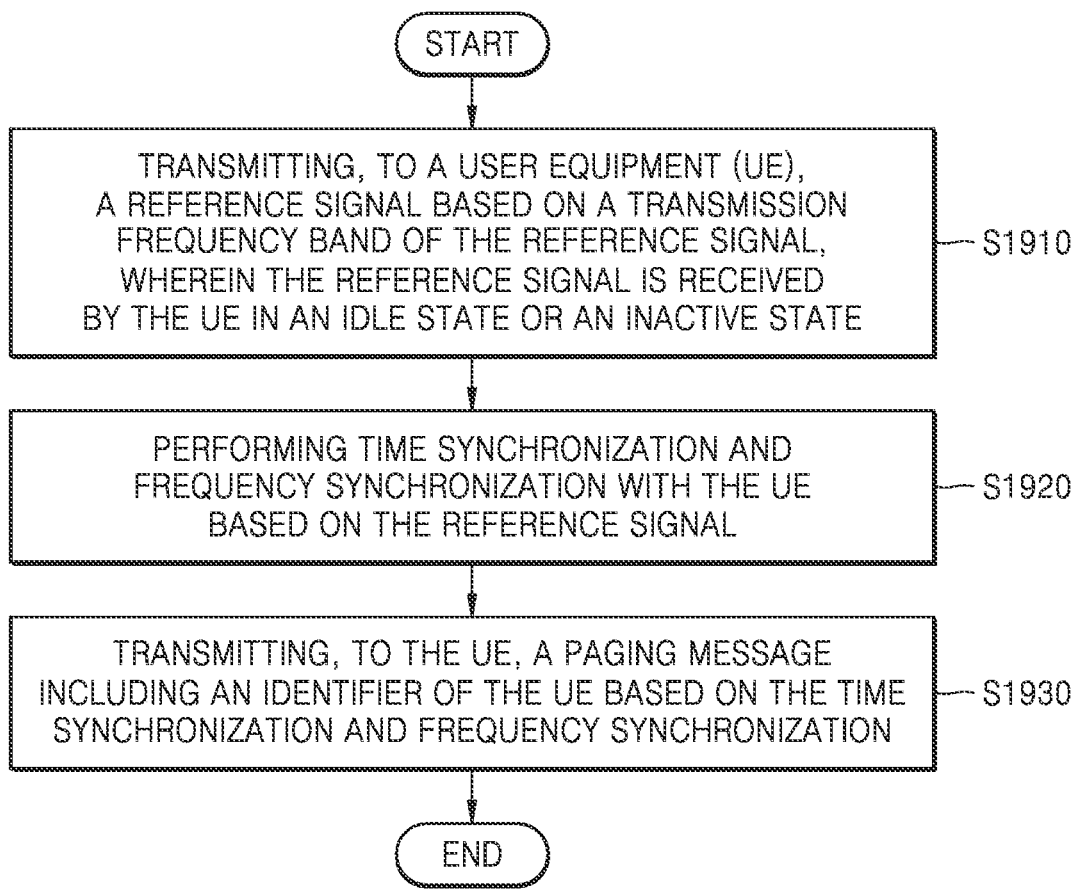
FIG. 19 illustrates an example of a method performed by a base station (BS) in a wireless communication system, according to an embodiment of the disclosure.

FIG. 19 illustrates an example of a method performed by a BS in a wireless communication system, according to an embodiment of the disclosure.

At operation S1910, the BS may transmit, to a UE, a reference signal based on a transmission frequency band of the reference signal. For example, the reference signal (e.g., IRS, TRS, CSI-RS, etc.) may be received by the UE in an IDLE state or an INACTIVE state.

In an embodiment of the disclosure, the transmission frequency band of the reference signal may be determined based on at least one of an initial frequency band for an initial access procedure, or a CORESET configured for the UE using an MIB, or a CORESET associated with a paging search space set for monitoring a paging message.

In an embodiment of the disclosure, the transmission frequency band may be determined as a frequency band included in at least one of the initial frequency band, or the CORESET, or the CORESET associated with the paging search space set.

In an embodiment of the disclosure, the transmission frequency band may be determined with the same value as at least one of the initial frequency band, a frequency band of the CORESET, or a frequency band of the CORESET associated with the paging search space set.

In an embodiment of the disclosure, the BS may transmit, to the UE, configuration information of the reference signal including size information of the transmission frequency band via higher layer signaling. The transmission frequency band of the reference signal may be determined based on the configuration information. Also, the transmission frequency band may be determined to be less than or equal to at least one of the initial frequency band, a frequency band of the CORESET, or a frequency band of the CORESET associated with the paging search space set.

In an embodiment of the disclosure, the BS may transmit, to the UE, configuration information of the reference signal via higher layer signaling. The transmission frequency band may be determined based on whether size information of the transmission frequency band is included in the configuration information of the reference signal. For example, in case that the transmission frequency band is included in the configuration information of the reference signal, the transmission frequency band may be determined based on the configuration information of the reference signal, and in case that the transmission frequency band is not included in the configuration information of the reference signal, the transmission frequency band may be determined with the same value as at least one of the initial frequency band, a frequency band of the CORESET, or a frequency band of the CORESET associated with the paging search space set.

In an embodiment of the disclosure, the BS may transmit, to the UE via higher layer signaling, configuration information of the reference signal including size information of the transmission frequency band and location information of the transmission frequency band. The transmission frequency band may be determined based on at least one of the initial frequency band, the CORESET, the CORESET associated with the paging search space set, the size information, or the location information.

At operation S1920, the BS may perform time synchronization and frequency synchronization with the UE based on the reference signal; and At operation 51930, the BS may transmit, to the UE, a paging message including an identifier of the UE based on the time synchronization and frequency synchronization.

The methods according to the embodiments of the disclosure, which are described in the claims or the specification, may be implemented as hardware, software, or a combination of hardware and software.

When implemented as software, a non-transitory computer-readable storage medium storing one or more programs (software modules) may be provided. One or more programs stored in the non-transitory computer-readable storage medium are configured to be executable by one or more processors in an electronic device. One or more programs include instructions that cause the electronic device to execute the methods according to the embodiments of the disclosure, which are described in the claims or the specification of the disclosure.

One or more programs (software modules, software, etc.) may be stored in random access memory (RAM), non-volatile memory including flash memory, read-only memory (ROM), electrically erasable programmable read only memory (EEPROM), magnetic disc storage device, compact disc-ROM (CD-ROM), digital versatile disc (DVD), other types of optical storage devices, or magnetic cassette. Alternatively, one or more programs may be stored in a memory provided by a combination of all or part of these devices. Also, each memory may include a plurality of configured memories.

Also, one or more programs may be stored in an attachable storage device that is accessible through a communication network such as Internet, intranet, local area network (LAN), wide area network (WAN), or storage area network (SAN), or communication network provided by a combination thereof. These storage devices may be connected through an external port to a device that performs the embodiments of the disclosure. Also, a separate storage on the communication network may access the device that performs the embodiment of the disclosure.

According to various embodiments of the disclosure, the method of efficiently transmitting and receiving the reference signal in the wireless communication system may be provided.

The technical problems to be solved by the disclosure are not limited to those described above, and other technical problems not described herein will be clearly understood by those of ordinary skill in the art from the following description.

In specific embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   determining a transmission frequency band of a reference signal based on an initial frequency band for an initial access procedure, a control resource set (CORESET) configured for the UE using a master information block (MIB), and a CORESET associated with a paging search space set for monitoring a paging message, wherein the reference signal is received by the UE in an IDLE state or an INACTIVE state;
   receiving, from a base station (BS), the reference signal based on the transmission frequency band of the reference signal;
   performing time synchronization and frequency synchronization with the BS based on the reference signal; and
   receiving, from the BS, the paging message including an identifier of the UE based on the time synchronization and frequency synchronization.

2. The method of claim 1, wherein the determining of the transmission frequency band of the reference signal comprises determining the transmission frequency band as a frequency band included in at least one of the initial frequency band, the CORESET, and the CORESET associated with the paging search space set.

3. The method of claim 1, wherein the determining of the transmission frequency band of the reference signal comprises determining the transmission frequency band with a same value as at least one of the initial frequency band, a frequency band of the CORESET, and a frequency band of the CORESET associated with the paging search space set.

4. The method of claim 1, wherein the determining of the transmission frequency band of the reference signal comprises:
   receiving, from the BS, configuration information of the reference signal including size information of the transmission frequency band via higher layer signaling; and
   determining the transmission frequency band of the reference signal based on the configuration information, wherein the transmission frequency band is determined to be less than or equal to at least one of the initial frequency band, a frequency band of the CORESET, and a frequency band of the CORESET associated with the paging search space set.

5. The method of claim 1, wherein the determining of the transmission frequency band of the reference signal comprises:
   receiving, from the BS, configuration information of the reference signal via higher layer signaling; and
   determining the transmission frequency band based on whether size information of the transmission frequency band is included in the configuration information of the reference signal.

6. The method of claim 5,
   wherein in case that the size information of the transmission frequency band is included in the configuration information of the reference signal, the transmission frequency band is determined based on the configuration information of the reference signal, and
   wherein in case that the size information of the transmission frequency band is not included in the configuration information of the reference signal, the transmission frequency band is determined with a same value as at least one of the initial frequency band, a frequency band of the CORESET, and a frequency band of the CORESET associated with the paging search space set.

7. The method of claim 1, wherein the determining of the transmission frequency band of the reference signal comprises:
   receiving, from the BS via higher layer signaling, configuration information of the reference signal including size information of the transmission frequency band and location information of the transmission frequency band; and
   determining the transmission frequency band based on at least one of the initial frequency band, the CORESET, the CORESET associated with the paging search space set, the size information, or the location information.

8. The method of claim 1, wherein the paging message includes UE identifier information of the UE to be awakened by the BS.

9. A user equipment (UE) in a wireless communication system, the UE comprising:
   a transceiver; and
   at least one processor coupled with the transceiver and configured to:
      determine a transmission frequency band of a reference signal based on an initial frequency band for an initial access procedure, a control resource set (CORESET) configured for the UE using a master information block (MIB), and a CORESET associated with a paging search space set for monitoring a paging message, wherein the reference signal is received by the UE in an IDLE state or an INACTIVE state,
      receive, from a base station (BS), the reference signal based on the transmission frequency band of the reference signal,
      perform time synchronization and frequency synchronization with the BS based on the reference signal, and
      receive, from the BS, the paging message including an identifier of the UE based on the time synchronization and frequency synchronization.

10. The UE of claim 9, wherein the at least one processor is further configured to determine the transmission frequency band as a frequency band included in at least one of the initial frequency band, the CORESET, and the CORESET associated with the paging search space set.

11. The UE of claim 9, wherein the at least one processor is further configured to determine the transmission frequency band with a same value as at least one of the initial frequency band, a frequency band of the CORESET, and a frequency band of the CORESET associated with the paging search space set.

12. The UE of claim 9, wherein the at least one processor is further configured to:
   receive, from the BS, configuration information of the reference signal including size information of the transmission frequency band via higher layer signaling; and
   determine the transmission frequency band of the reference signal based on the configuration information, wherein the transmission frequency band is determined to be less than or equal to at least one of the initial frequency band, a frequency band of the CORESET, Of and a frequency band of the CORESET associated with the paging search space set.

13. The UE of claim 9, wherein the at least one processor is further configured to:
   receive, from the BS, configuration information of the reference signal via higher layer signaling; and determine the transmission frequency band based on whether size information of the transmission frequency band is included in the configuration information of the reference signal.

14. The UE of claim 9, wherein the at least one processor is further configured to:
receive, from the BS via higher layer signaling, configuration information of the reference signal including size information of the transmission frequency band and location information of the transmission frequency band; and
determine the transmission frequency band based on at least one of the initial frequency band, the CORESET, the CORESET associated with the paging search space set, the size information, or the location information.

* * * * *